(12) United States Patent
Meaney et al.

(10) Patent No.: US 8,701,007 B2
(45) Date of Patent: Apr. 15, 2014

(54) EDIT VISUALIZER FOR MODIFYING AND EVALUATING UNCOMMITTED MEDIA CONTENT

(75) Inventors: Brian Meaney, San Jose, CA (US); Colleen Pendergast, Livermore, CA (US); Dave Cerf, San Francisco, CA (US); Michaelle Stikich, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 431 days.

(21) Appl. No.: 12/433,893

(22) Filed: Apr. 30, 2009

(65) Prior Publication Data

US 2010/0281376 A1    Nov. 4, 2010

(51) Int. Cl.
*G06F 3/00*    (2006.01)

(52) U.S. Cl.
USPC ........... 715/723; 715/716; 715/719; 715/720; 715/721; 715/722; 715/724; 715/726; 715/730; 715/731; 715/732

(58) Field of Classification Search
USPC .................. 715/716, 719–724, 726, 730–732
See application file for complete search history.

(56) References Cited

U.S. PATENT DOCUMENTS

| | | |
|---|---|---|
| 5,519,828 A | 5/1996 | Rayner |
| 5,659,539 A | 8/1997 | Porter et al. |
| 5,659,792 A | 8/1997 | Walmsley |
| 5,664,216 A | 9/1997 | Blumenau |
| 5,682,326 A | 10/1997 | Klingler et al. |
| 5,760,767 A | 6/1998 | Shore et al. |
| 5,781,188 A | 7/1998 | Amiot et al. |
| 5,826,102 A | 10/1998 | Escobar et al. |
| 5,930,446 A | 7/1999 | Kanda |
| 6,134,380 A | 10/2000 | Kushizaki |
| 6,154,600 A | 11/2000 | Newman et al. |
| 6,154,601 A | 11/2000 | Yaegashi et al. |
| 6,161,115 A | 12/2000 | Ohanian |
| 6,204,840 B1 | 3/2001 | Petelycky et al. |

(Continued)

FOREIGN PATENT DOCUMENTS

| | | |
|---|---|---|
| WO | WO 2007/120694 | 10/2007 |
| WO | WO 2009/122213 | 10/2009 |
| WO | WO 2009/128227 | 10/2009 |
| WO | WO 2010/106586 | 9/2010 |

OTHER PUBLICATIONS

U.S. Appl. No. 12/433,892, filed Apr. 30, 2009, Pendergast, Colleen, et al.

(Continued)

*Primary Examiner* — Omar Abdul-Ali
*Assistant Examiner* — Phuong Nguyen
(74) *Attorney, Agent, or Firm* — Adeli LLP

(57) ABSTRACT

A computer readable medium (CRM) storing a media editing application for creating media presentations is described. The application includes a graphical user interface (GUI). The GUI has (1) a display area for displaying a composite presentation that the application creates by compositing a plurality of media clips, (2) a composite display area for displaying graphical representations of a set of media clips that are part of the composite presentation and a set of media clips that are candidates for adding to the composite presentation, and (3) a preview tool for differentiating in the composite display area the graphical representation of any media clip that is part of the composite presentation from the graphical representation of any media clip that is a candidate for adding to the composite presentation.

25 Claims, 39 Drawing Sheets

(56) References Cited

U.S. PATENT DOCUMENTS

| | | |
|---|---|---|
| 6,324,335 B1 | 11/2001 | Kanda |
| 6,400,378 B1 * | 6/2002 | Snook .......................... 715/716 |
| 6,414,686 B1 | 7/2002 | Protheroe et al. |
| 6,477,315 B1 * | 11/2002 | Ohomori ....................... 386/281 |
| 6,539,163 B1 | 3/2003 | Sheasby et al. |
| 6,546,188 B1 | 4/2003 | Ishii et al. |
| 6,628,303 B1 | 9/2003 | Foreman et al. |
| 6,650,826 B1 | 11/2003 | Hatta |
| 6,658,194 B1 | 12/2003 | Omori |
| 6,674,955 B2 | 1/2004 | Matsui et al. |
| 6,714,216 B2 | 3/2004 | Abe |
| 6,744,968 B1 | 6/2004 | Imai et al. |
| 7,073,127 B2 | 7/2006 | Zhao et al. |
| 7,313,755 B2 | 12/2007 | Rahman et al. |
| 7,325,199 B1 * | 1/2008 | Reid ............................ 715/723 |
| 7,362,946 B1 | 4/2008 | Kowald |
| 7,432,940 B2 | 10/2008 | Brook et al. |
| 7,444,593 B1 | 10/2008 | Reid |
| 7,614,012 B1 | 11/2009 | Dulaney |
| 7,623,755 B2 | 11/2009 | Kuspa |
| 7,640,501 B2 * | 12/2009 | Suzuki et al. ................. 715/723 |
| 7,805,678 B1 | 9/2010 | Niles et al. |
| 7,889,975 B2 | 2/2011 | Slone |
| 2001/0020953 A1 | 9/2001 | Moriwake et al. |
| 2001/0036356 A1 | 11/2001 | Weaver et al. |
| 2002/0023103 A1 | 2/2002 | Gagne |
| 2002/0154140 A1 | 10/2002 | Tazaki |
| 2002/0154156 A1 | 10/2002 | Moriwake et al. |
| 2002/0156805 A1 | 10/2002 | Schriever et al. |
| 2002/0188628 A1 | 12/2002 | Cooper et al. |
| 2003/0001880 A1 | 1/2003 | Holtz et al. |
| 2003/0016254 A1 | 1/2003 | Abe |
| 2003/0018609 A1 | 1/2003 | Phillips et al. |
| 2003/0117431 A1 | 6/2003 | Moriwake et al. |
| 2004/0001079 A1 | 1/2004 | Zhao et al. |
| 2004/0071441 A1 | 4/2004 | Foreman et al. |
| 2004/0078761 A1 | 4/2004 | Ohanian |
| 2004/0199395 A1 | 10/2004 | Schulz |
| 2004/0268224 A1 | 12/2004 | Balkus et al. |
| 2005/0132293 A1 | 6/2005 | Herberger et al. |
| 2005/0257152 A1 | 11/2005 | Shimizu et al. |
| 2006/0008247 A1 | 1/2006 | Minami et al. |
| 2006/0265657 A1 | 11/2006 | Gilley |
| 2007/0189708 A1 | 8/2007 | Lerman et al. |
| 2007/0245238 A1 | 10/2007 | Fugitt et al. |
| 2007/0262995 A1 | 11/2007 | Tran |
| 2008/0044155 A1 | 2/2008 | Kuspa |
| 2008/0152297 A1 | 6/2008 | Ubillos |
| 2008/0152298 A1 | 6/2008 | Ubillos |
| 2008/0155420 A1 | 6/2008 | Ubillos et al. |
| 2008/0155421 A1 | 6/2008 | Ubillos et al. |
| 2008/0253735 A1 * | 10/2008 | Kuspa et al. .................... 386/52 |
| 2009/0131177 A1 | 5/2009 | Pearce |
| 2010/0049699 A1 | 2/2010 | Benschoter et al. |
| 2010/0281375 A1 | 11/2010 | Pendergast et al. |
| 2011/0103772 A1 * | 5/2011 | Suzuki ........................ 386/285 |

OTHER PUBLICATIONS

Bennett, Eric P., et al., "Proscenium: A Framework for Spatio-Temporal Video Editing," Proceedings of ACM Multimedia, Nov. 2-8, 2003, pp. 177-184, Berkeley, CA.

Chisan, James, et al., "Video Bench—Final Report: SEng 480a/CSc 586a," Apr. 11, 2003, University of Victoria.

Casares, Juan, et al., "Simplifying Video Editing Using Metadata," Proceedings of Designing Interactive Systems (DIS 2002), Jun. 2002, pp. 157-166, London, Great Britain.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA.

Updated portions of prosecution history of U.S. Appl. No. 12/433,892, May 30, 2012, Pendergast, Colleen, et al.

Author Unknown, "Adobe Premiere Pro CS3: User Guide," Apr. 1, 2008, 455 pages, Adobe Systems Incorporated, San Jose, California, USA.

Portions of prosecution history of U.S. Appl. No. 12/433,892, Nov. 17, 2011, Pendergast, Colleen, et al.

Author Unknown, "Apple Announces Final Cut Pro4," NAB, Apr. 6, 2003, Apple Inc., Las Vegas, Nevada, USA.

Author Unknown, "iMovie '08 Getting Started," Month Unknown, 2008, Apple Inc., USA.

Author Unknown, "Using Adobe Premiere Elements 8 Editor," Month Unknown, 2009, Adobe Systems Incorporated, San Jose, California, USA.

Author Unknown,"Adobepremiere Pro CS3: User Guide," Month Unknown, 2007, Adobe Systems Incorporated, San Jose, California, USA.

Brenneis, Lisa, "Final Cut Pro 3 for Macintosh: visual Quick Pro Guide," Apr. 2002, Peachpit Press, Berkley, California, USA.

* cited by examiner

EDIT VISUALIZER FOR MODIFYING AND EVALUATING UNCOMMITTED MEDIA CONTENT

FIELD OF THE INVENTION

The present invention relates to an editing tool that allows modification and display of uncommitted media content without affecting content that is committed to a media project.

BACKGROUND OF THE INVENTION

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Computer, Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

One difficulty in media editing is that a user cannot easily evaluate alternative content or changes to existing content in the context of the media project without altering the existing project data. At any given time, the user may wish to preview changes to the project before committing such changes to the project.

FIG. 1 illustrates a typical graphical user interface ("GUI") 100 of a media editing application. As shown, the GUI includes a timeline 110 that includes various media clips 120-130, a preview display pane 140 for viewing the project, and a collection of media content (alternatively referred to as a "media library") 150 that is available to add to the project. In this example, a user wishes to evaluate the project after replacing the "Video_2" clip 130 in the timeline 110 with the "Video_3" clip 160 in a modified timeline 170 shown in the updated GUI 180.

As shown, the user has replaced the clip 130 with the "Video_3" clip 160. The application automatically overwrites both the display of the clip data in the timeline 170 and the underlying project data. The project data is conceptually represented as a set of media content. As shown, before modifying the project, the project data 185 includes representations of the three clips 120-130 in the example timeline 110. After modifying the project, by altering the timeline 160 to include a new clip 160 in place of a previously-included clip 130, the project data 190 has been modified to represent the three clips 120, 125, and 160 shown in the modified timeline 170.

By replacing the "Video_2" clip 130, the "Video_2" clip (or a reference thereto) is removed from the project data and any data associated with the "Video_2" clip is also lost. This associated data may include video effects data, start and stop points, audio enhancements, etc. Thus, if the user wishes to revert to the project as shown in timeline 110, the user must replace the "Video_3" clip 160 with the previously-displaced "Video_2" clip 130 (e.g., by manually replacing the content, performing a series of "undo" operations, or some other way). In addition, after restoring the "Video_2" clip the user may have to trim the content, add effects, or perform other editing operations to return the project to the state it was in before evaluating the "Video_3" clip 160. Furthermore, the user must repeat similar steps in order to evaluate other potential changes to the media project.

Thus, there is a need for a media editing application that allows a user to preview modifications to the media project and resulting media presentation without committing the modifications to the project or presentation.

SUMMARY OF THE INVENTION

Some embodiments provide a media editing application for creating media presentations. The media editing application includes in some embodiments a display area for displaying a composite presentation that the application creates by compositing several media clips (e.g., audio clips, video clips, text overlays, pictures, and/or other media). The media editing application of some embodiments also includes a composite display area (e.g., an area with multiple tracks that span a timeline in some embodiments) for displaying graphical representations of (1) a set of "committed" media clips that are part of the composite presentation, and (2) a set of "candidate" media clips that are candidates for adding to the composite presentation. The media editing application of some embodiments further includes a preview option for differentiating in the composite display area between a graphical display representation of a media clip that is part of the composite presentation and a graphical display representation of a media clip that is a candidate for adding to the composite presentation.

To implement the preview option, some embodiments of the media editing application have a preview selection GUI item (e.g., a user interface item or menu selection item) that can be used to define a particular media clip as a candidate clip in the composite display area. In some embodiments, a user of the application can use the preview selection GUI item to add a particular media clip (e.g., audio clip, video clip, text overlay, picture, and/or other media) that is in a media storage (e.g., a folder or media library) as a candidate clip to the composite display area. For instance, in some embodiments, the user can first select the preview selection GUI item before adding the particular clip to the composite display area from the media storage. This clip can be added to the composite display area through a click-and-drag operation of a cursor-control device, through the selection of an option from a pull-down or pop-up menu after selecting the particular clip, or through any number of other GUI operations.

Alternatively, or conjunctively, some embodiments allow the user to first select the particular clip from the media storage before selecting the preview selection GUI item to add the particular clip to the composite display area. For example, in some embodiments, the user selects a particular clip and then selects the preview selection GUI item (e.g., through a pull-down or pop-up menu, or through a UI preview selection item).

Some embodiments also use the preview selection GUI item to change the designation of a clip in the composite display area from a committed clip to a candidate clip. For instance, in some such embodiments, a user can select a committed clip and then change its designation to a candidate clip by selecting the preview selection GUI item (e.g., selecting this item in a pop-up or pull-down menu, or selecting this item as a button in the user interface). In addition to the preview selection item, some embodiments also provide a preview commit option (e.g., a user interface item or menu selection item) that removes a particular media clip from the set of candidate clips in the composite display area and adds the particular media clip to the set of committed clips in the composite display area.

Different embodiments of the invention differentiate the graphical display representation of the candidate and committed clips differently. For instance, some embodiments use the same geometric shape for both candidate and committed clips, but use a different size of the shape for the candidate clip (e.g., use parallelograms for the candidate clips that are smaller than the parallelograms used for the committed clips). Other embodiments use different geometric shapes for the committed and candidate clips (e.g., use rectangles for the committed clips, while using ellipses for candidate clips). Yet other embodiments use different colors for the committed and candidate clips. Still other embodiments use any combination of shape, size, color, or other visual attribute to distinguish candidate clips in the composite display area from the committed clips in this area.

As mentioned above, the application includes a display area that displays a composite presentation that the application creates by compositing several media clips. In some embodiments, this display area is a preview display area that displays a preview of the composite presentation. In some such embodiments, the candidate clips in the composite display area supersede the committed clips in the composite presentation displayed in the preview display area, even though the candidate clips in the composite display area are not part of the composite clip presentation that is defined in the composite display area. Specifically, when candidate and committed clips overlap in the composite presentation, some embodiments display the candidate clips in the composite presentation shown in the preview display area for the overlapping portions of the composite presentation. When the superseding clip has a smaller size than the superseded clip, some of these embodiments display the superseding clip over a portion of the superseded clip. On the other hand, when the superseding clip is at least as large as the superseded clip, these embodiments displace the entire superseded clip in the display. Some embodiments require a user to direct the application to have the candidate clips supersede the committed clips, while other embodiments allow the user to direct the application not to have the candidate clips supersede the committed clips.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media editing application, that provides a preview feature that: (1) allows a user to add media clips to a composite project as candidate clips without altering the composite project, (2) provides a visual indication that differentiates candidate clips from committed media clips, and (3) allows a user to watch and/or listen to the composite project, with the candidate clips included, in a preview display area.

In some embodiments, media clips are any kind of clip that can be used to create a composite presentation. The term clips may also be used to refer to images (i.e., single-frame clips). Examples of such clips include audio clips, video clips, text overlays, pictures, and/or other media. Committed clips are media clips that are part of the composite presentation because they are already part of the composite presentation, while candidate clips are media clips that are candidates for adding to the composite presentation as they have not yet been added to the composite presentation. Candidate clips may alternatively be referred to as "preview clips".

Figure 2:
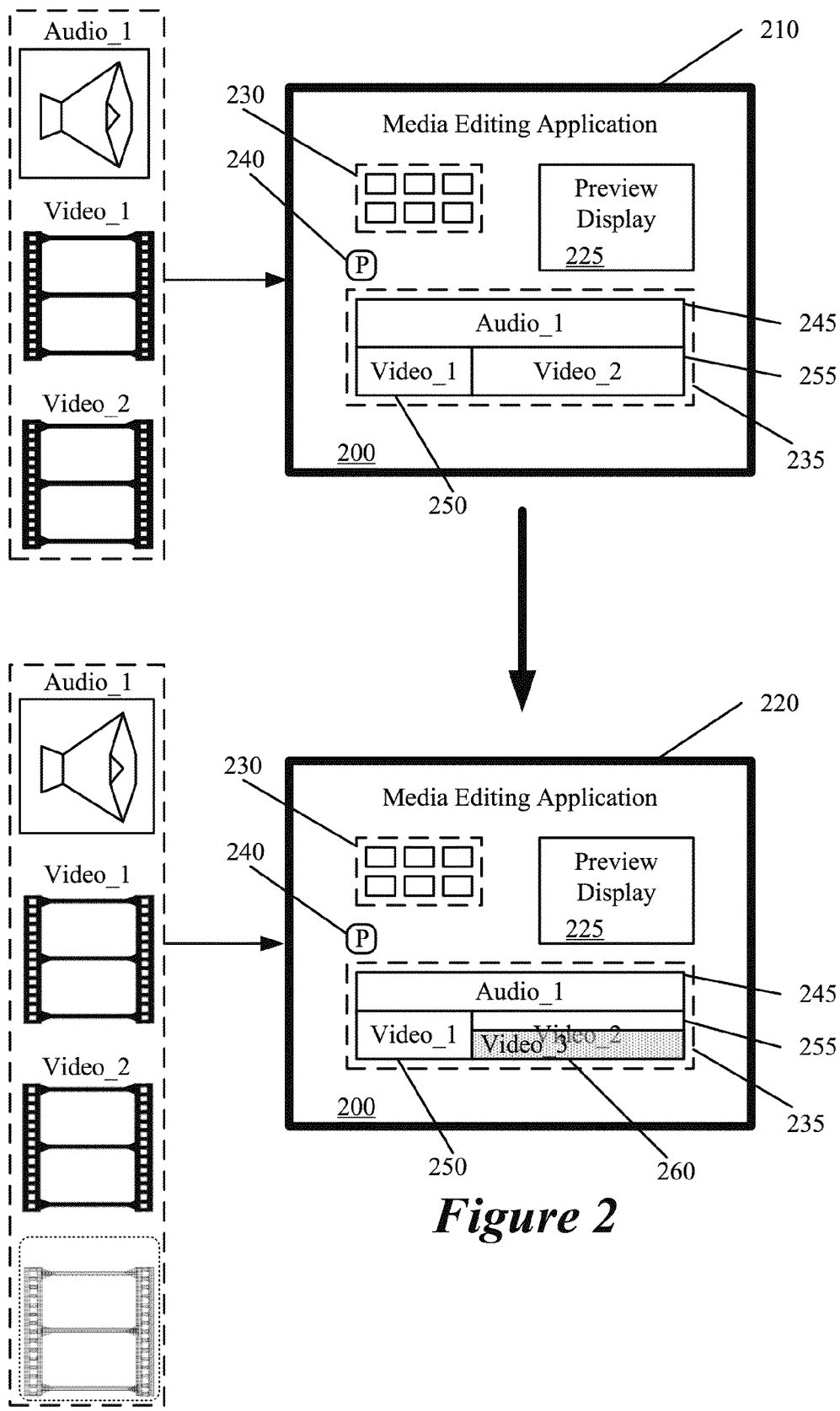
FIG. 2 illustrates a Graphical User Interface ("GUI") of a media editing application of some embodiments.

For some embodiments of the invention, FIG. 2 illustrates a graphical user interface ("GUI") 200 of a media editing application with such a preview feature. Specifically, this figure illustrates the GUI 200 at two different stages, a first stage 210 that is before the addition of a candidate clip to the composite presentation and a second stage 220 that is after the addition of the candidate clip to the composite presentation. As shown in this figure, the GUI 200 includes a preview display area 225, a media library 230, a composite display area 235, and a preview selection item 240. The preview display area 225 displays a preview of a composite presentation that the application creates by compositing several media clips.

The media library 230 is an area in the GUI 200 through which the application's user can select media clips to add to a presentation that the user is compositing with the application. In the example of FIG. 2, the clips in the media library are represented as thumbnails that can be selected and added to the composite display area 235 (e.g., through a drag-and-drop operation or a menu selection operation). In some embodiments, the media library may include audio clips, video clips, text overlays, pictures, and/or other media.

The composite display area 235 provides a visual representation of the composite presentation being created by the user. Specifically, it displays one or more geometric shapes that represent one or more committed and/or candidate media clips that are part of the composite presentation. In the example illustrated in FIG. 2, the composite display area 235 is an area that includes multiple tracks that span a timeline. One or more media clips can be placed on each track. In some embodiments, no two committed clips can overlap on the same track, but, as described above and below, a preview clip can overlap one or more committed clips on a particular track.

The preview selection item 240 is one UI item that allows the media editing application to implement its preview feature for adding candidate clips to the composite display area. In some embodiments, a user of the application can use the preview selection item to add a particular media clip that is in the media library 230 as a candidate clip to the composite display area 235, as further described below. Also, as further described below, some embodiments use the preview selection item to change the designation of a clip in the composite display area from a committed clip to a candidate clip.

The operation of the GUI 200 will now be described by reference to the state of this GUI during the first and second stages 210 and 220 that are illustrated in FIG. 2. In the first stage 210, the composite display area 235 displays a composite presentation that displays three committed clips along a timeline. These three clips are the audio clip 245, the video clip 250, and the video clip 255. A user might have added these three clips to the composite presentation by selecting them from the media library 230, or the user might have opened a previously defined composite project that included these three clips.

In the second stage 220, the composite display area 235 displays the composite presentation with the three committed clips 245, 250 and 255, but also with a candidate video clip 260. The candidate video clip 260 has been added to the composite display area without affecting the composite presentation that is displayed in that area. In other words, the clips 245, 250 and 255 were not eliminated nor were their positions in the timeline and tracks altered to add the candidate clip 260. As further described below, some embodiments of the invention offer a preview clip insert operation that can alter the composite presentation in the display area by pushing the committed clips along the timeline.

In the second stage 220, the candidate video clip 260 has been added by using a rectangular shape that has a smaller size (i.e., has half the height) and has a different color than the rectangles used to represent the audio and video clips 245, 250 and 255. These different sizes and shapes have been used to differentiate in the composite display area 235 between the graphical display representations of the committed media clips from the graphical display representation of the candidate media clip. One reason to graphically differentiate between candidate and committed clips is that, unlike committed clips, candidate clips are not part of the composite presentation. The different appearance of the candidate and committed clips in the composite display area 235 allows the user to view and manipulate the candidate clip 260 while still easily recognizing the committed clips that are part of the composite project.

Different embodiments of the invention graphically differentiate between candidate and committed clips differently. For instance, like the embodiments illustrated in FIG. 2, some embodiment use different sizes and colors to differentiated candidate clips from committed clips. Other embodiments use different geometric shapes for the committed and candidate clips (e.g., use rectangles for the committed clips, while using diamonds for candidate clips). Yet other embodiments simply use different colors for the committed and candidate clips. Still other embodiments use any combination of shape, size, color, or other visual attribute to distinguish candidate clips in the composite display area from the committed clips in this area.

Even though the candidate clips are not part of the composite presentation and are distinguished from the committed clips in the composite display area, some embodiments allow the candidate clips (like clip 260) in the composite display area 235 to supersede the committed clips 245, 250 and 255 in the composite presentation displayed in the preview display area 225. For instance, candidate clip 260 overlaps committed clip 255 perfectly in the composite presentation. Accordingly, some embodiments display the candidate clip 260 in the preview of the composite presentation that is shown in the preview display area 225 for the entire duration of the clip 255. When the superseding clip has a smaller size than the superseded clip, some of these embodiments display the superseding clip over a portion of the superseded clip. On the other hand, when the superseding clip is at least as large as the supersede clip, these embodiments, displace the entire superseded clip in the display. Some embodiments require a user to direct the application to have the candidate clips 260 supersede the committed clips, while other embodiments allow the user to direct the application not to have the candidate clips supersede the committed clips.

Having the candidate clip 260 appear in the composite presentation in the preview display area 225 without modifying the underlying composite presentation allows a user to evaluate and/or modify the candidate clip 260 without making changes to the composite project. This is helpful in saving time in making modifications to the underlying composite project that later prove to be undesirable. Moreover, such modifications in some instances might prove difficult in reversing accurately when they prove to be unwanted later.

The composite display area 235 of the GUI 200 can receive candidate clips in several different ways. As mentioned above, the preview selection item 240 can be used in some embodiments to add a particular media clip to the composite display area as a preview clip. For instance, in some embodiments, the user can first select the preview selection item. The particular media clip may then be added to the composite display area through a click-and-drag operation (i.e., by using a cursor-control device, such as a mouse or trackpad, to select this clip's thumbnail representation from the media library and dragging-and-dropping this thumbnail to the composite display area 235). A particular media clip may also be added to the composite display area by selecting an option from a pull-down menu (not shown) after the selection of the clip's thumbnail in the media library.

Alternatively, or conjunctively, some embodiments allow the user to first select the particular clip from the media library 230 before selecting the preview selection item 240 to add the particular clip to the composite display area. For example, in some embodiments, the user selects a particular clip and then selects the preview selection item. Also, in lieu of or in conjunction with the preview selection item 240, the GUI 200 includes in some embodiments other GUI items that can be used as a substitute for the preview selection item 240. Examples of such GUI items include menu items that are displayed in pull-down menus that are accessed by selecting and opening menus in the GUI, or that are displayed in pop-up menus that are opened through cursor control operations (e.g., right-cursor click operation or control-cursor-click operations).

Some embodiments also use the preview selection item 240 or similar GUI item to change the designation of a clip in the composite display area from a committed clip to a candidate clip. For instance, in some such embodiments, a user can select a committed clip and then change its designation to a candidate clip by selecting the preview selection item 240 or selecting a similar UI item in a pop-up or pull-down menu.

Several more detailed embodiments of the invention are described in the sections below. Section I provides a conceptual description of the various ways to invoke the preview tool and use the tool to add content. In addition, Section I describes various conceptual data structures that may be used to implement the preview tool. Next, Section II describes some of the edit functions used to manipulate both committed and preview clips once they have been added to a media project. Section III describes the process of playing back a media project that includes committed and preview clips. Section IV follows that discussion with a description of the software modules used to implement the media editing application. Next, Section V describes the process used to define the media editing application of some embodiments. Lastly, Section VI describes a computer system which implements some of the embodiments of the invention.

I. Adding Content Using the Preview Tool

As mentioned above, some embodiments provide several different techniques for adding candidate clips to a composite display area of a media editing application without affecting the composite presentation that is graphically represented in the composite display area (i.e., without displacing or replacing any of the committed clips in the composite project that is represented in the composite display area). Sub-section I.A will describe several more detailed examples of such techniques by reference to FIGS. 3-12. Sub-section I.B will then describe a conceptual process used by some embodiments when a request is made to add a clip to the composite display area as a candidate or a committed clip.

A. Examples of Ways to Add Candidate Clips

FIGS. 3-6 illustrate one example of adding a candidate clip through the use of a preview selection item 310 of a GUI 300 of a media editing application. Like the GUI 200 of FIG. 2, the GUI 300 of FIGS. 3-6 includes (1) a preview selection item 310, (2) a media library 320, (3) a preview display area 330, and (4) a composite display area 340 with several tracks (e.g., video track 350 and audio track 360) that span a timeline 370.

FIGS. 3-6 also illustrate the GUI 300 to include a menu bar 380 that provides several grouped sets of menu commands and options for the media editing application. In addition, these figures illustrate a cursor 385 for providing feedback to a user and operating various selection items or other controls included in the GUI 300. The cursor 385 also allows a user to select or manipulate various representations of content that are included in the GUI 300.

These figures also illustrate the composite display area 340 to include a playhead 390 for highlighting the instance in time in the composite presentation that is being represented in the composite display area. Highlighting this instance in time is useful for a variety of reasons. For instance, when viewing a preview of the composite presentation in the preview display area 330, the playhead 390 scrolls across the timeline 370 to identify the location in the composite presentation in the composite display area 340 that is being currently displayed in the preview display area 330. Furthermore, as further described below, the playhead 390 location also acts as an insertion point when adding clips or effects to the project.

In addition, these figures illustrate the GUI 300 to include a preview tool 410 that allows a user to select from among several edit styles, commit the edits to the composite project, and also to de-invoke to preview tool. The preview tool may alternatively be referred to as an "edit visualizer". The various edit and control functions of the preview tool will be described in more detail in section II below. One of ordinary skill in the art will recognize that the preview tool 410 may be implemented using a different graphical interface, may provide more or fewer controls, etc.

Figure 3:
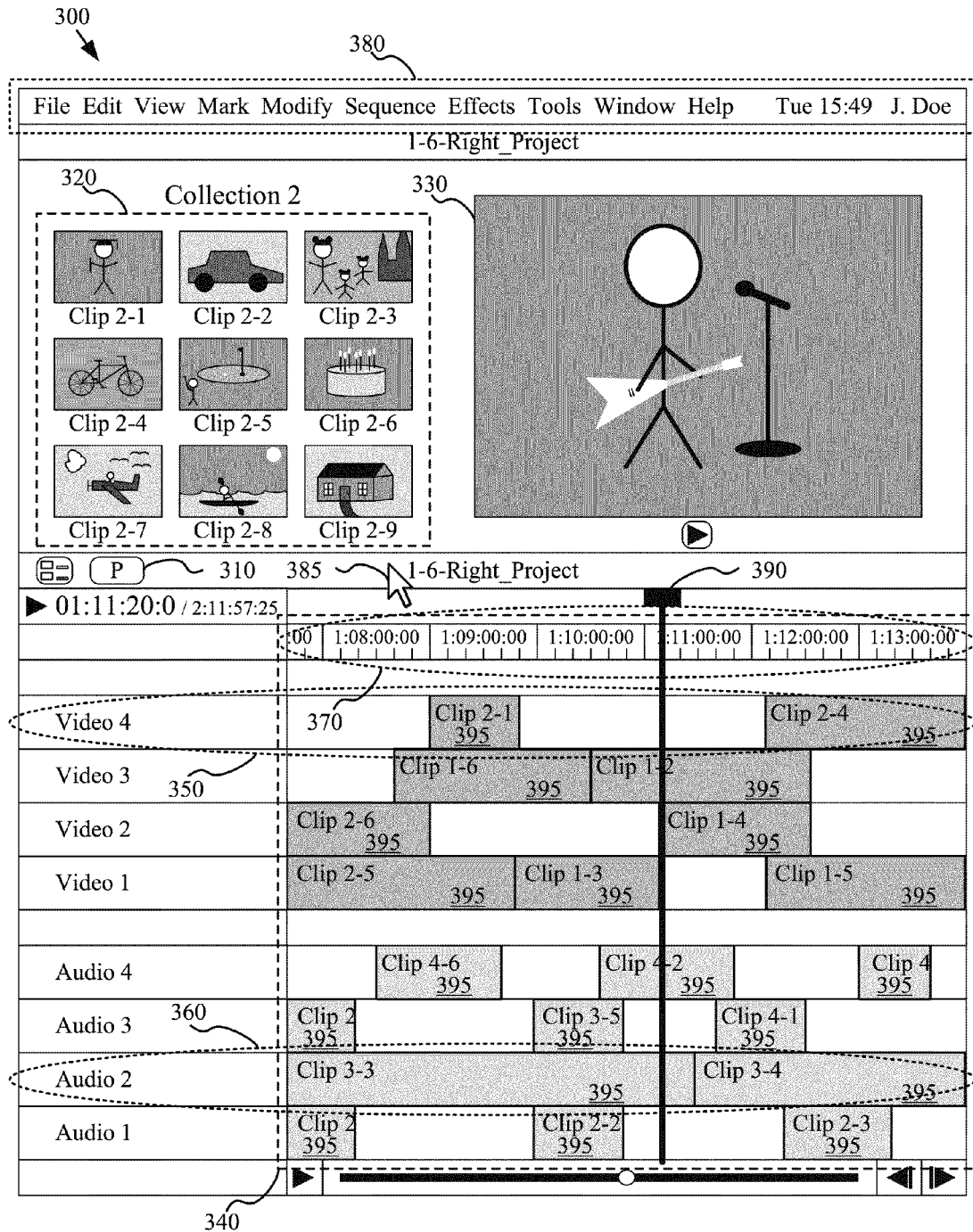
FIG. 3 illustrates a more detailed GUI of a media editing application that includes a preview tool of some embodiments.

To illustrate the example of adding a candidate clip to the composite display area through the use of the preview selection item 310, FIGS. 3-6 illustrate four different stages of a user's interaction with the GUI 300. FIG. 3 illustrates a first stage that is before the addition of any candidate clips to the composite display area 340. In the first stage, the composite display area 340 displays a number of committed clips 395 along the timeline 370. The committed clips 395 include several audio clips and several video clips. A user might have added these clips 395 from the media library 320, or the user might have opened a previously defined composite project that included the clips 395.

Figure 4:
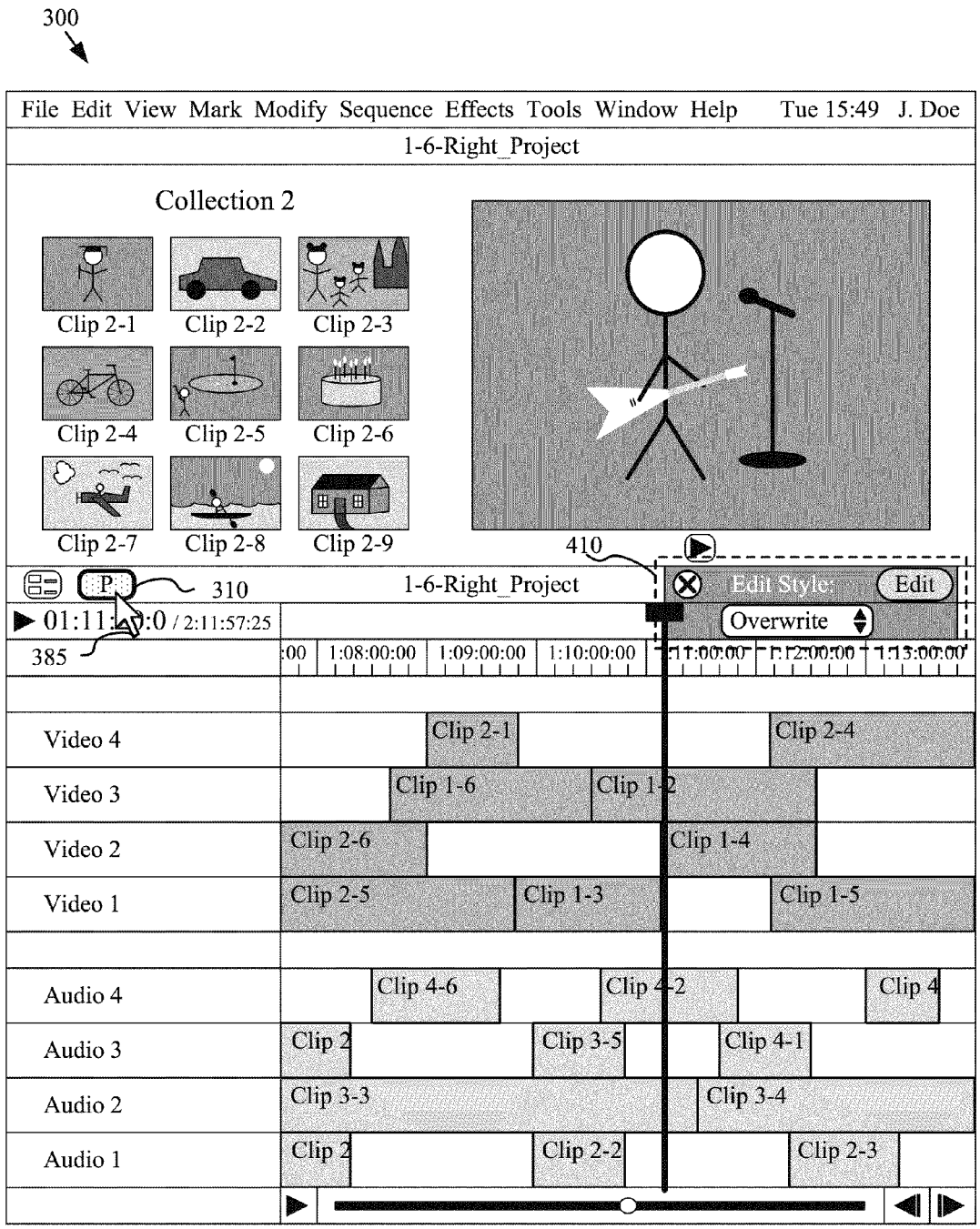
FIG. 4 illustrates the GUI of some embodiments after a user has invoked the preview tool using a preview selection item.

FIG. 4 illustrates a second stage of user interaction that is after a user has moved the cursor 385 to a location over the preview selection item 310 and selected this item (e.g., by left-cursor click operation). As shown, this selection has caused the preview tool 410 to be displayed. In some embodiments, once the preview tool has been invoked, it will be displayed until it is either deactivated or any preview edits are committed to the composite presentation. As shown, the preview tool 410 displays a particular edit style (e.g., "overwrite") when invoked. As further described below, in reference to FIGS. 20-31, the edit styles that may be accessed using the preview tool 410 in some embodiments include "overwrite," "insert," "replace," "exchange," "superimpose," etc. Different embodiments may include different edit styles. In the example of FIG. 4, one style ("Overwrite") is presented in the preview tool 410 as a default selection, while other available edit styles may be selected using the various controls of the preview tool 410.

Figure 5:
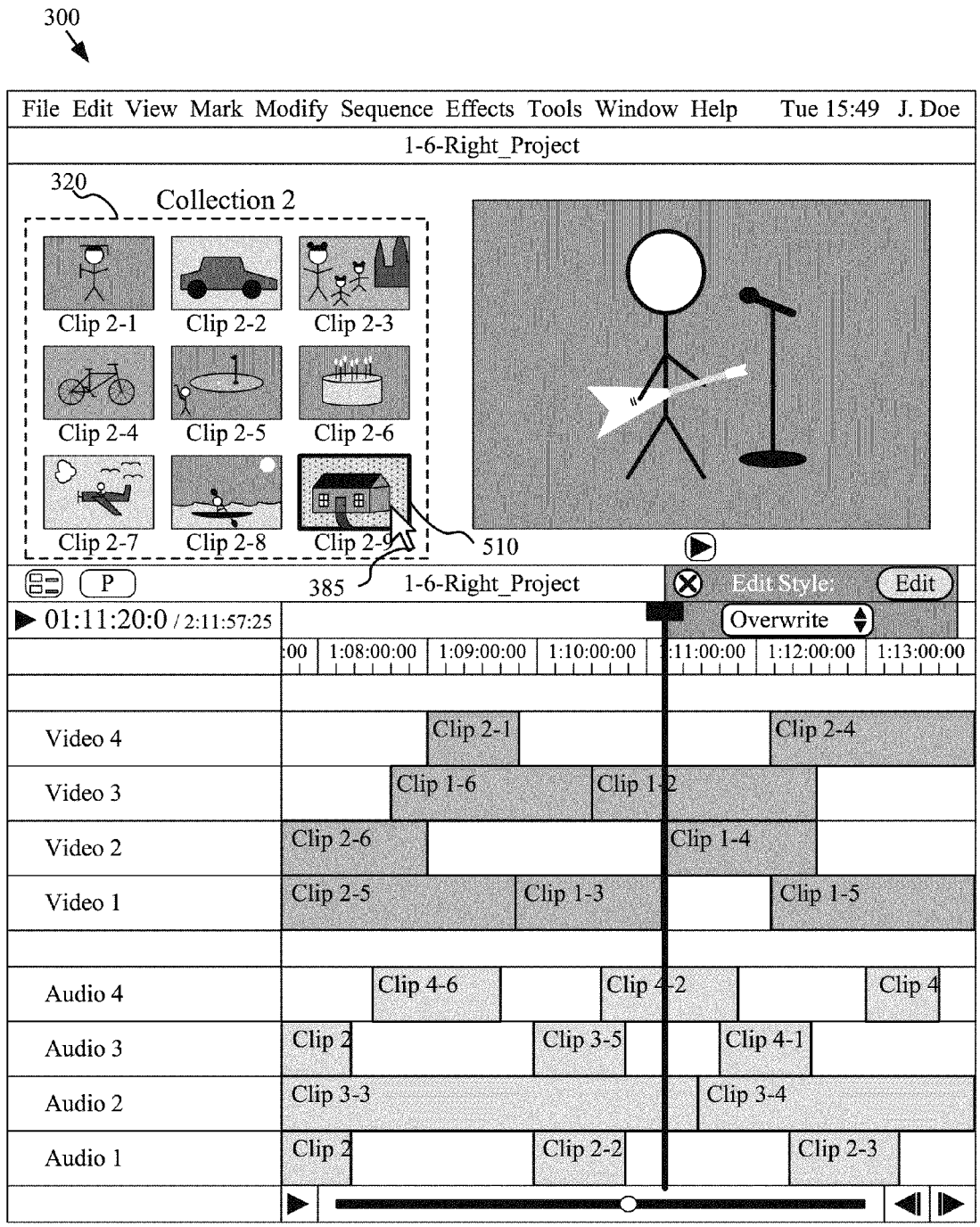
FIG. 5 illustrates the GUI of some embodiments after a user has selected a particular clip from the media library.

FIG. 5 illustrates a third stage of user interaction that is after a user has selected a particular clip 510 from the media library 320. The selection of clip 510 has been indicated by displaying a thicker border around the clip and highlighting the background of the selected clip. In some embodiments, the user selects a particular clip using a left-cursor click operation after positioning the cursor 385 over the desired clip. One of ordinary skill in the art will recognize that other cursor-control operations may be used to select a particular clip from the media library 320. For instance, a user may perform a combination of keystrokes, use a hotkey to select a particular clip, etc.

Figure 6:
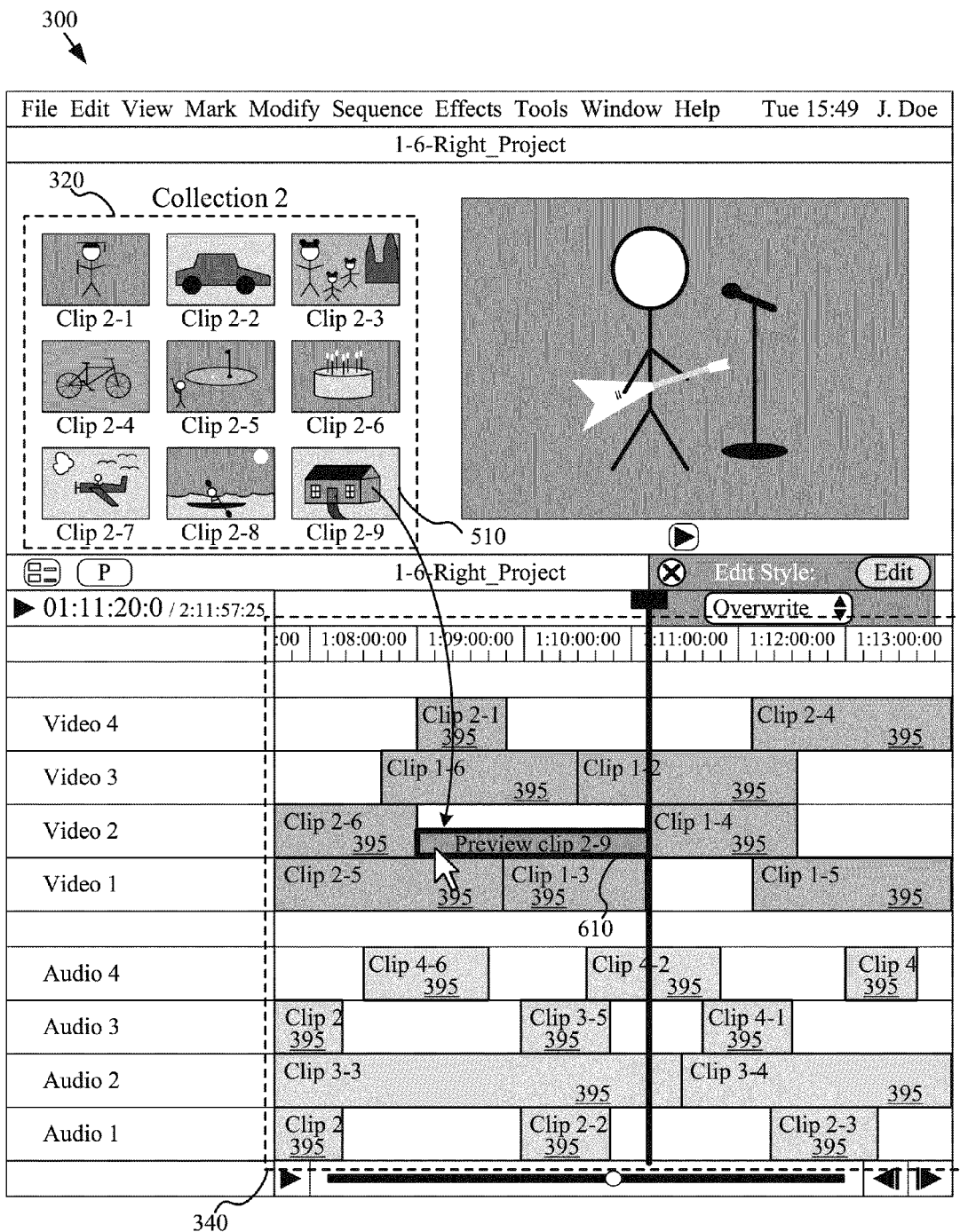
FIG. 6 illustrates the GUI after a user has dragged the selected clip to a modified timeline in some embodiments.

FIG. 6 illustrates a fourth stage of user interaction that is after a user has dragged the selected clip 510 from the media library 320 to the composite display area 340 and released the selected clip 510. This dragging-and-dropping results in the addition of the candidate clip 610 to the composite display area 340 without affecting the composite presentation that is displayed in that area (i.e., no committed clips 395 were eliminated, nor were their positions in the composite display area 340 altered to add the candidate clip 610). However, the candidate clip 610 has been added by using a differently sized and colored rectangle than the rectangles used to represent the committed clips 395. As mentioned above in reference to FIG. 2, different embodiments may differentiate between candidate and committed clips in different ways.

Some embodiments will automatically "snap" the added clip to a particular position on the timeline. In the example of FIG. 6, the preview clip 610 is shown as exactly filling the area between two existing clips. One of ordinary skill will recognize that in other cases, the clip may be longer or shorter than an available space and thus may overlap with clips that are already in the composite display area 340, or leave a gap to an existing clip or clips.

FIGS. 7-10 illustrate another example of adding a candidate clip. In this example, a particular media clip is added to a particular video track at a particular location of the playhead through the invocation of a command from the menu bar 380 of the GUI 300 of the media editing application. The GUI 300 is the same GUI 300 described above in reference to FIGS. 3-6. Also, to illustrate the example of adding a candidate clip to the composite display area through the use of menu bar 380, FIGS. 7-10 explain four different stages of a user's interaction with the GUI 300.

Figure 7:
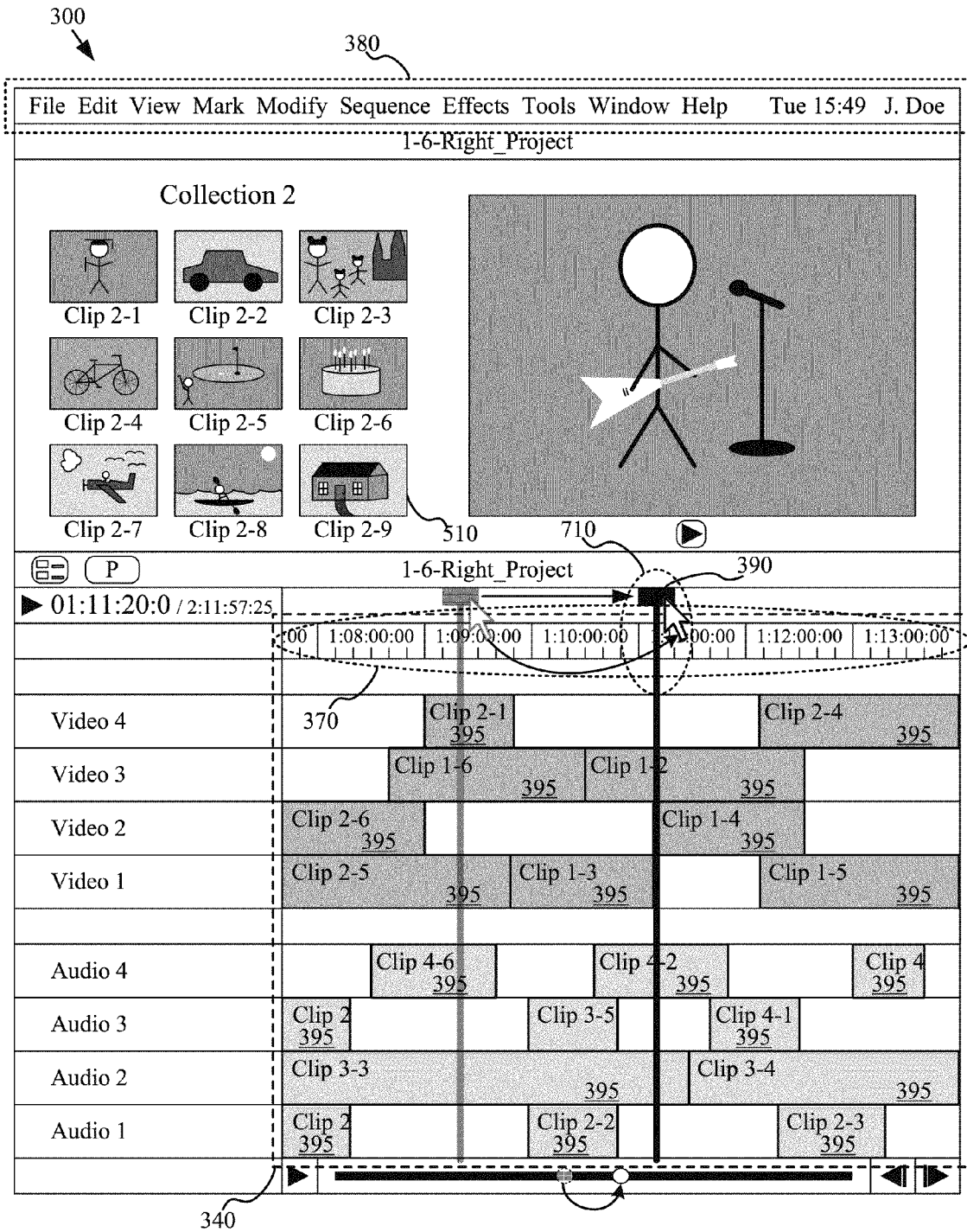
FIG. 7 illustrates the GUI of some embodiments.

FIG. 7 illustrates a first stage that is before any candidate clip has been added to the composite display area 340. In this stage, the composite display area 340 displays a number of committed clips 395 along the timeline 370. The committed clips 395 include several audio clips and several video clips. A user might have added these clips 395 from the media library 320, or the user might have opened a previously defined composite project that included the clips 395.

As shown in FIG. 7, a user may position the playhead 390 at a particular location 710 along the timeline 370, before adding the candidate clip to the composite display area. A user may wish to select the particular location 710 for the playhead 390 because a particular candidate clip may be placed at the playhead's current location when the candidate clip is added to the composite display area. The user may position the playhead using a drag-and-release operation as shown, or by some other method (e.g., a combination of keystrokes, a direct selection caused by a left-cursor click operation, etc.).

Figure 8:
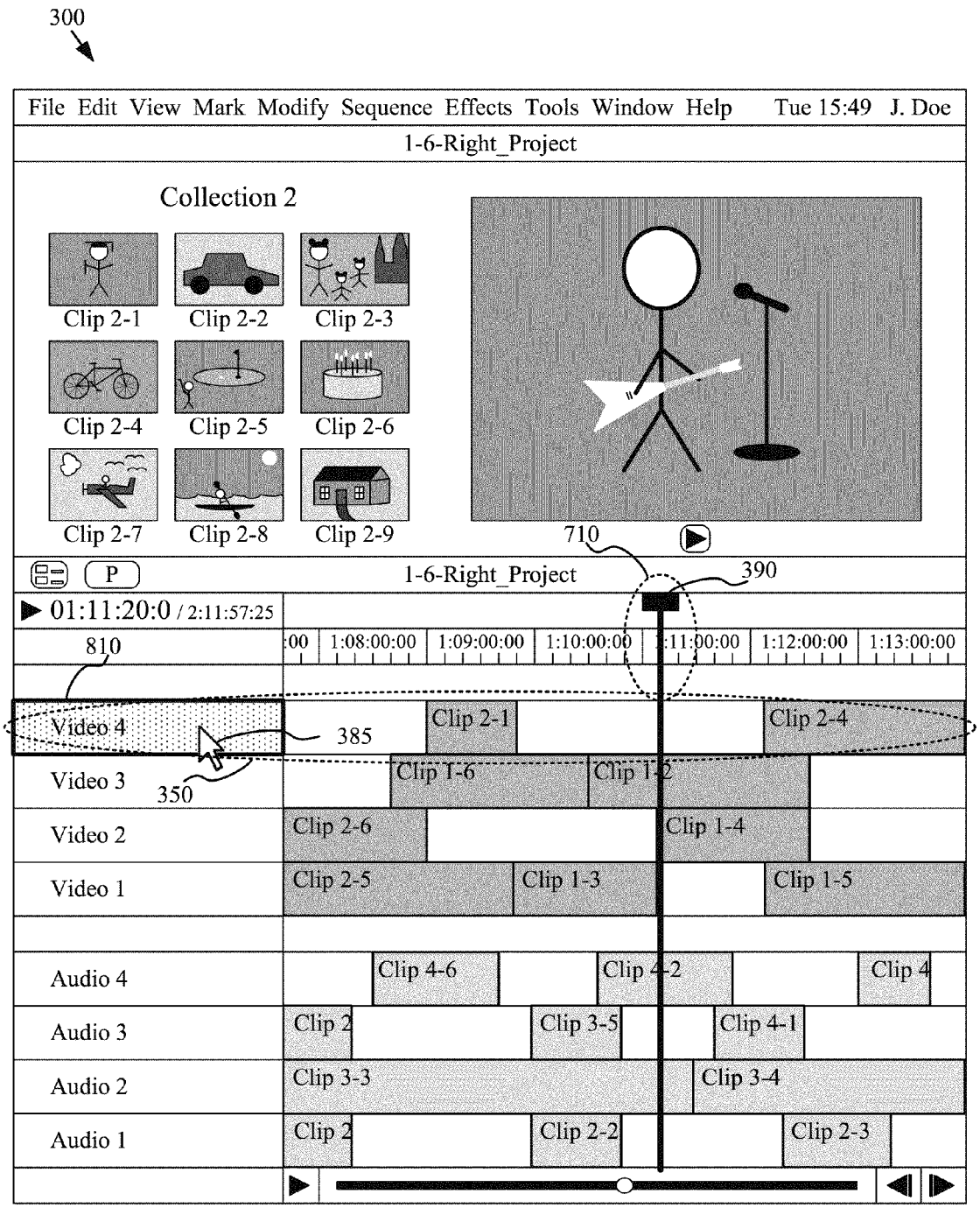
FIG. 8 illustrates the selection of a track using the GUI of some embodiments.

FIG. 8 illustrates a second stage of user interaction after the user has moved the playhead 390 to the new location 710. In this stage, the user selects the fourth video track 350 as the track in the composite display area for later receiving the candidate clip 510. The user makes this selection by moving the cursor 385 to a location 810 over the track 350 and performing a click operation. As shown, this selection operation has caused a change in the graphical representation of the selected track 350 relative to the other tracks. The selected track may be indicated in various ways, such as a bold outline, a change in background, a change in color, etc. In some embodiments, the track 350 may also be selected through any number of other techniques, such as a combination of keystrokes, a pull-down or pop-up menu selection, etc.

Figure 9:
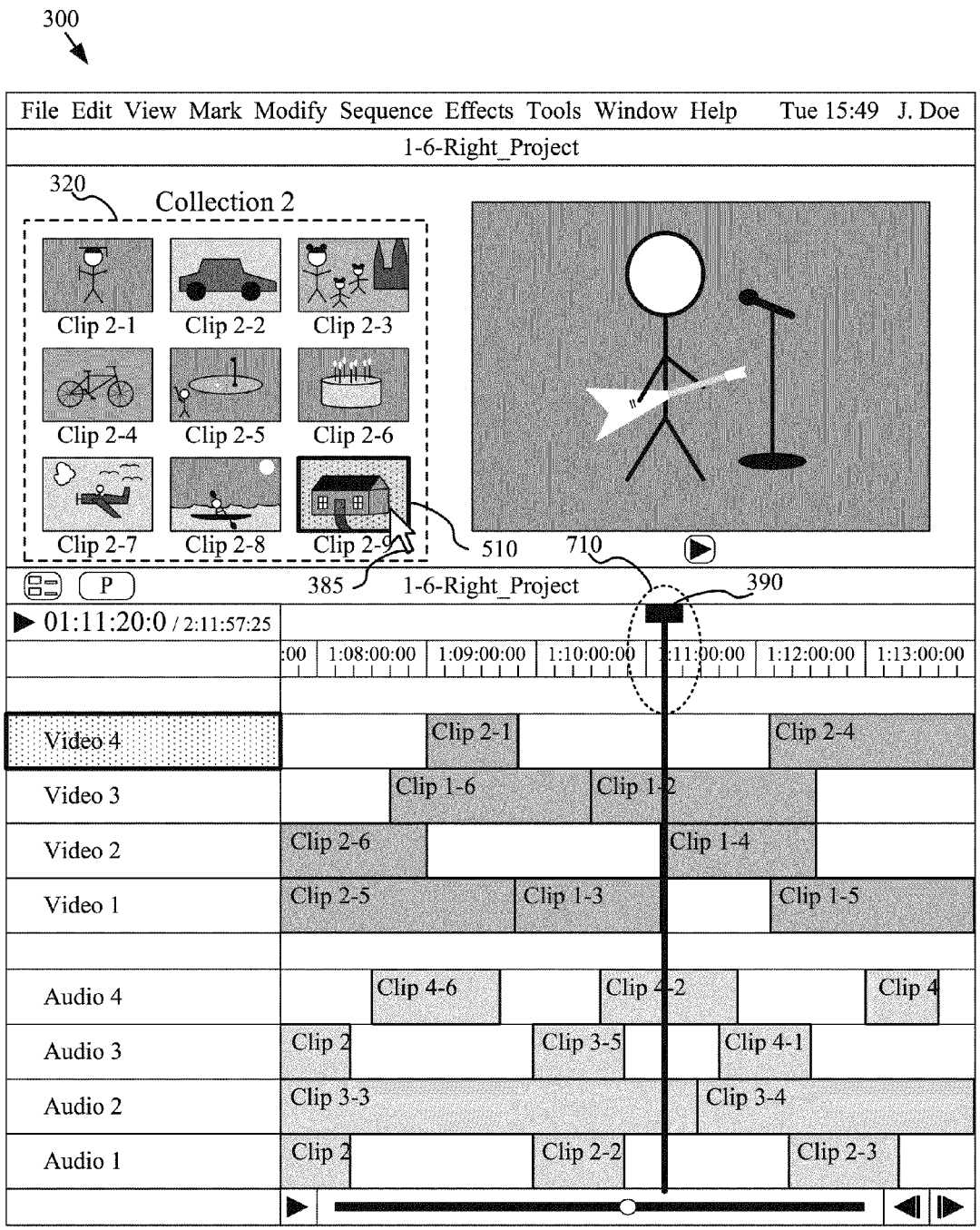
FIG. 9 illustrates the GUI of some embodiments after a user has selected a particular clip from the media library.

FIG. 9 illustrates a third stage of user interaction after the user has selected the fourth video track 350. In this stage, the user selects, from the media library 320, a video clip 510 to be added to the selected video track 350 at the particular location 710 of the playhead 390. In this example, the user made this selection by positioning the cursor 385 over a particular clip 510 in the media library 320 and performing a click operation. However, in some embodiments, the user might also make this selection through other GUI operations (e.g., a combination of keystrokes, a pull-down or pop-up menu selection, or other appropriate method).

As shown in FIG. 9, the selection of the video clip 510 causes a change in the graphical representation of the selected clip 510 relative to the other clips. The selected clip may be indicated in various ways, similar to the indication of a selected track described above in reference to FIG. 8.

Figure 10:
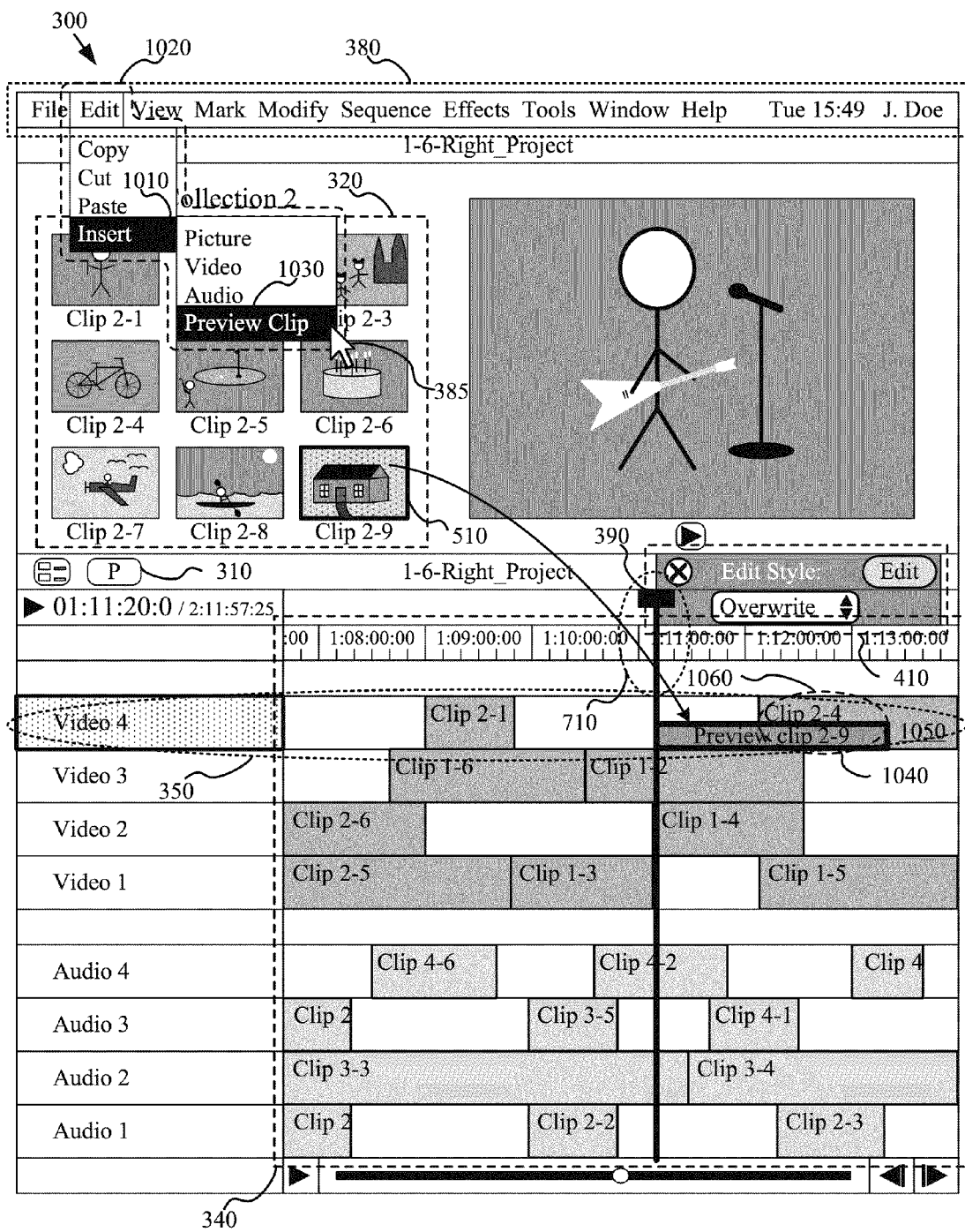
FIG. 10 illustrates the use of a pull-down menu to insert a particular clip as a candidate clip into a composite display area of some embodiments.

FIG. 10 illustrates a fourth stage that is after the user has selected the media clip 510 from the media library 320. In this stage, the user selects a GUI command to add the selected clip 510 as a preview clip to the selected track 350 at the playhead location 710. The selection in this example is made by first selecting the "insert" option 1010 in the "edit" set of menu commands 1020 of the menu bar 380 and then selecting the "preview clip" command 1030 using the cursor 385. Some embodiments allow the user to select the "insert as preview clip" command through other mechanisms (e.g., by selecting the command in a pop-up menu).

As shown in FIG. 10, this selection operation has caused a representation 1040 of clip 510 to be placed in the composite display area 340 at the playhead 390 location 710 in the selected track 350 and also invoked the preview tool 410.

Although the inserted clip 1030 overlaps an existing clip 1050 in the composite display area 340, the existing clip representation 1050 is not displaced by the preview clip 1040. Normally, when inserting a committed clip into the timeline, any overlapping area of another committed clip in the same track is overwritten (both in the displayed representation and in the underlying project data). The representation of the preview clip 1040, in contrast, allows a user to manipulate the preview clip without affecting the descriptive nature of the display of the representation of the existing committed clip 1050.

Figure 11:
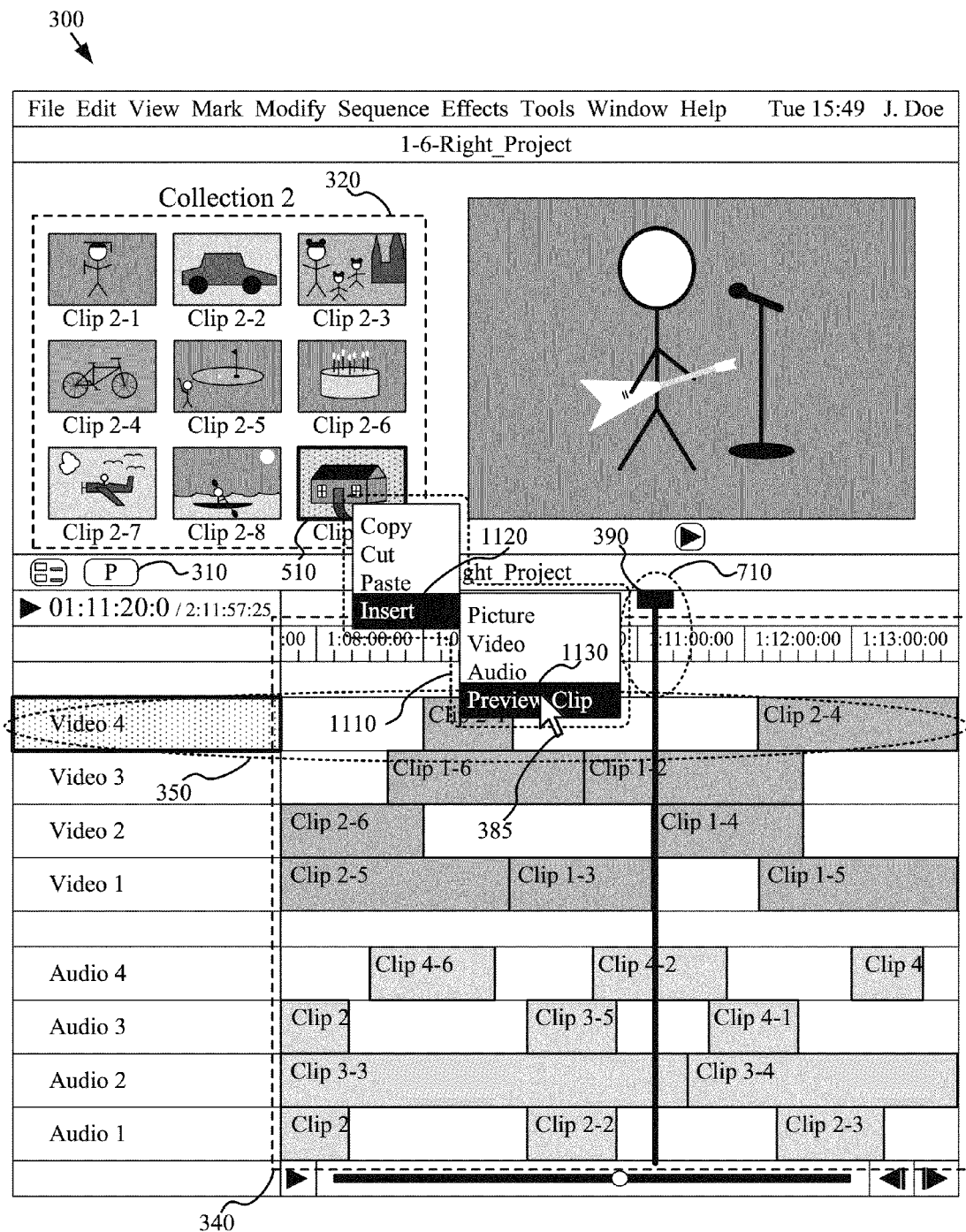
FIG. 11 illustrates the GUI of some embodiments after a user has invoked a pop-up up menu.
Figure 12:
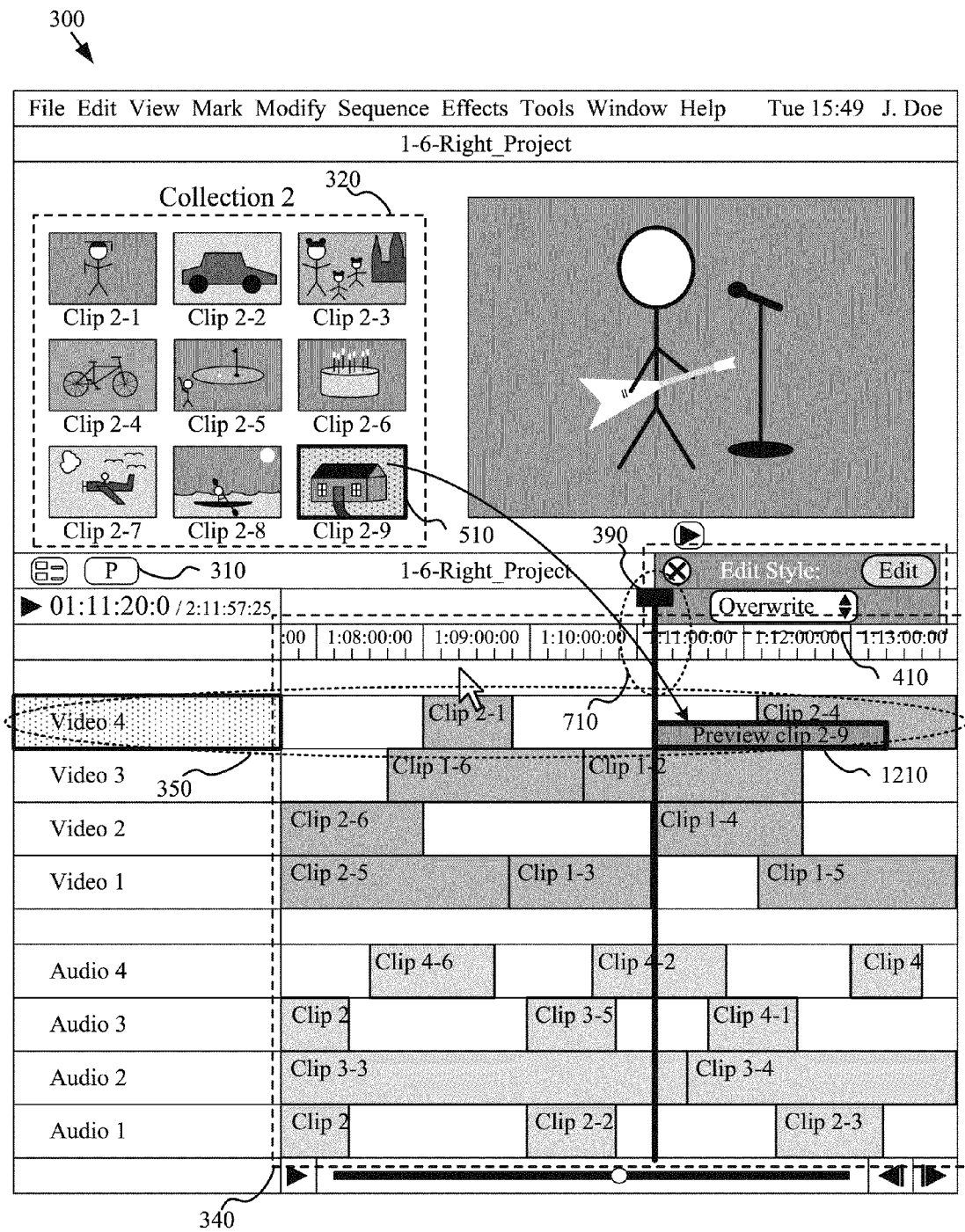
FIG. 12 illustrates the use of a pop-up menu to insert a particular clip as a candidate clip into a composite display area of some embodiments.

FIGS. 11-12 illustrate an additional example of adding a candidate clip to a composite project. In this example, a particular media clip is added to a particular video track at a particular location of the playhead through the invocation of a command from a pop-up menu of the GUI 300. The GUI 300 is the same GUI 300 described above in reference to FIGS. 3-10. To illustrate the example of adding a candidate clip to the composite display area through the use of pop-up menu 1110, FIGS. 11-12 describe two different stages of a user's interaction with the GUI 300. These two stages follow the first and second stages described above in reference to FIGS. 7-8.

FIG. 11 illustrates a third stage of user interaction after the user has selected the fourth video track 350. In this stage, the user selects, from the media library 320, a video clip 510 to be added to the selected video track 350 at the particular location 710 of the playhead 390 and also selects a GUI command to add the selected clip 510 as a preview clip. The selection of a video clip in this example is made by positioning the cursor 385 over a particular clip 510 in the media library 320 and performing a right-cursor click operation to both select the particular clip 510 and invoke a pop-up menu 1110. The selection of the particular clip may be made in various ways, including using a left-cursor click operation as described above in reference to FIG. 9.

In the third stage, after selecting the clip 510 and invoking the pop-up menu 1110, the user selects a GUI command to insert the selected clip 510 as a preview clip. The selection in this example is made by first selecting the "insert" command 1120 in the pop-up menu 1110 and then selecting the "preview clip" command 1130 using the cursor 385. Different embodiments may have different menu commands or different access paths for those commands. In addition, some embodiments allow the user to select the "insert as preview clip" command through other mechanisms (e.g., by selecting the command in a pull-down menu as described above in reference to FIG. 10).

FIG. 12 illustrates a fourth stage that is after the user has selected a GUI command 1130 to insert the selected clip 510 as a preview clip. In this stage, a representation of a candidate clip 1210 has been added to the composite display area 340. As shown, the representation 1210 of clip 510 has been placed in the composite display area 340 at the playhead 390 location 710 in the selected track 350 and the preview tool 410 has also been invoked (and displayed in the GUI 300).

In addition to the ways described above in reference to FIGS. 3-12, other embodiments may insert candidate clips (or committed clips) using a variety of methods. For instance, a combination of keystrokes, use of "hotkeys", or another appropriate method may be used to select and insert a clip into a particular location of the timeline.

B. Process Used to Add Clips

Figure 13:
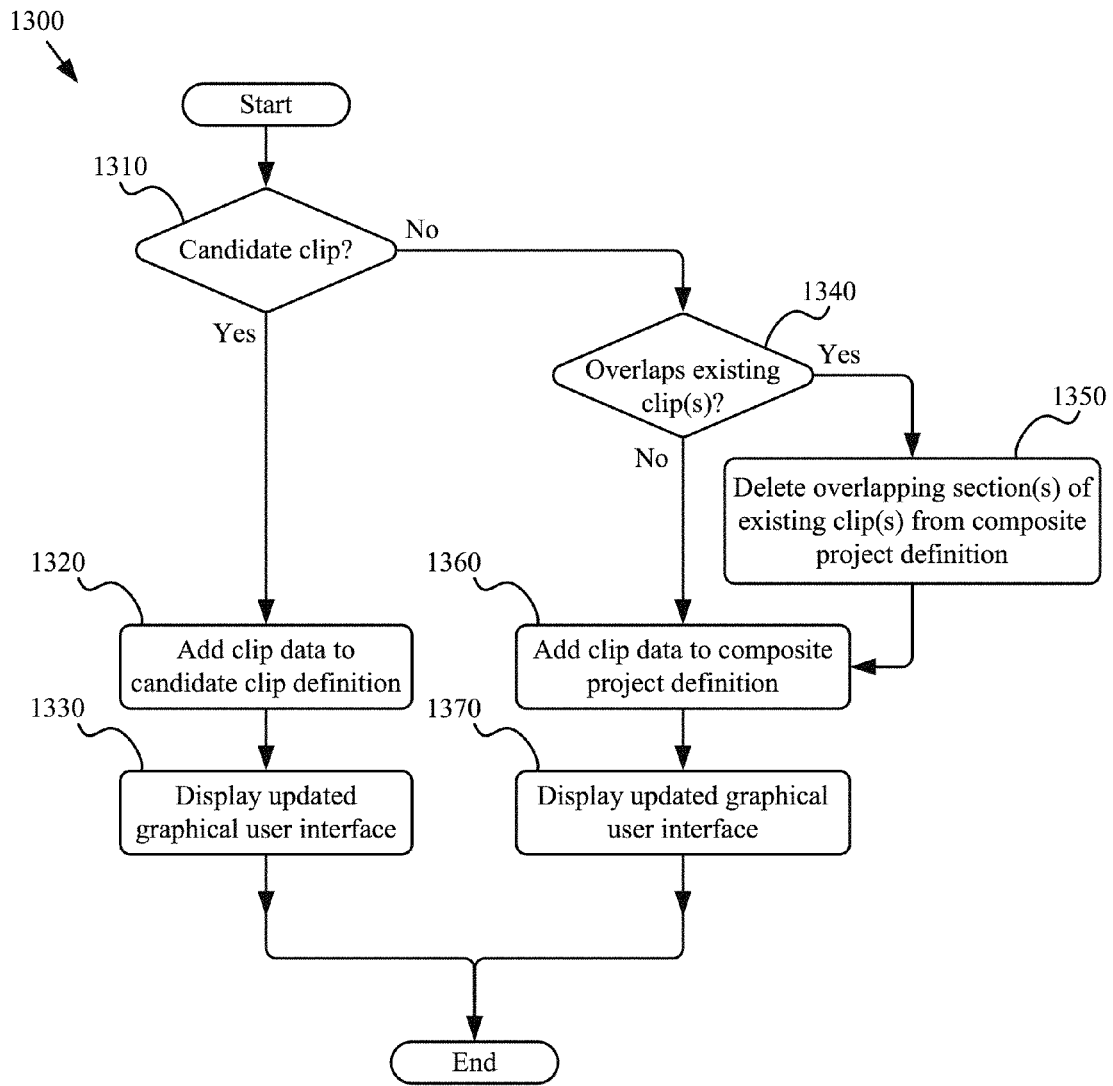
FIG. 13 illustrates a conceptual process of some embodiments used to add a clip to a media project.

FIG. 13 illustrates an example of a conceptual process 1300 that some embodiments perform when a request is made to add media content to the composite display area. The process 1300 starts when the media editing application receives a request to add a clip to the media project. The request to add a clip may be received in various ways. For example, the drag-and-drop, pull-down menu, or pop-up menu operations described above in reference to FIGS. 3-12 may be used to request that a clip be added to the composite display area.

As described above, the process of selecting and adding a clip may be performed using a variety of operations. Thus, one of ordinary skill will recognize that in some embodiments, the process may determine whether the clip to be added is a preview clip before the clip has been selected. Or, the operations of receiving a selection and determining whether the clip is to be added as a candidate clip may be performed at the same time based on a single user action.

In addition, process 1300 is a conceptual representation of the operations used when a clip is added to a media project. The specific operations of the process may not be performed in the exact order described or different specific operations may be performed in different embodiments. Also, the process may not be performed as one continuous series of operations. Furthermore, the process could be implemented using several sub-processes, or as part of a larger macro-process.

After receiving a request to add a clip, the process determines (at 1310) whether the clip is a candidate clip. When determining (at 1310) that the clip to be added is a candidate clip, process 1300 adds (at 1320) data to the candidate clip definition (e.g., data structure(s) that define data for any candidate clip(s) that will not be included in the composite presentation).

Figure 14:
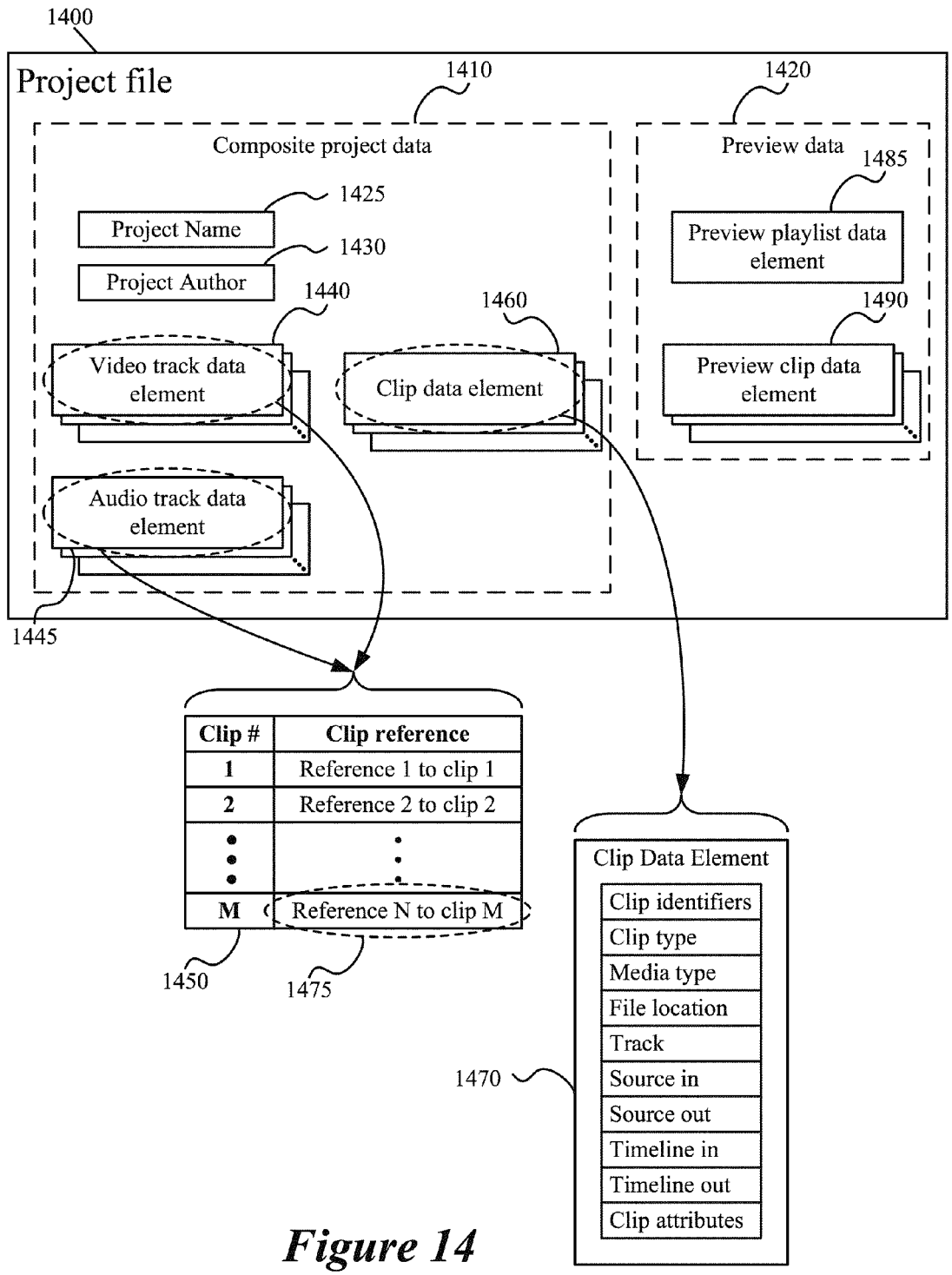
FIG. 14 conceptually illustrates the data structures used to implement some of the functions and procedures of some embodiments.

As mentioned above, in some embodiments, the candidate clip definition is not part of the composite project data. To illustrate this point, FIG. 14 provides a conceptual illustration of a project file. Specifically, this figure illustrates a project file 1400 that includes composite project data 1410 (alternatively referred to as a "composite project definition") used to generate a composite presentation and preview data 1420 (alternatively referred to as a "candidate clip definition") used to generate a preview presentation. The composite project data 1410 may include attributes such as the project name 1425, author 1430, etc. In addition, the composite project data 1410 may include video track data elements 1440 and audio track data elements 1445 for storing information corresponding to various clips that have been placed in the different tracks. These audio and video track data elements 1440-1445 are shown in more detail in breakout section 1450. The composite project data 1410 may also include multiple clip data elements 1460 that are shown in more detail in breakout section 1470.

As shown in FIG. 14, the preview data 1420 is separate from the composite project data 1410. The preview data 1420 may include a preview playlist data element 1485 and preview clip data elements 1490 in some embodiments. The preview clip data elements use the same structure as the clip data elements 1470 in some embodiments, with the clip type specifying that the clip data element corresponds to a preview clip.

After the data corresponding to the preview clip has been added (at 1320) to the candidate clip definition, the process displays (at 1330) an updated GUI. The updated GUI may show a new representation of a candidate clip in the composite display area. In addition to (or in place of) being performed following the addition of clip data to the composite project definition, display operation 1330 may be performed in response to certain user actions or commands, at regular time intervals, etc. In addition, the updated GUI may be at least partially generated based on the updated composite project definition.

This display of an updated GUI was described above in reference to FIGS. 6, 10, and 12, where the newly added candidate clip did not completely overwrite or displace any existing display representation of any overlapping section(s) of committed clip(s). Thus, when adding a candidate clip, both the display and the underlying data in the candidate clip definition may be updated based on the addition of a candidate clip. After the process updates (at 1320) the candidate clip definition and displays (at 1330) the updated graphical user interface, the process ends.

When determining (at 1310) that the clip is not a candidate clip, the process next determines (at 1340) whether any section of the added clip overlaps any section(s) of any existing clip(s) in the composite display area. The process may determine whether any section of the added clip overlaps any section of an existing clip by evaluating the track data elements 1440-1445 from the composite project data 1410 of the project file 1400. Thus, process 1300 may determine (at 1340) whether any clip sections overlap by evaluating each track data element 1450 to identify and retrieve each of the clip data elements 1470 corresponding to each clip reference 1475 in a particular track data element 1450. This determination may involve evaluating neighboring clips in the same track data element 1450 to, for instance, determine if one clip's timeline out occurs after another clip's timeline in. In addition to determining (at 1340) whether any clip sections overlap, the process may determine (not shown) which sections of the clips overlap.

When the process determines (at 1340) that the added clip does overlap section(s) of existing clip(s), the process deletes (at 1370) the overlapping section(s) of the existing clip(s) from the composite project definition (e.g., data structure(s) that define the composite presentation). The process may "delete" (at 1370) the overlapping section(s) by, for instance, modifying the particular clip data element's 1470 timeline in or timeline out entry, thus removing any overlapping section of the clip.

After deleting (at 1370) any overlapping section of an existing clip from the composite project definition, or determining (at 1340) that no sections overlap, the process adds (at 1360) data to the composite project definition corresponding to the clip to be added. The data structure for the clip in the composite project definition may take different forms, one of which is the clip data element 1470 shown in FIG. 14.

After the data has been added (at 1360) to the composite project definition, the process displays (at 1370) an updated GUI. The updated GUI may show a new representation of a committed clip in the composite display area. Similar to the display operation 1370 described above, the display operation 1370 may be performed in response to certain user actions or commands, at regular time intervals, etc. In addition, the updated GUI may be at least partially generated based on the updated composite project definition.

Figure 1:
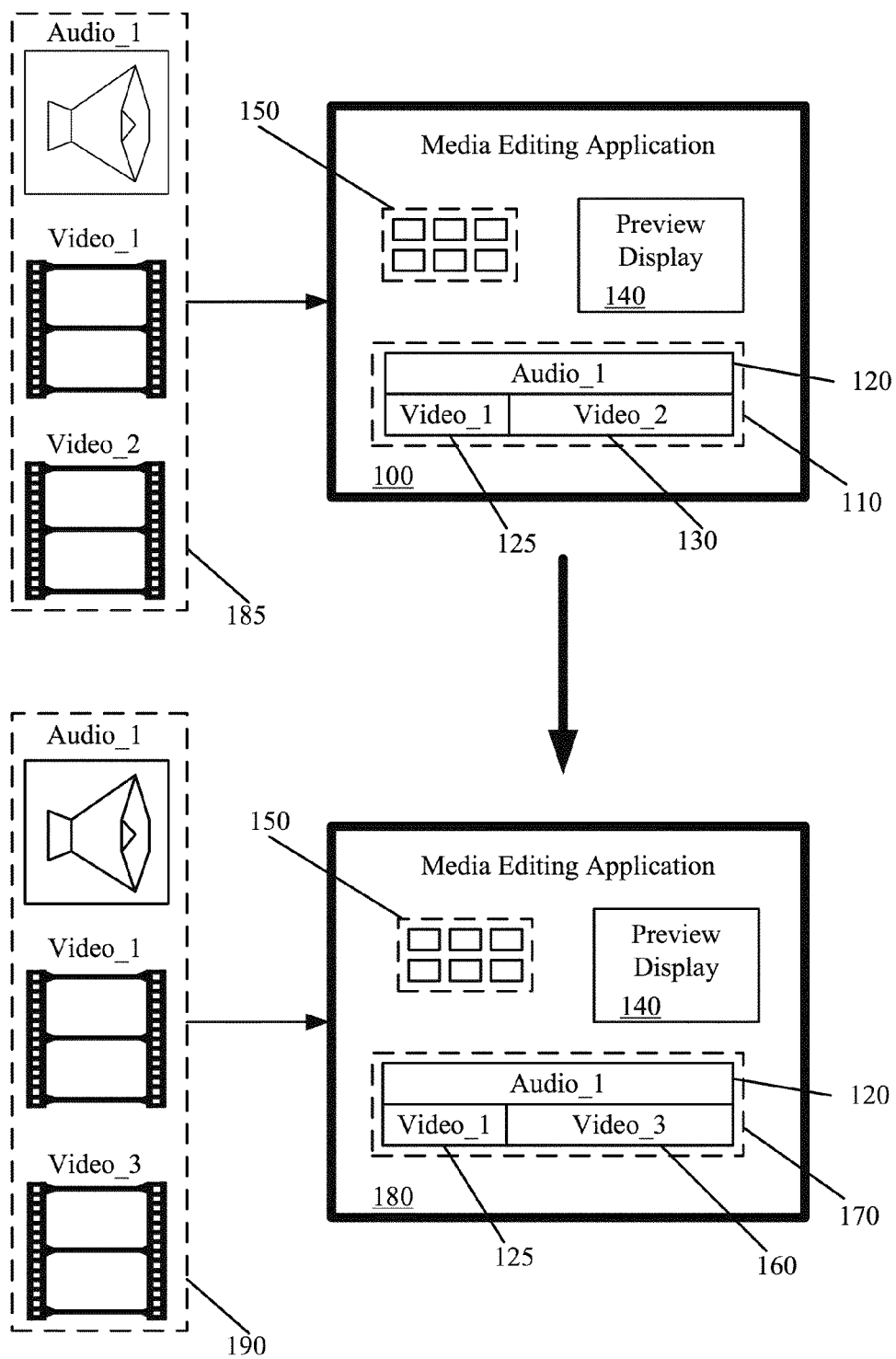
FIG. 1 illustrates a typical media editing application.

The result of this display update operation was illustrated above in FIG. 1, where the existing clip representation was completely replaced by a representation for a newly added committed clip that completely overlapped the existing clip. Thus, when adding a committed clip, both the display and the underlying data in the composite project definition may be updated based on the addition of a committed clip. After the process updates (at 1360) the composite project definition and displays (at 1370) the updated graphical user interface, the process ends.

One of ordinary skill in the art will recognize that the actual implementation may differ from the conceptual representation show in FIG. 14. For instance, the actual project file may also include a committed playlist data element similar to the preview playlist data element 1485, the project file may include other file attributes, or data structures that are arranged differently or include different specific elements than are shown in FIG. 14. As another example, the preview data 1420 may include a set of video and audio track data elements that allow a user to move committed and/or candidate clips along the timeline or among the tracks without affecting the track data elements 1440-1445 that are part of the composite project data 1410.

In addition, although the preview data 1420 is represented as being part of the project file 1400, in some embodiments the preview data 1420 is not saved unless a user commits the preview edit(s) to the composite project. In other embodiments, the preview data 1420 may be saved as preview data (i.e., saved without affecting the composite project data 1410). Alternatively, some embodiments may allow the user to save preview data 1420 in a separate file location from the composite project data 1410.

Furthermore, although the process of adding a clip has been described with references to certain features and actions, one of ordinary skill in the art will recognize that the process may be implemented using other specific embodiments without departing from the spirit of the invention. For instance, the process could initially add all clips as preview clips before receiving another indication causing the preview clip to be converted to a committed clip. In addition, some potential operations have been omitted for clarity. For instance, after inserting one or more clips, a user may choose to save the composite project data before continuing. In the next section, various editing functions that may be used on the added candidate or committed clips are described. Furthermore, some embodiments of the process may determine if the added candidate clip overlaps an existing candidate clip in the same track and delete the overlapping section of the existing candidate clip from the candidate clip definition. Other embodiments, however, may allow candidate clips to overlap in the same track.

II. Edit Functions

Several edit operations that may be performed on the committed and/or candidate clips shown in the composite display area are described below. Sub-section II.A describes various "live-edit" functions that are commonly performed on committed clips and may also be applied to candidate clips in conjunction with the preview tool of some embodiments. In addition, sub-section II.A describes the operations of selecting a committed clip and converting that clip to a candidate clip. Sub-section II.B describes several different "edit styles" that may be selected using the preview tool of some embodiments. These edit styles include a pre-defined set of editing functions that may be applied to candidate clips. Sub-section II.C will describe a conceptual process used by some embodiments when an edit is made to a clip in the composite display area.

A. Live-Edit Functions

Figure 15:
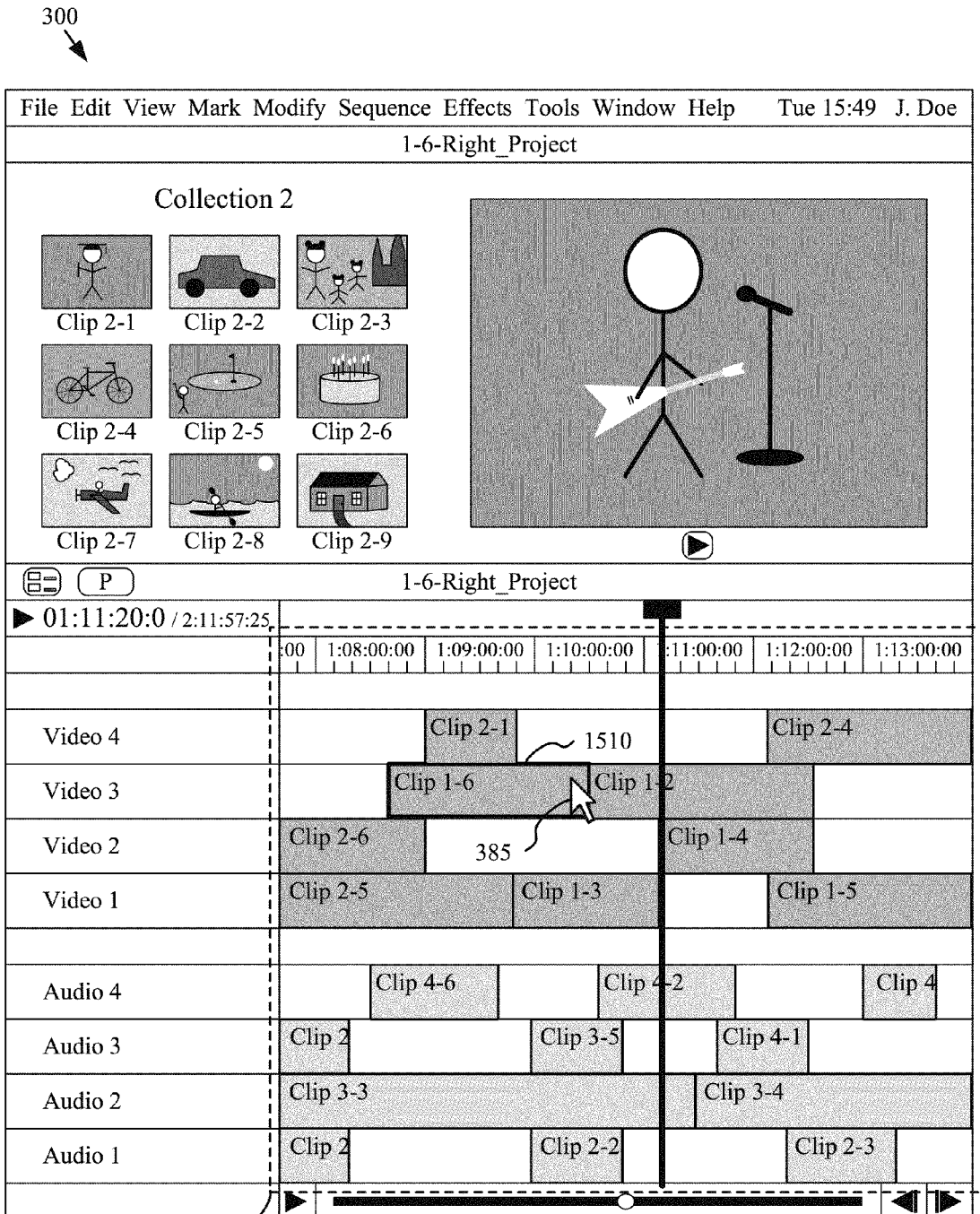
FIG. 15 illustrates the selection of a particular clip in an example timeline of some embodiments.
Figure 16:
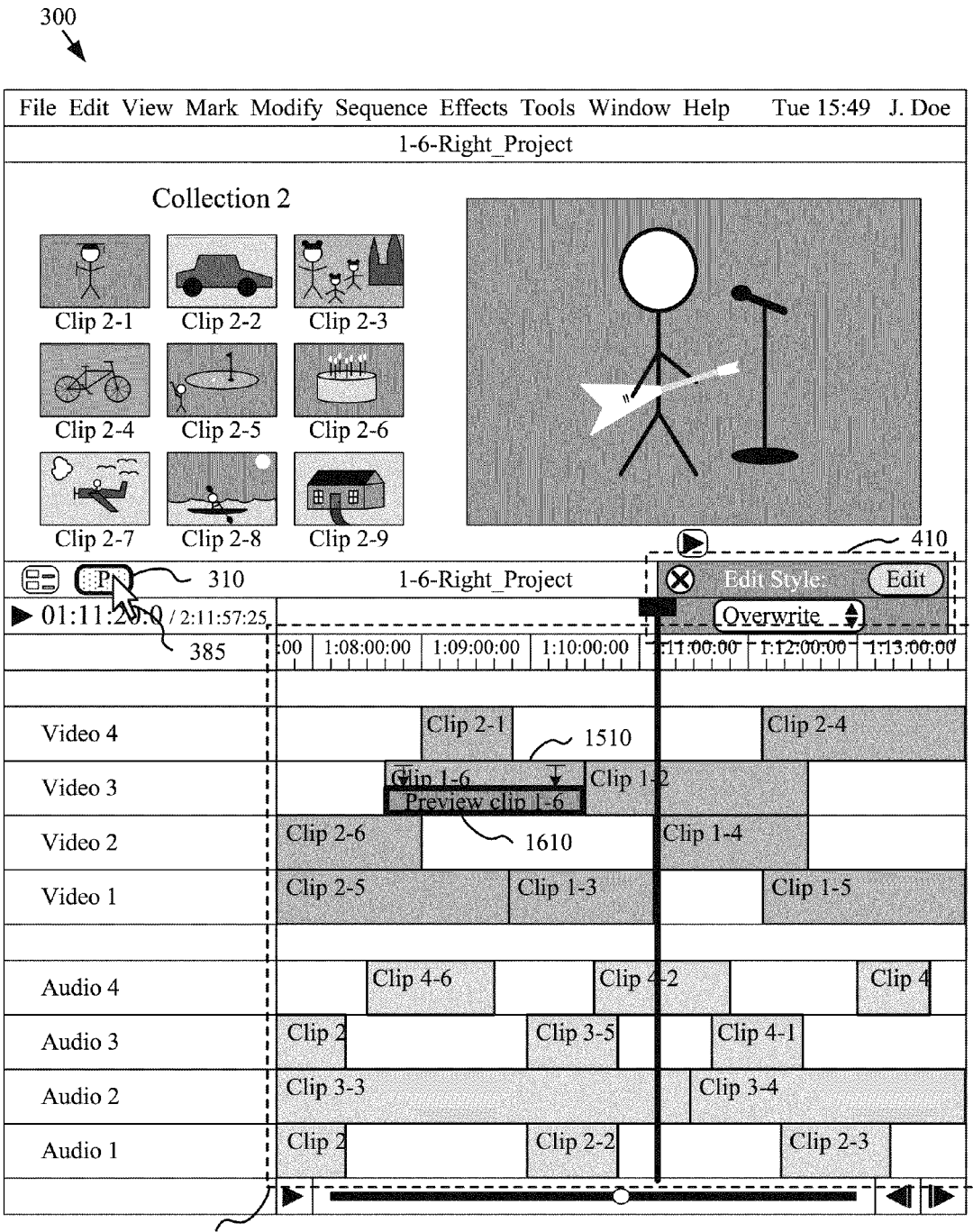
FIG. 16 illustrates the indication of some embodiments that a clip has been modified from a committed clip to a candidate clip.

FIGS. 15-16 illustrate an example of converting a committed clip to a candidate clip. In this example, a particular clip is converted from a committed clip to a candidate clip through the invocation of the preview tool selection item 310 of the GUI 300. The GUI 300 is the same GUI described above in reference to FIGS. 3-12. To illustrate the example of converting a committed clip to a candidate clip using a pop-up menu, FIGS. 15-16 describe two different stages of a user's interaction with the GUI 300.

FIG. 15 illustrates a first stage that is before any committed clip has been converted to a candidate clip. In this stage, the user selects a particular committed clip 1510 in the composite display area 340 as the clip to be converted to a candidate clip. The user makes this selection by positioning the cursor 385 over the representation of the clip 1510 in the composite display area 340 and performing a click operation. As shown, this selection operation has caused a change in the graphical representation of the selected clip 1510 relative to the other clips. The selected clip may be indicated in various ways, such as a bold outline, a change in background, a change in color, etc. In some embodiments, the clip 1510 may also be selected through any number of other techniques, such as a combination of keystrokes, a pull-down or pop-up menu selection, etc.

FIG. 16 illustrates a second stage of user interaction after the user has selected a particular committed clip 1510 to be converted to a candidate clip. In this stage, the user invokes the preview tool selection item 310 in order to initiate the conversion. In this example, the user invokes the preview tool selection item 310 by moving the cursor 385 to a location over the preview tool selection item 310 and performed a selection operation. As shown, this selection operation has caused a representation of a preview clip 1610 to be added to the composite display area 340 at the same location as the previously-selected committed clip 1510.

In some embodiments, the previously-existing committed clip 1510 may be deleted from the composite display area 340 when the preview clip 1610 is added to the composite display area 340. The determination of whether to delete the selected committed clip 1510 may be made by default, through a user-selected option, or in some other appropriate manner. One reason to add a preview clip in addition to the committed clip 1510, is that the user is able to manipulate the preview clip 1610 without affecting the committed clip 1510 or underlying composite project definition. In this way, a user may evaluate potential changes to a committed clip without affecting the committed clip and thus modifying the composite project definition.

Figure 17:
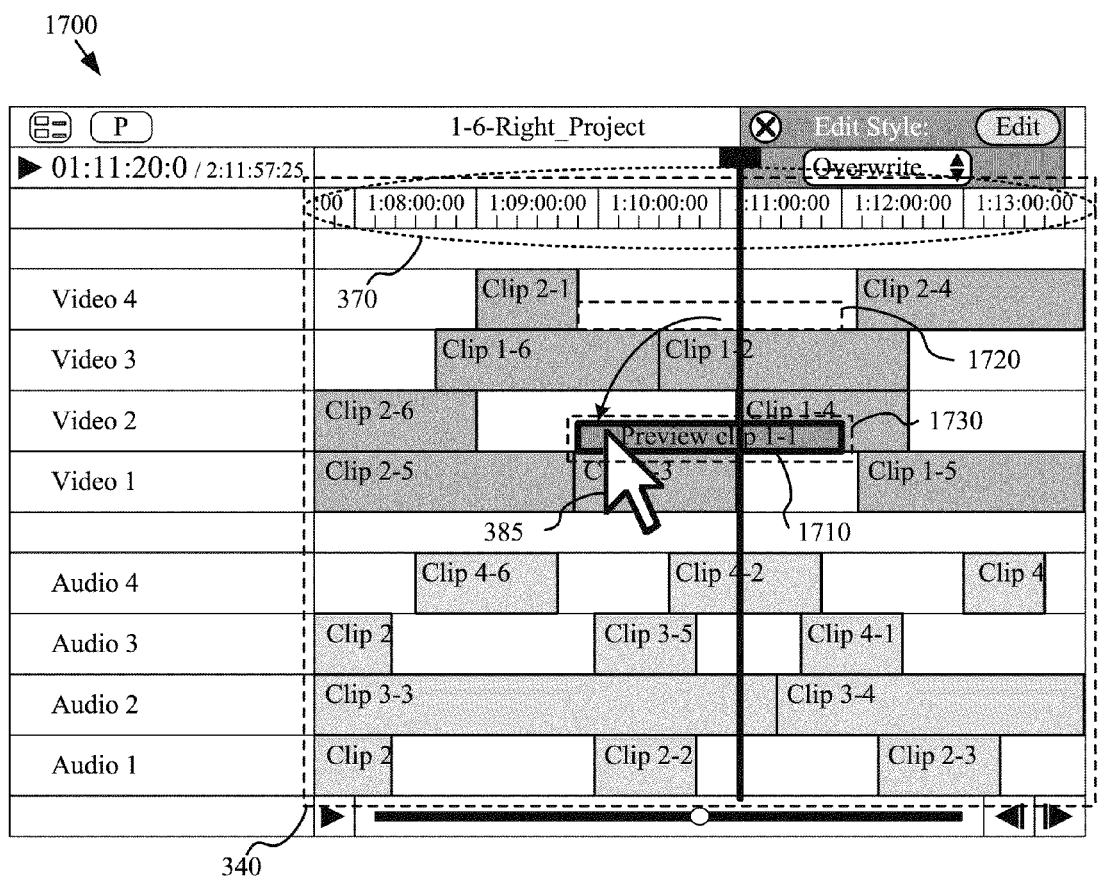
FIG. 17 illustrates an exemplary timeline of some embodiments that includes several committed clips and two candidate clips in various tracks.

FIG. 17 illustrates the operation of moving a candidate clip within a composite display area 340 using a GUI 1700 of some embodiments. Specifically, the figure illustrates a user selecting a particular candidate clip 1710 and moving the particular candidate clip from a first location 1720 in a first track to a second location 1730 in a second track in the composite display area 340. The composite display area 340 is the same composite display area 340 discussed above in reference to FIGS. 3-12 and 15-16. The GUI 1700 is a sub-section of the GUI 300 that was described above in reference to FIGS. 3-12 and 15-16.

As shown in FIG. 17, the particular candidate clip 1710 may be moved from the first location 1720 to the second location 1730 in the composite display area 340 using a drag-and-drop operation. In this example, the user performs the drag-and-drop operation by moving the cursor 385 to a location over the candidate clip 1710 when the candidate clip is displayed at the first location 1720 and performing a selection operation (e.g., by a left-cursor click-and-hold operation). The user then moves the candidate clip 1710 to the second location 1730 using the cursor 385. After the candidate clip 1710 has been moved to the second location 1730, the user may release the selection (e.g., by a left-cursor release operation). As shown, this drag-and-drop operation has caused the representation of the candidate clip 1710 to be moved from the first location 1720 to the second location 1730 in the composite display area 340.

The movement of a candidate clip does not affect the committed track data that the candidate clip may overlap in previous, current, or potential locations that the candidate clip may occupy in the composite display area. One of ordinary skill will recognize that the committed clips may be moved in the same manner as the preview clips. However, moving committed clips will overwrite any overlapping section of any other committed clip.

Figure 18:
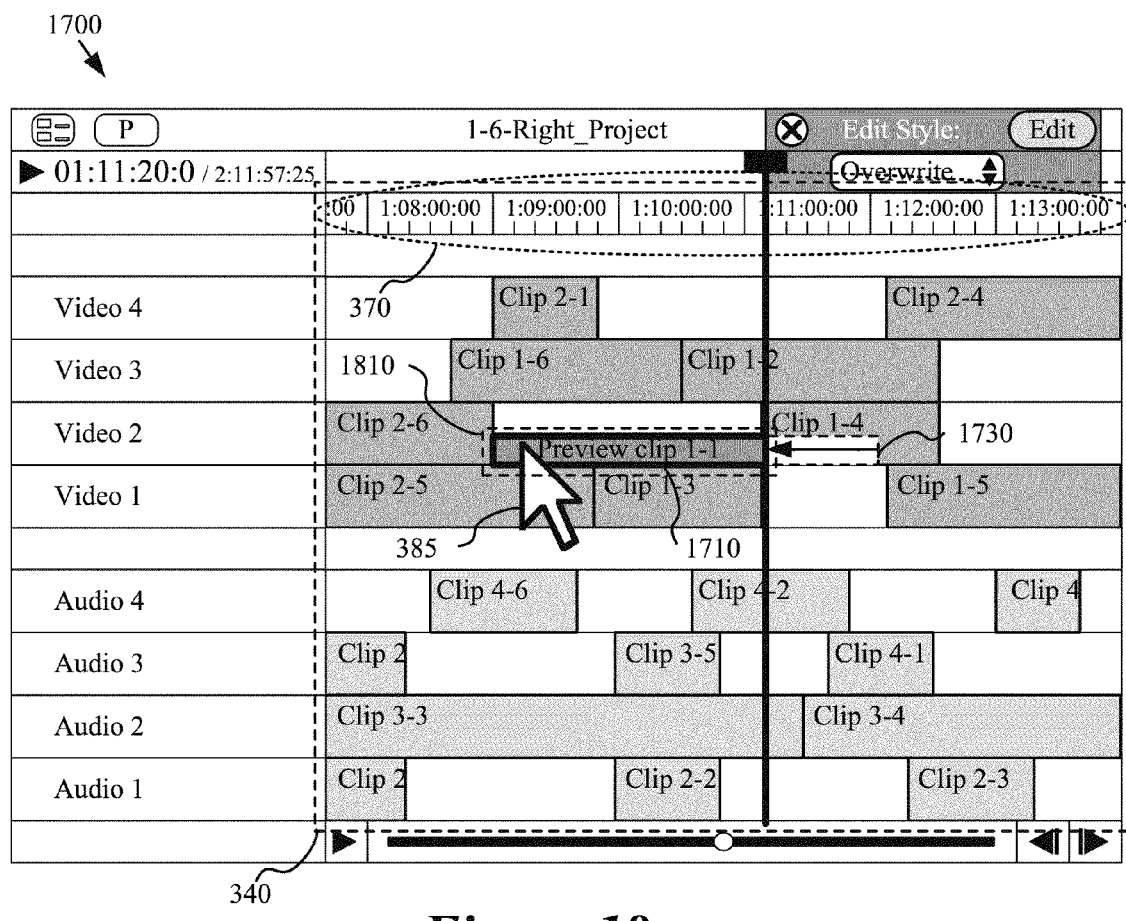
FIG. 18 illustrates the operation of moving a candidate clip within the composite display area using the GUI of some embodiments.

FIG. 18 illustrates the operation of moving a candidate clip within the composite display area 340 using the GUI 1700 of some embodiments. Specifically, the figure illustrates a user selecting a particular candidate clip 1710 and moving the particular candidate clip from a first location 1730 to a second location 1810 in a particular track in the composite display area 340. The composite display area 340 is the same composite display area 340 discussed above in reference to FIGS. 3-12 and 15-17. The GUI 1700 is the same sub-section of the GUI 300 that was described above in reference to FIG. 17.

As shown in FIG. 18, the particular candidate clip 1710 may be moved from the first location 1730 to the second location 1810 in the composite display area 340 using a drag-and-drop operation. In this example, the user performs the drag-and-drop operation by moving the cursor 385 to a location over the candidate clip 1710 when the candidate clip is displayed at the first location 1730 and performing a selection operation (e.g., by a left-cursor click-and-hold operation). The user then moves the candidate clip 1710 to the second location 1810 using the cursor 385. After the candidate clip 1710 has been moved to the second location 1810, the user may release the selection (e.g., by a left-cursor release operation). As shown, this drag-and-drop operation has caused the representation of the candidate clip 1710 to be moved from the first location 1730 to the second location 1810 in the composite display area 340.

As above, the movement of a candidate clip does not affect the committed track data that the candidate clip may overlap in previous, current, or potential locations that the candidate clip may occupy in the composite display area. One of ordinary skill will recognize that the committed clips may be moved in the same manner as the preview clips. However, moving committed clips will overwrite any overlapping section of any other committed clip.

Figure 19:
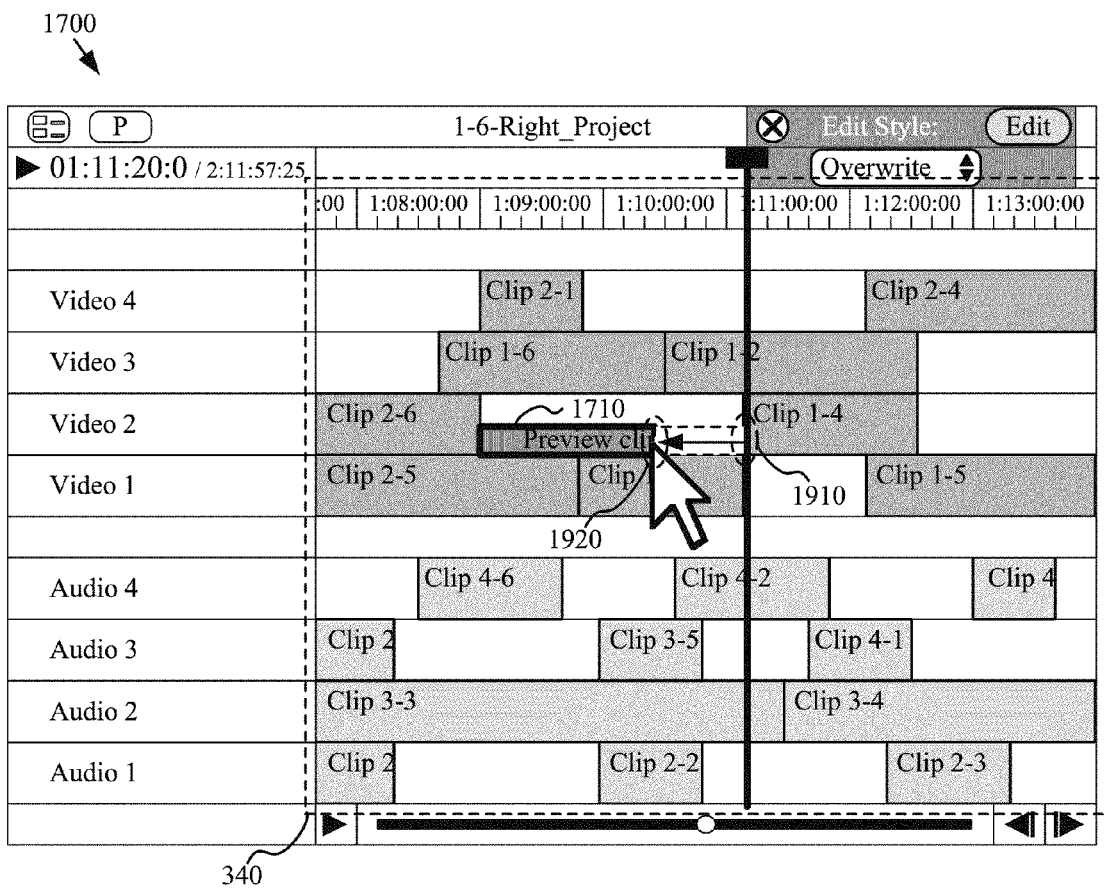
FIG. 19 illustrates trimming the end point of a candidate clip in some embodiments.

FIG. 19 illustrates the editing operation of some embodiments of trimming (i.e., moving the end point of a clip relative to its begin point, or vice-versa) a preview clip. Specifically, this figure illustrates a user selecting the end point of a particular candidate clip 1710 and moving the end point from a first location 1910 to a second location 1920 in the composite display area 340. The composite display area 340 is the same composite display area 340 discussed above in reference to FIGS. 3-12 and 15-18. The GUI 1700 is the same sub-section of the GUI 300 that was described above in reference to FIGS. 17-18.

As shown in FIG. 19, the end point of the particular candidate clip 1710 may be moved from the first location 1910 to the second location 1920 using a click-and-drag operation. In this example, the user performs the click-and-drag operation by moving the cursor 385 to the first location 1910 over the end point of the candidate clip 1710 and performing a selection operation (e.g., by a left-cursor click-and-hold operation). The user then moves the end point to the second location 1920 using the cursor 385. After the end point has been moved to the second location 1920, the user may release the selection (e.g., by a left-cursor release operation). As shown, this click-and-drag operation has caused the end point of the candidate clip 1710 to be moved from the first location 1910 to the second location 1920 in the composite display area 340.

This trimming operation may also be performed using other methods such as a combination of keystrokes, directly specifying a new end point by a left-cursor click operation, or other appropriate method. Furthermore, one of ordinary skill will recognize that, in addition to reducing the length of the clip (i.e., moving the end point to the left), the endpoint may be moved so as to increase the length of the clip (i.e., moving the end point to the right). The user may also trim the start point of the clip in addition to or instead of the end point. In addition, one of ordinary skill will recognize that the same trim operation may be performed on a committed clip, with the exception that any overlapping sections of committed clips will be overwritten.

One of ordinary skill will also recognize that other editing functions may be applied to a candidate clip in a similar manner. For instance, speed effects, fade in/fade out effects, volume control, or other such options may be changed by selecting and modifying certain locations within the representation of the candidate clip. In addition, these editing functions may be applied using a combination of keystrokes, selecting an option from a pull-down or pop-up menu, etc.

B. Edit Styles

After a candidate clip has been added to the composite display area as described above, several edit styles may be applied to the candidate clip using the preview tool. These edit styles will be described below. The edit styles provided by the preview tool allow a user to preview various typical media editing functions such as insert, overwrite, etc. Most of these edit styles allow the user to view the preview clip in the preview display area without affecting the composite presentation that is displayed in that area (i.e., without eliminating committed clips or moving committed clips along the timeline in the composite display area). However, in some embodiments, one of these edit styles can have the addition of a preview clip push one or more committed clips along the timeline.

FIGS. 20-31 illustrate various edit styles that may be applied to a candidate clip (or clips) using the preview tool 410 of some embodiments. FIGS. 20-31 illustrate the same composite display area 340 as described above in reference to FIGS. 3-12 and 15-19 and the same GUI sub-section 1700 described above in reference to FIGS. 17-19. FIGS. 20-31 further illustrate the controls 2010-2040 provided by the preview tool 410.

Figure 20:
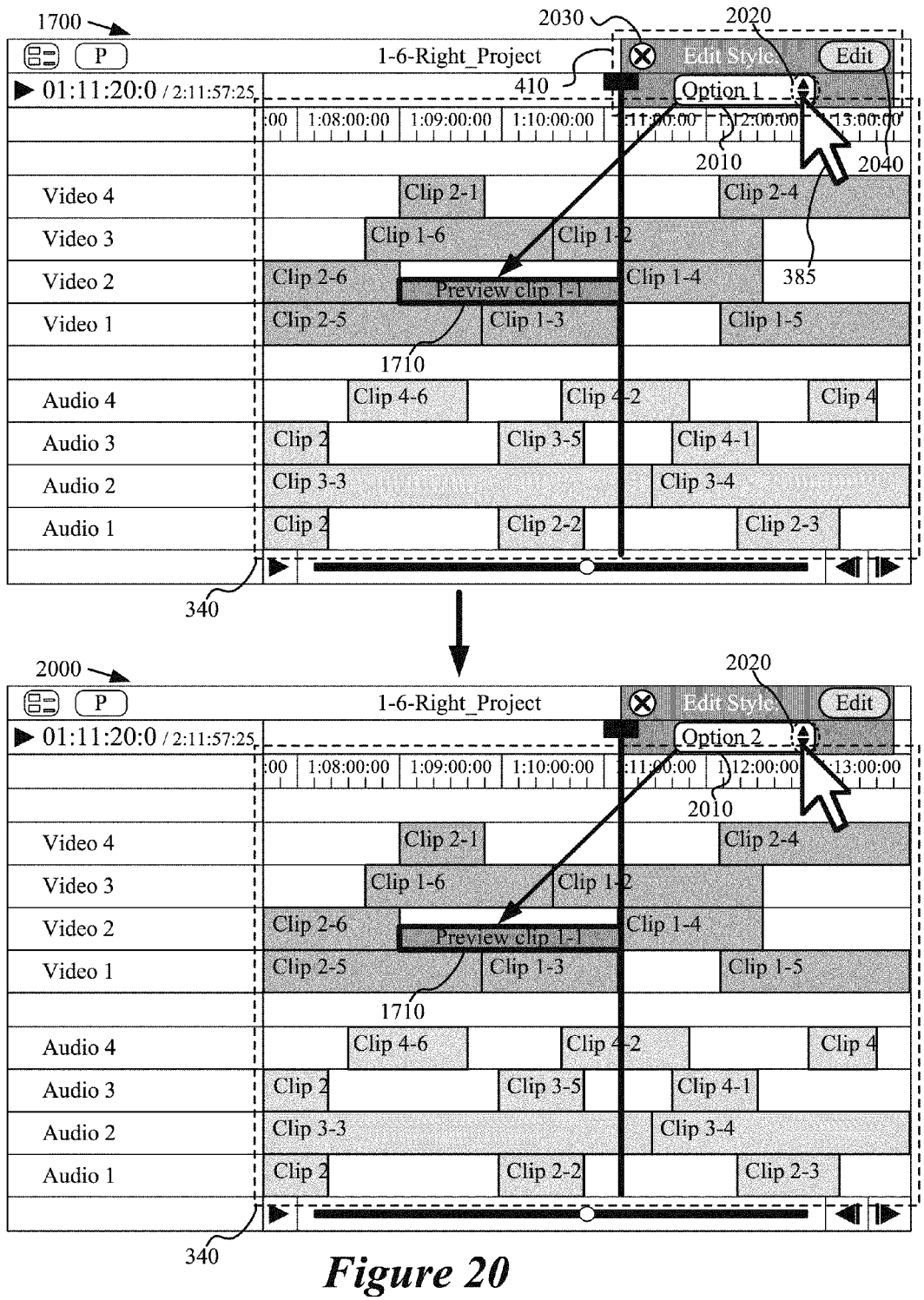
FIG. 20 illustrates an exemplary timeline of some embodiments with the preview tool invoked.

As shown in FIG. 20, the preview tool includes an edit style application item 2010 for applying the selected edit style to the selected candidate clip 1710, a selection control 2020 for cycling through a set of edit style options, a preview end item 2030 to terminate the preview tool and remove any candidate clips from the composite display area, and an edit commit item 2040 to reassign any selected candidate clip from the candidate clip definition to the composite presentation definition. Although the example of FIGS. 20-31 will be described with reference to cursor-control operations, one of ordinary skill will recognize that any of the operations described with respect to cursor-control operations may also be performed using a combination of keystrokes, selecting a pull-down or pop-up menu command, or some other appropriate method of invoking an edit command.

FIG. 20 illustrates the partial GUI 1700 including the preview tool 410 of some embodiments. In this example, the edit style shown in the edit style application item 2010 is changed from a first edit style to a second edit style using the selection control 2020 of the preview tool 410. To illustrate the example of changing from the first edit style to the second edit style using the selection control 2020, FIG. 20 describes two different stages of a user's interaction with the partial GUI 1700.

FIG. 20 illustrates a first stage 1700 of user interaction that is after the preview tool 410 has been invoked in its default state. In this stage, the user operates the selection control 2020 to change the selected edit style that is shown in the edit style application item 2010. The user performs this operation by positioning the cursor 385 over the selection control 2020 and performing a selection operation.

FIG. 20 further illustrates a second stage 2000 of user interaction after the user has operated the selection control 2020. As shown, the operation of the selection control has caused the option displayed in the edit style application item 2010 to change from "Option 1" to "Option 2".

Figure 21:
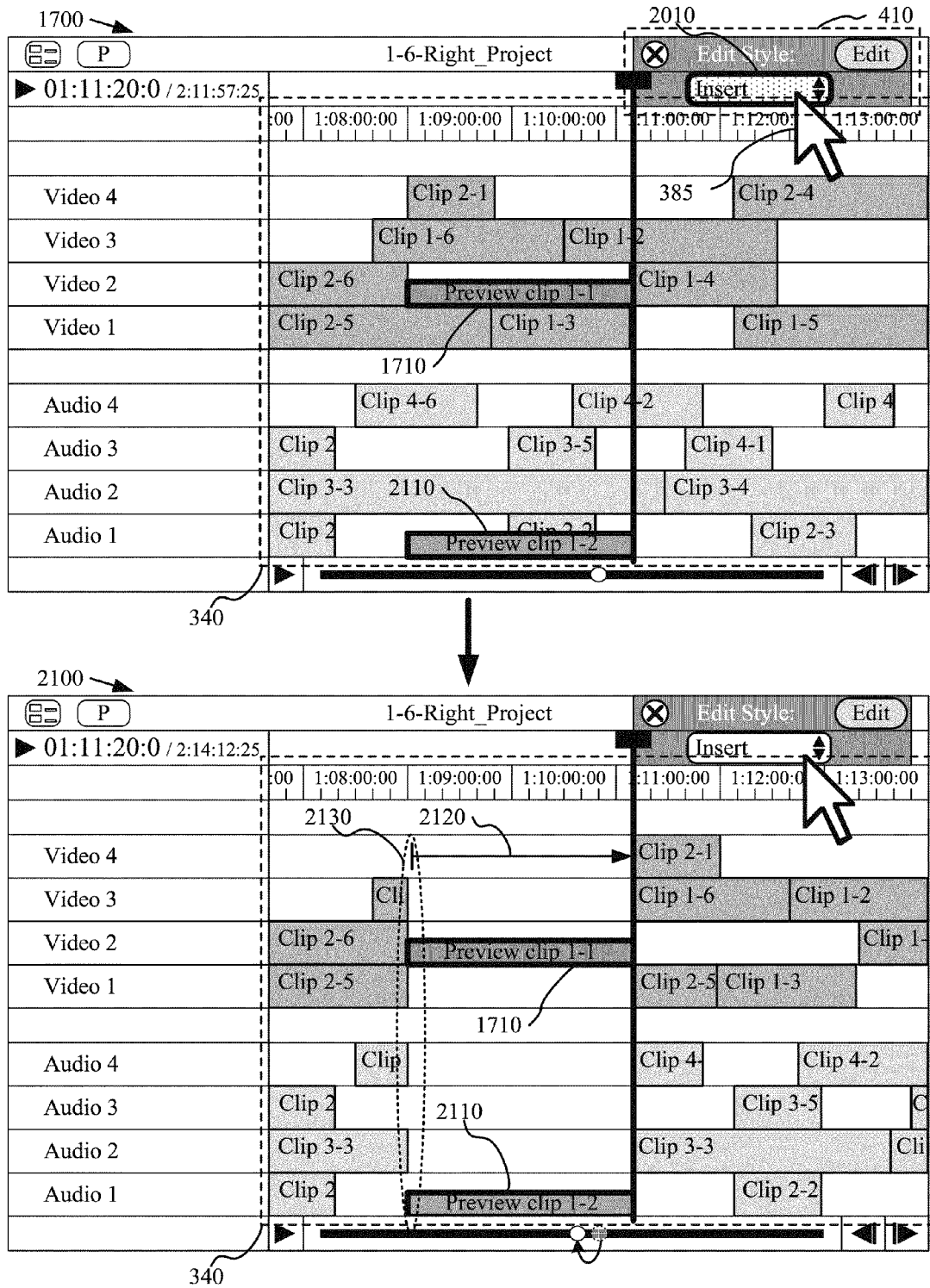
FIG. 21 illustrates an insertion operation of some embodiments.

FIG. 21 illustrates applying an insert edit style to one or more candidate clips using the preview tool 410 of some embodiments. In this example, the insert edit style is applied to two candidate clips by selecting the candidate clips and using the preview tool 410 to select and apply the edit style. To illustrate this example, FIG. 21 explains two different stages of a user's interaction with the partial GUI 1700.

This figure illustrates a first stage 1700 of user interaction that is after the preview tool 410 has been invoked, two clips 1710 and 2110 have been selected to which the edit style will be applied, and the user has operated the selection control 2020 to select the desired edit style (i.e., "insert"). The user may have selected the two clips 1710 and 2110 by positioning the cursor 385 over the first clip 1710 and performing a left-cursor click operation and then moving the cursor 385 over the second clip 2110 and performing a control-cursor-click operation. In addition, the user may have operated the selection control of some embodiments by positioning the cursor 385 over the selection control 2020 and performing a left-cursor click operation.

In this stage 1700, the user applies the selected edit style (as shown in the edit style application item 2010) to the selected clips 1710 and 2110. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 21 further illustrates a second stage of user interaction 2100 that is after the user has performed an insert operation. As shown, the insert operation has caused all non-selected clips to be shifted by an equal amount 2120 (corresponding to the length of the inserted clip(s)) from the begin point 2130 of the selected clips 1710 and 2110. By shifting all of the non-selected clips by the same amount 2120, the relationships between the non-selected clips are maintained.

In some cases, it may be advantageous to select multiple clips before performing any edit styled operations. This is because many audio and video clips are associated to each other. For example, when recording audio and video at the same time, onto the same media, such as when using a video camera with a microphone to record some content, the video data and audio data may be associated in any media project that utilizes the inherently linked content. In some embodiments, when a user selects a particular video clip any associated audio clip is also selected automatically (or vice-versa).

Although the second stage 2100 represents the existing track data (including committed clips) as being moved (and thus modified), the composite presentation definition is not affected by the preview tool insertion command in some embodiments. Different embodiments may use different methods to allow a user to make preview modifications without affecting the composite project data. For instance, some embodiments store an "undo" point that refers to the state of the project before any preview edits were made and then jump back to that undo point if no preview modifications are committed to the composite project. As another example, some embodiments store a "snapshot" of the locations of the committed clips in the composite display area, and then restore that snapshot when the user exits the preview tool without committing any preview edits. Other embodiments may define two separate undo threads, where one undo thread applies to the preview edits and another undo thread applies to the non-preview edits. As yet another example, some embodiments store a stack of changes from the time the preview tool was invoked, and then revert to the state of the project before any preview edits were made by undoing all of the changes in the stack.

Figure 22:
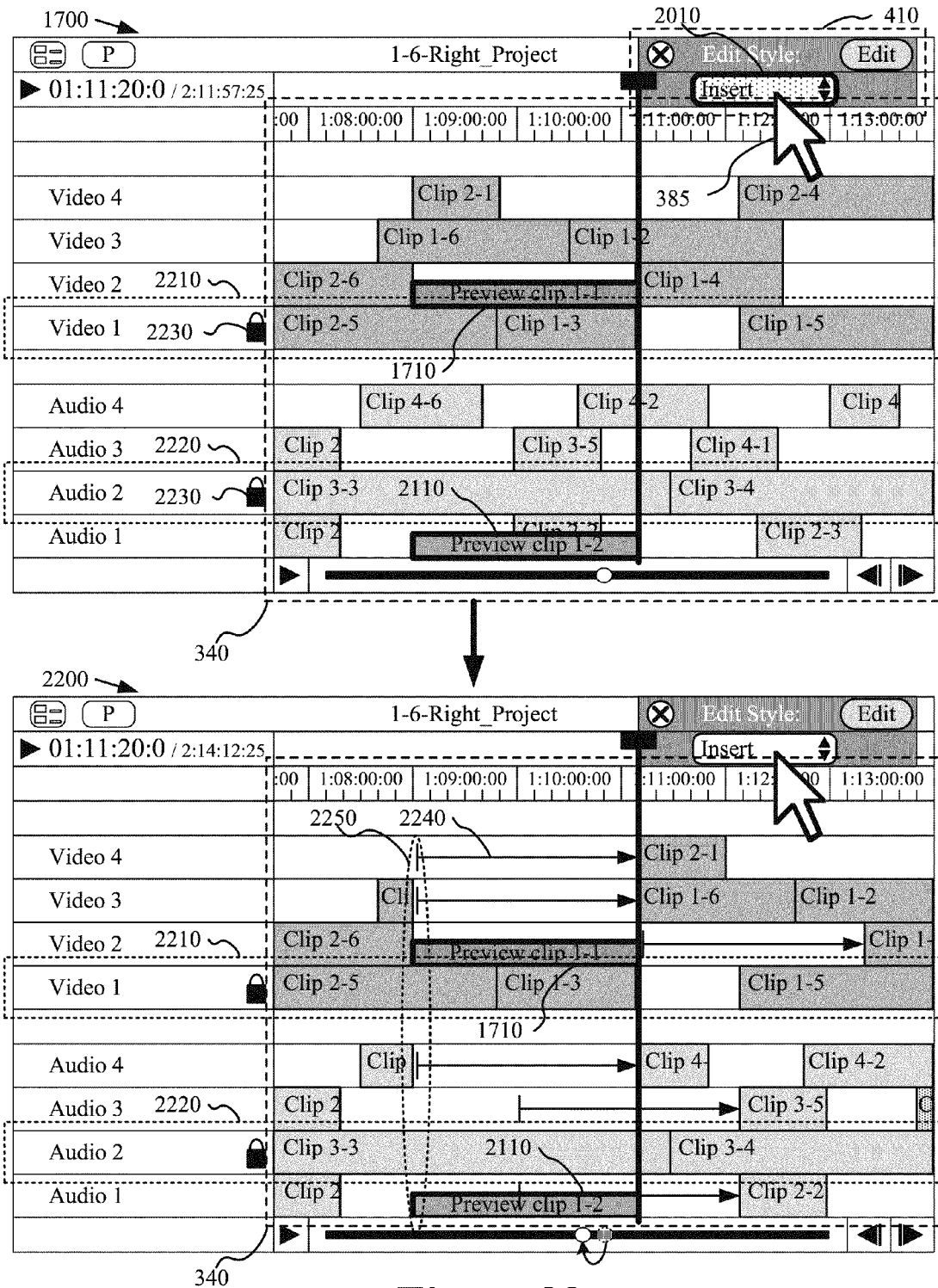
FIG. 22 illustrates an insertion operation with locked tracks of some embodiments.

FIG. 22 illustrates applying an insert edit style, using the preview tool 410 of some embodiments, to one or more candidate clips in the composite display area where the composite display area includes one or more locked tracks. In this example, the insert edit style is applied to a candidate clip(s) by selecting the candidate clip(s) and using the preview tool 410 to select and apply the edit style after locking two tracks. To illustrate this example, FIG. 22 explains two different stages of a user's interaction with the partial GUI 1700.

This figure illustrates a first stage 1700 of user interaction that is after the preview tool 410 has been invoked, two clips 1710 and 2110 have been selected to which the edit style will be applied, two tracks 2210 and 2220 have been locked (as indicated by the lock icons 2230), and the user has operated the selection control 2020 to select the desired edit style (i.e., "insert"). As above, the user may have selected the two clips 1710 and 2110 by positioning the cursor 385 over the first clip 1710 and performing a left-cursor click operation and then moving the cursor 385 over the second clip 2110 and performing a control-cursor-click operation. The user may have locked the tracks 2210 and 2220 by performing a left-cursor operation over an icon in each track to be locked (not shown), or some other appropriate method. In addition, the user may have operated the selection control of some embodiments by positioning the cursor 385 over the selection control 2020 and performing a left-cursor click operation.

In this stage 1700, the user applies the selected edit style (as shown in the edit style application item 2010) to the selected clips 1710 and 2110. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 22 further illustrates a second stage of user interaction 2200 that is after the user has performed an insert operation with locked tracks. As shown, the insert operation has caused all non-selected clips in unlocked tracks to be shifted by an equal amount 2240 (corresponding to the length of the inserted clip(s)) from the begin point 2250 of the selected clips 1710 and 2110. By shifting all of the non-selected clips in unlocked tracks by the same amount 2240, the relationships between the non-selected clips in unlocked tracks are maintained.

As above, although the second stage 2200 represents the existing track data (including committed clips) as being modified, the composite presentation definition is not affected by the preview tool insertion command in some embodiments.

Figure 23:
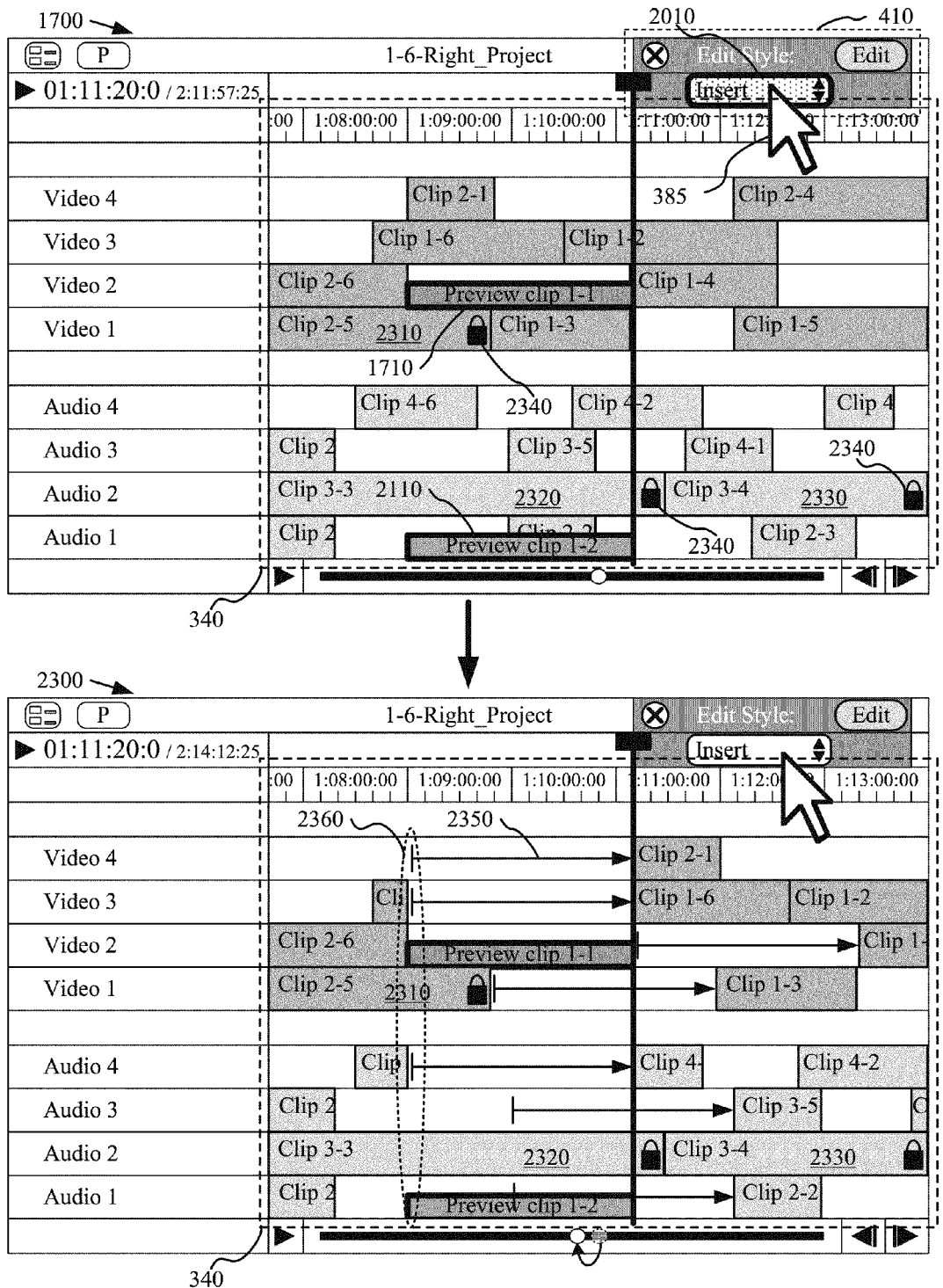
FIG. 23 illustrates an insertion operation with locked clips of some embodiments.

FIG. 23 illustrates applying an insert edit style, using the preview tool 410 of some embodiments, to one or more candidate clips in the composite display area where the composite display area includes one or more locked clips. In this example, the insert edit style is applied to a candidate clip(s) by selecting the candidate clip(s) and using the preview tool 410 to select and apply the edit style after locking several clips 2310-2330. To illustrate this example, FIG. 23 describes two different stages of a user's interaction with the partial GUI 1700.

This figure illustrates a first stage 1700 of user interaction that is after the preview tool 410 has been invoked, two clips 1710 and 2110 have been selected to which the edit style will be applied, three clips 2310-2330 have been locked (as indicated by the lock icons 2340), and the user has operated the selection control 2020 to select the desired edit style (i.e., "insert"). As above, the user may have selected the two candidate clips 1710 and 2110 by positioning the cursor 385 over the first clip 1710 and performing a left-cursor click operation and then moving the cursor 385 over the second clip 2110 and performing a control-cursor-click operation. The user may have locked the clips 2310-2330 by performing a left-cursor operation over an icon in each clip to be locked (not shown), or some other appropriate method. In addition, the user may have operated the selection control of some embodiments by positioning the cursor 385 over the selection control 2020 and performing a left-cursor click operation.

In this stage 1700, the user applies the selected edit style (as shown in the edit style application item 2010) to the selected clips 1710 and 2110. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 23 further illustrates a second stage of user interaction 2300 that is after the user has performed an insert operation with locked clips. As shown, the insert operation has caused all non-selected, unlocked clips to be shifted by an equal amount 2350 (corresponding to the length of the inserted clip(s)) from the begin point 2360 of the selected clips 1710 and 2110. By shifting all of the non-selected, unlocked clips by the same amount 2350, the relationships between the non-selected, unlocked clips are maintained.

As above, although the second stage 2300 represents the existing track data (including committed clips) as being modified, the composite presentation definition is not affected by the preview tool insertion command.

Figure 24:
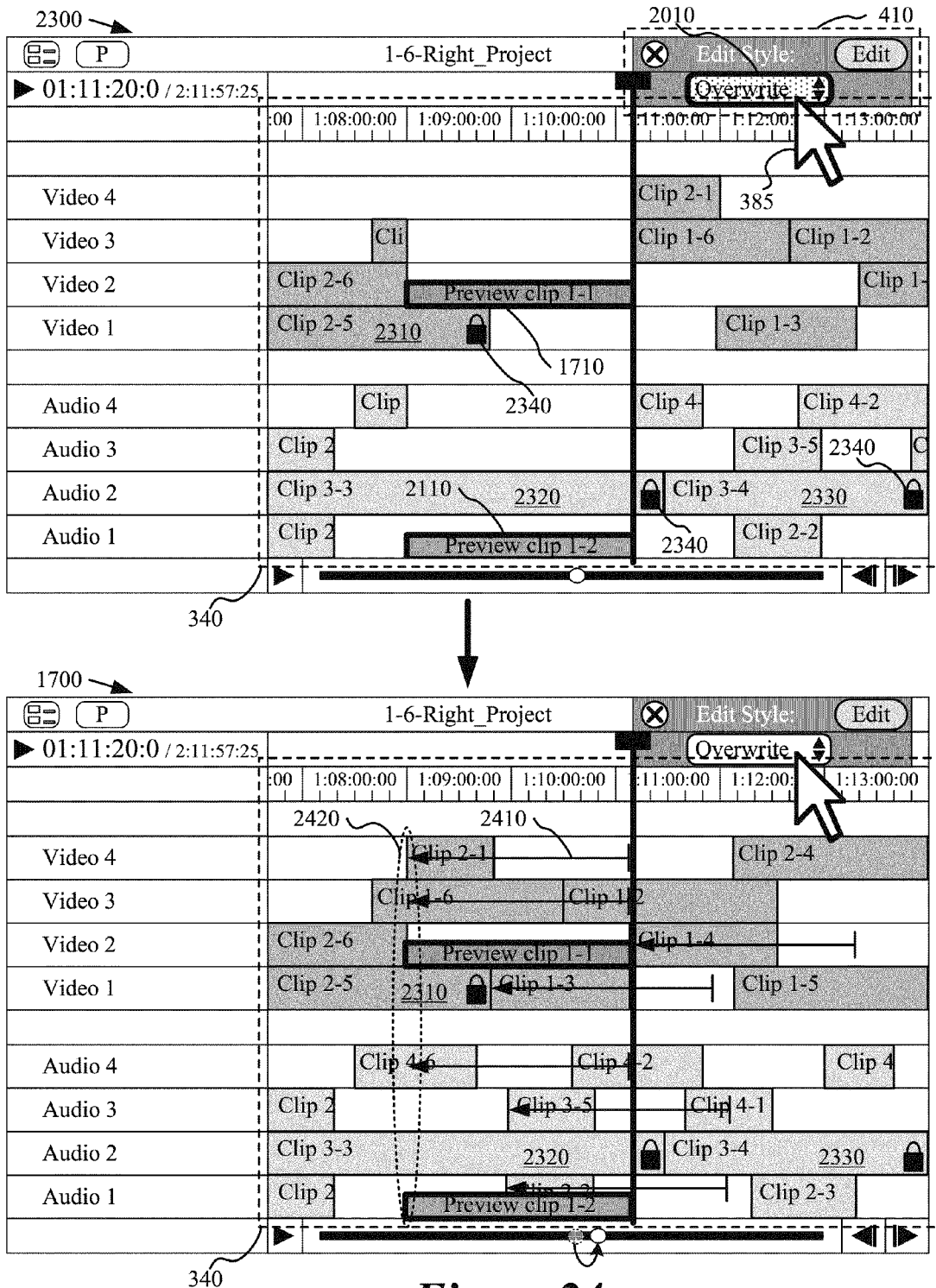
FIG. 24 illustrates an overwrite operation of some embodiments.

FIG. 24 illustrates applying an overwrite edit style, using the preview tool 410 of some embodiments, to one or more candidate clips in the composite display area where the composite display area includes one or more locked clips. In this example, the overwrite edit style is applied to a candidate clip(s) by selecting the candidate clip(s) and using the preview tool 410 to select and apply the edit style after locking several clips 2310-2330. To illustrate this example, FIG. 24 describes two different stages of a user's interaction with the partial GUI 1700.

This figure illustrates a first stage 2300 of user interaction that is after the preview tool 410 has been invoked, two clips 1710 and 2110 have been selected to which the edit style will be applied, three clips 2310-2330 have been locked (as indicated by the lock icons 2340), and the user has operated the selection control 2020 to select the desired edit style (i.e., "overwrite"). In addition, the first stage 2300 represents the state of the composite display area 340 after a user has previously performed an insert operation with locked clips (e.g., as described above in reference to FIG. 23). As above, the user may have selected the two candidate clips 1710 and 2110 by positioning the cursor 385 over the first clip 1710 and performing a left-cursor click operation and then moving the cursor 385 over the second clip 2110 and performing a control-cursor-click operation. The user may have locked the clips 2310-2330 by performing a left-cursor operation over an icon in each clip to be locked (not shown), or some other appropriate method. In addition, the user may have operated the selection control of some embodiments by positioning the cursor 385 over the selection control 2020 and performing a left-cursor click operation.

In this stage 2300, the user applies the selected edit style (as shown in the edit style application item 2010) to the selected clips 1710 and 2110. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 24 further illustrates a second stage of user interaction 1700 that is after the user has performed an overwrite operation with locked clips. As shown, the overwrite operation has caused all non-selected, unlocked clips to be shifted by an equal amount 2410 (corresponding to the length 2350 the clips were shifted during the insertion operation described above in reference to FIG. 23) toward the begin point 2420 of the selected clips 1710 and 2110. By shifting all of the non-selected, unlocked clips by the same amount 2410, the relationships between the non-selected, unlocked clips are maintained.

One of ordinary skill will recognize that the overwrite operation may also be used with locked tracks, a combination of locked tracks and locked clips, or with no locked tracks or clips. The overwrite edit style is used as the default edit style in some embodiments because it does not affect the display of any committed clips. In other words, no committed clips will be moved due to an overwrite operation (unless those clips had been previously moved through an insert or some other operation).

As above, although the second stage 1700 represents the existing track data (including committed clips) as being modified, the composite presentation definition is not affected by the preview tool overwrite command.

Figure 25:
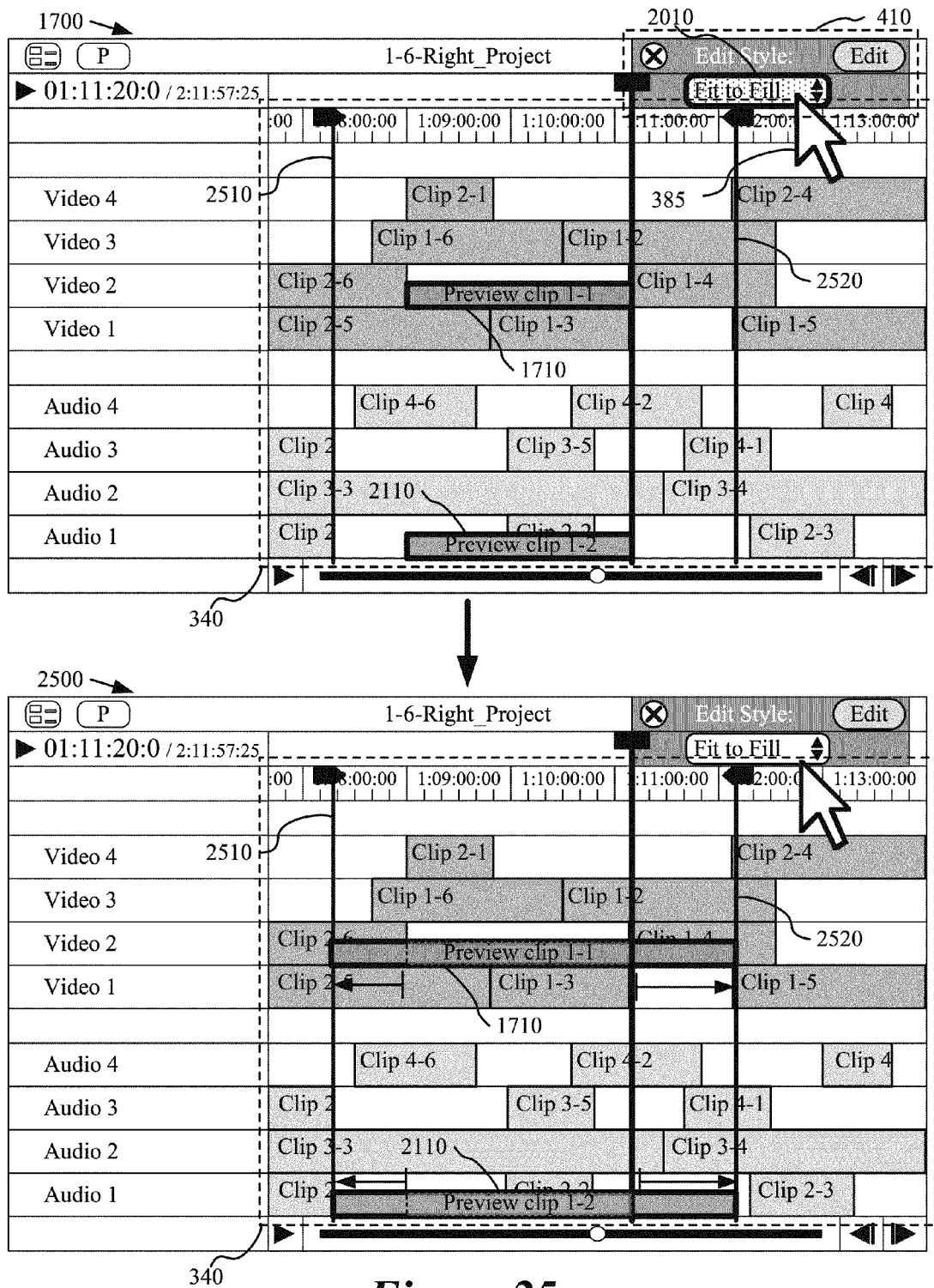
FIG. 25 illustrates a fit-to-fill operation of some embodiments.

FIG. 25 illustrates applying a fit-to-fill edit style, using the preview tool 410 of some embodiments, to a candidate clip in the composite display area. In this example, the fit-to-fill edit style is applied to multiple candidate clips by selecting the candidate clips and using the preview tool 410 to select and apply the edit style. To illustrate this example, FIG. 25 describes two different stages of a user's interaction with the partial GUI 1700.

This figure illustrates a first stage 1700 of user interaction that is after the preview tool 410 has been invoked, clips 1710 and 2110 have been selected as the clips to which the edit style will be applied, and the user has operated the selection control 2020 to select the desired edit style (i.e., "fit to fill"). Furthermore, the first stage 1700 illustrates that a user has defined an area that the selected clip will fill by positioning begin and end point indicators 2510 and 2520 for the fit-to-fill operation. In some embodiments, the begin and end point indicators may be invoked when the user selects the fit to fill edit style (or some other edit style that used begin and end point indicators). In other embodiments, the user may invoke the begin and end point indicators through a menu selection, combination of keystrokes, or some other appropriate method. In some embodiments, the begin and end point indicators may initially be placed at the begin and end points of the selected clip(s) by default. The begin and end point indicators may be set before selecting a clip (or clips) to which the fit-to-fill style will be applied in some embodiments.

The user may have selected the two clips 1710 and 2110 by positioning the cursor 385 over the first clip 1710 and performing a left-cursor click operation and then moving the cursor 385 over the second clip 2110 and performing a control-cursor-click operation. The user may have positioned the begin and end points 2510 and 2520 by a click-and-drag operation, or some other appropriate method (e.g., a series of menu commands, a combination of keystrokes, a select-and-drag operation, radio buttons for setting the in and out points, etc.). In addition, the user may have operated the selection control of some embodiments by positioning the cursor 385 over the selection control 2020 and performing a left-cursor click operation.

In this stage 1700, the user applies the selected edit style (as shown in the edit style application item 2010) to the selected clips 1710 and 2110. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 25 further illustrates a second stage of user interaction 2500 that is after the user has performed a fit-to-fill operation. As shown, the fit-to-fill operation has caused the selected candidate clips 1710 and 2110 to be stretched to fill the area defined by the begin 2510 and end 2520 points that had been previously set. Some embodiments may stretch the selected clip by altering the playback speed, or changing the source in and out points in the underlying content, or some other appropriate method. The fit-to-fill operation of some embodiments may also be used to automatically trim (or speed up) a clip to fit into a smaller time period than originally defined for the clip. In some embodiments, after a user has applied a fit-to-fill operation to a clip or clips, the user may move the begin and/or end point indicator(s) 2510 and 2520 in order to automatically update the begin and end points of the clip(s) to which the fit-to-fill operation has been applied.

Figure 26:
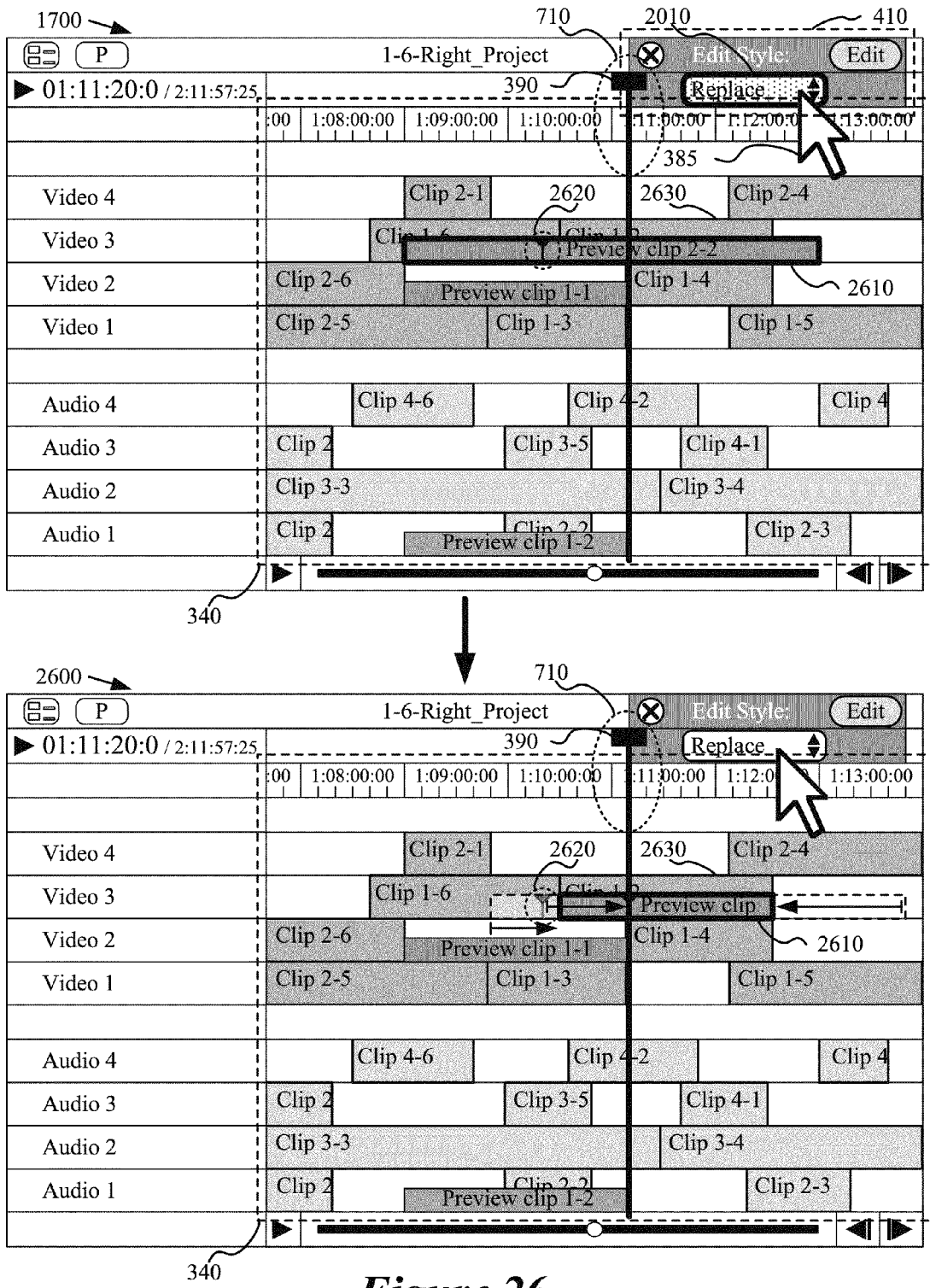
FIG. 26 illustrates a replace operation of some embodiments.

FIG. 26 illustrates using the preview tool 410 of some embodiments to apply a replace edit style to a candidate clip in the composite display area. In this example, the replace edit style is applied to a candidate clip by selecting the candidate clip and using the preview tool 410 to select and apply the edit style. To illustrate this example, FIG. 26 describes two different stages of a user's interaction with the partial GUI 1700.

This figure illustrates a first stage 1700 of user interaction that is after the preview tool 410 has been invoked, a clip 2610 has been selected to which the edit style will be applied, and the user has operated the selection control 2020 to select the desired edit style (i.e., "replace"). Furthermore, the first stage 1700 illustrates that the playhead 390 is positioned at a particular location 710 in the composite display area 340. In addition, the first stage 1700 illustrates that the preview clip 2610 also has a clip playhead location indicator 2620. This indicator may be used to designate a particular location within a clip. A user may identify the particular location by performing a selection operation using the GUI 1700 of some embodiments (e.g., by setting a marker while viewing the particular clip in a preview display area). Although the clip playhead location indicator 2620 has been represented using a particular display representation, one of ordinary skill in the art will recognize that different embodiments may use different display representations.

In some embodiments, a user may invoke the clip playhead location indicator 2620 by performing a pop-up or pull-down menu selection operation. In other embodiments, the clip playhead location indicator may be invoked when the user selects a particular clip from the composite display area 340 and then selects a GUI item that initiates playback of the selected clip (e.g., by pressing a "play" item provided by the GUI). In still other embodiments, a user may invoke the clip playhead location indicator 2620 by moving the cursor 385 to a particular location over a clip in the composite display area 340, causing the GUI to automatically display the clip playhead location indicator. In yet other embodiments, a user may invoke a different clip playhead location indicator (not shown) in a clip that is displayed in the media library of some embodiments. In some of these embodiments, the location identified by the different clip playhead location indicator may be indicated by the clip playhead location indicator 2620 when the clip is moved from the media library to the composite display area 340.

The user may have selected the candidate clip 2610 by positioning the cursor 385 over the clip 2610 and performing a left-cursor click operation. The user may have positioned the playhead 390 using a click-and-drag operation, or some other appropriate method (e.g., a series of menu commands, a combination of keystrokes, a select-and-drag operation, etc.). In addition, the user may have operated the selection control of some embodiments by positioning the cursor 385 over the selection control 2020 and performing a left-cursor click operation. Furthermore, a user may have set the location of the playhead location indicator 2620 using a drag-and-drop operation or some other appropriate operation (e.g., setting a flag when viewing a preview playback of the particular clip).

The playhead 390 may be used to determine the location in an existing clip at which to insert the replacement clip. Thus, a user may find a certain point in a particular committed clip and set the playhead to that location. The clip playhead location indicator 2620 may be set in a similar fashion. A user may then perform a replace operation to automatically move the playhead location indicator 2620 in the selected clip 2610 and trim begin point of the selected clip to match the certain point 710 in the particular committed clip 2630. In addition, as described below, the end point of the selected clip may be trimmed to match the end point of the particular committed clip. This feature has the benefit of allowing a user who has compiled several "takes" of one scene to use a certain portion of a particular take and a certain portion of a different take to make up a complete scene.

In this stage 1700, the user applies the selected edit style (as shown in the edit style application item 2010) to the selected clip 2610. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 26 further illustrates a second stage of user interaction 2600 that is after the user has performed a replace operation. As shown, the replace operation has caused the selected candidate clip 2610 to be moved and trimmed such that the playhead location indicator 2620 is matched to the playhead position 710 and the begin and end points of the selected clip 2610 have been trimmed to match the begin and end points of the committed clip 2630 that is being partially replaced.

Some embodiments may also require the user to select the clip being replaced, while other embodiments will automatically select a clip that overlaps the selected clip 2610. In addition, the end point of the selected clip 2610 may be automatically trimmed to match the end point of the committed clip 2630 that is being partially replaced.

Figure 27:
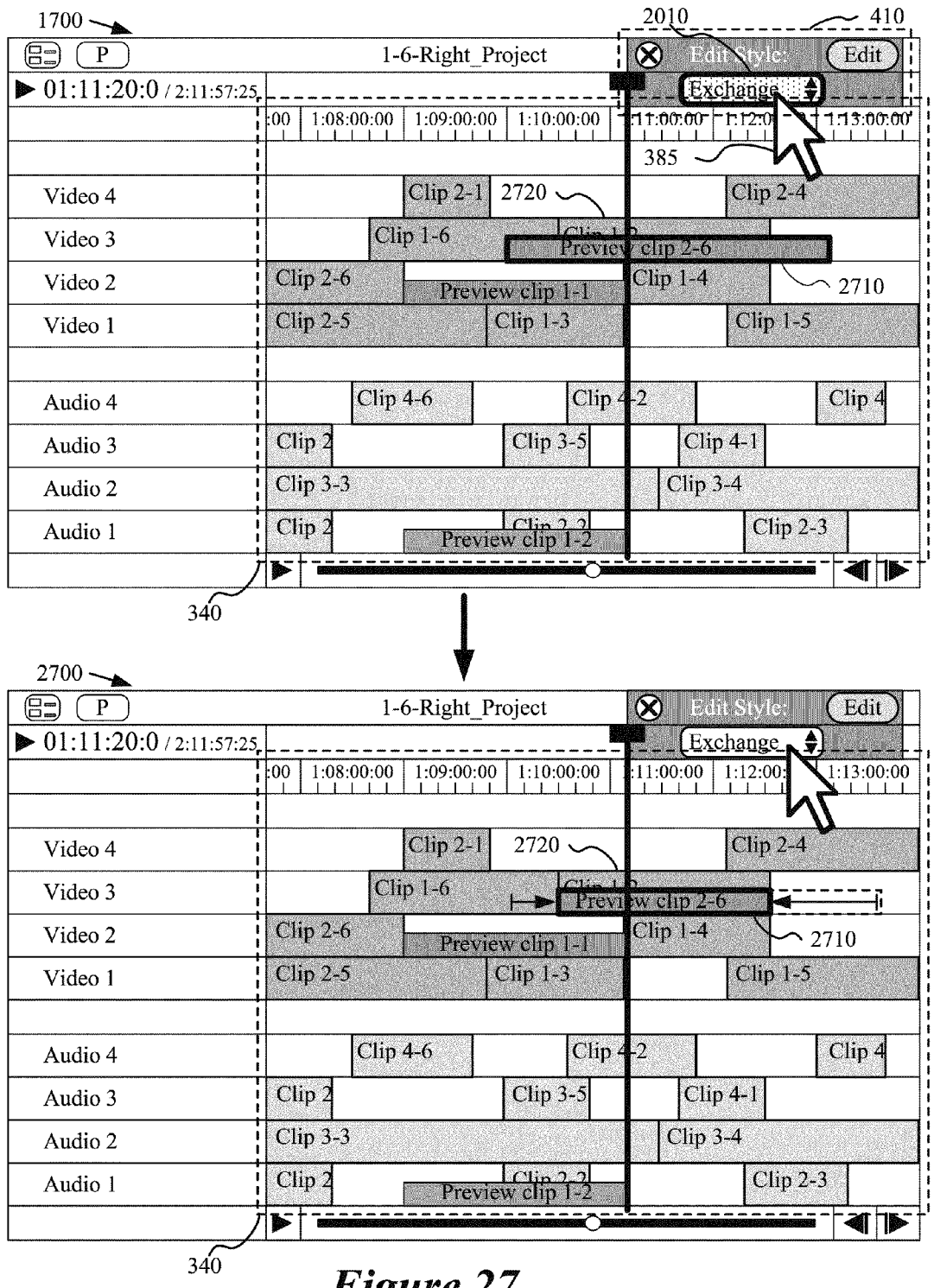
FIG. 27 illustrates an exchange operation of some embodiments.

FIG. 27 illustrates applying an exchange edit style, using the preview tool 410 of some embodiments, to a candidate clip in the composite display area. In this example, the exchange edit style is applied to a candidate clip by selecting the candidate clip and using the preview tool 410 to select and apply the edit style. To illustrate this example, FIG. 27 describes two different stages of a user's interaction with the partial GUI 1700.

This figure illustrates a first stage 1700 of user interaction that is after the preview tool 410 has been invoked, a clip 2710 has been selected to which the edit style will be applied, and the user has operated the selection control 2020 to select the desired edit style (i.e., "exchange"). The user may have selected the candidate clip 2710 by positioning the cursor 385 over the clip 2710 and performing a left-cursor click operation. In addition, the user may have operated the selection control of some embodiments by positioning the cursor 385 over the selection control 2020 and performing a left-cursor click operation.

In this stage 1700, the user applies the selected edit style (as shown in the edit style application item 2010) to the selected clip 2710. The user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 27 further illustrates a second stage of user interaction 2700 that is after the user has performed an exchange operation. As shown, the exchange operation has caused the selected candidate clip 2710 to be moved to match the begin point and trimmed to match the end point of the committed clip 2720 that is being exchanged. The move of the begin point to match the begin point of the committed clip is similar to the clip move to match playhead locations described above in reference to FIG. 26. Alternatively, in some embodiments (not shown) the begin point may be trimmed (e.g., to match a marker location as described below). Some embodiments may also require the user to select the clip being replaced, while other embodiments will automatically select a clip that overlaps the selected clip 2710.

The exchange feature is useful when a user has compiled several "takes" of one scene, and wishes to replace a committed scene with another take, while automatically moving and trimming the clip to match the appropriate location in the timeline.

Although the examples of FIGS. 26-27 illustrate the replace and exchange edit styles as matching the begin and end points of a particular committed clip, one of ordinary skill in the art will realize that other variations may be used to achieve the same functionality. For instance, in some embodiments a user may set timeline in and out points (e.g., by positioning markers along the timeline, performing a series of keystrokes, etc.) that determine the begin and end points for the clip that will replace or exchange with the particular committed clip. The timeline in out points may be set in some cases where a user wants to replace or exchange a section of the timeline that is longer than an existing clip, for example.

Figure 28:
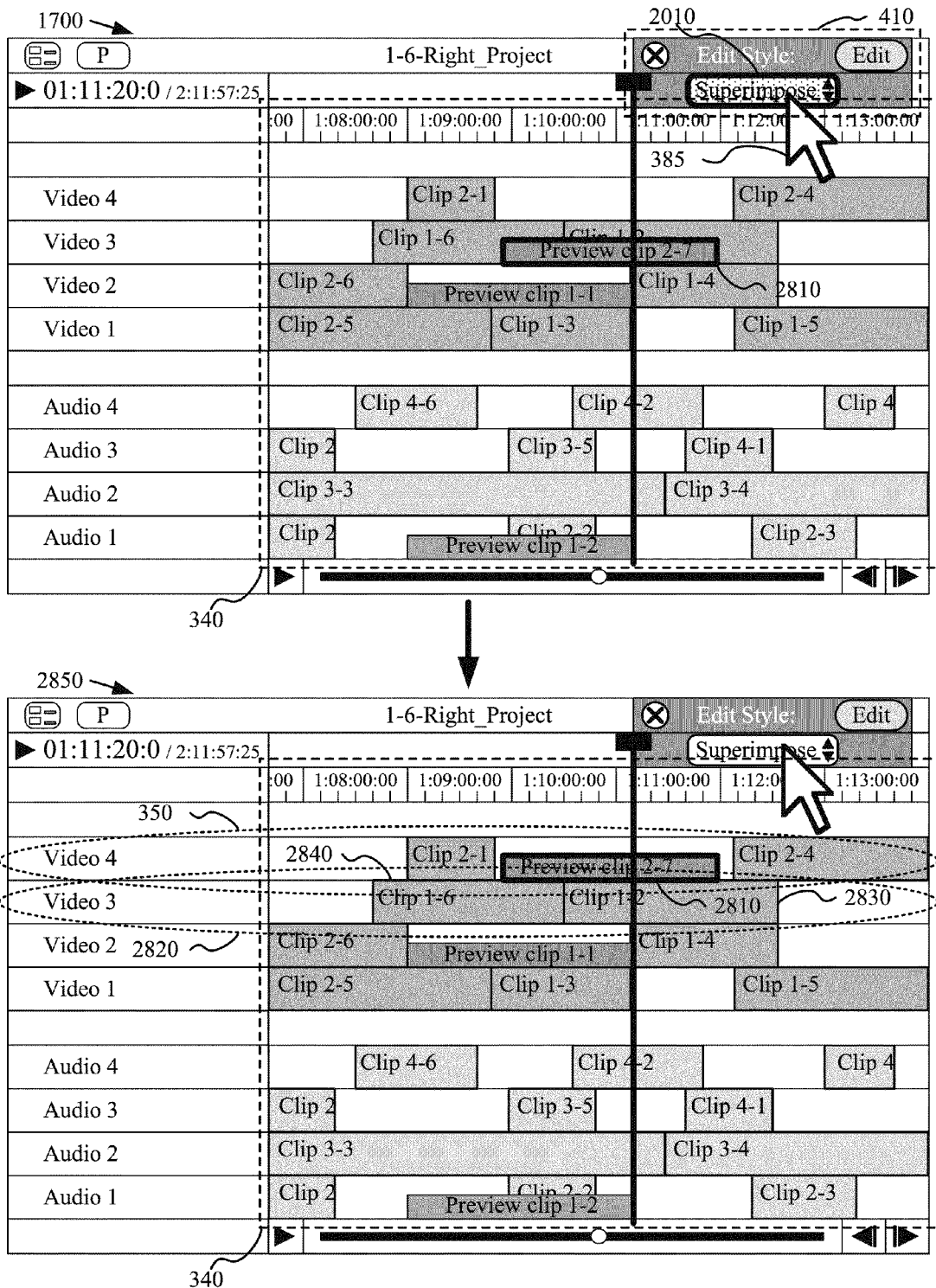
FIG. 28 illustrates a superimpose operation of some embodiments.

FIG. 28 illustrates applying a superimpose edit style, using the preview tool 410 of some embodiments, to a candidate clip in the composite display area. In this example, the superimpose edit style is applied to a candidate clip by selecting the candidate clip and using the preview tool 410 to select and apply the edit style. To illustrate this example, FIG. 28 describes two different stages of a user's interaction with the partial GUI 1700.

This figure illustrates a first stage 1700 of user interaction that is after the preview tool 410 has been invoked, a clip 2810 has been selected to which the edit style will be applied, and the user has operated the selection control 2020 to select the desired edit style (i.e., "superimpose"). The user may have selected the candidate clip 2810 by positioning the cursor 385 over the clip 2810 and performing a left-cursor click operation. In addition, the user may have operated the selection control of some embodiments by positioning the cursor 385 over the selection control 2020 and performing a left-cursor click operation.

In this stage 1700, the user applies the selected edit style (as shown in the edit style application item 2010) to the selected clip 2810. As above, the user performs this operation by positioning the cursor 385 over the edit style application item 2010 and performing a selection operation (e.g., a left-cursor click operation). As shown, this selection operation has caused a change in the graphical representation of the edit style application item 2010. In this example, the outline of the item has been bolded and the background of the item highlighted. Different embodiments may indicate this selection using different graphical representations.

FIG. 28 further illustrates a second stage of user interaction 2800 that is after the user has performed a superimpose operation. As shown, the superimpose operation has caused the selected candidate clip 2810 to be moved to an open location on an adjacent track. In some embodiments, the selected candidate clip will be moved to the next higher-numbered track when there is sufficient space to place the candidate clip without overlapping any previously-existing clips. In cases where there is not sufficient space in the next higher-numbered, a new track may be created and inserted into the composite display area 340 above the track that includes the clip that is being superimposed. For instance, in the example of FIG. 28, if there was not sufficient space in the "Video 4" track 350 to place clip 2810, a new track would be created and inserted between tracks "Video 3" 2820 and "Video 4" 350.

Some embodiments may also require the user to select the clip over which the candidate clip will be superimposed, while other embodiments will automatically select a clip that overlaps the selected clip 2810. Although the example of FIG. 28 shows the superimposed clip 2810 as overlapping multiple existing clips 2830 and 2840, in some cases a superimposed clip may overlap only a single clip (or portion of a single clip).

The superimpose feature allows a user to place text, pictures, overlay video, etc., over previously-existing content in the timeline. The superimposed clip is then played in addition to the underlying clip(s) (e.g., by compositing the superimposed clip with an underlying clip). Thus, a user may, for instance, add credits or other text that is to be displayed over the existing project data (such as a scene in a video).

Figure 29:
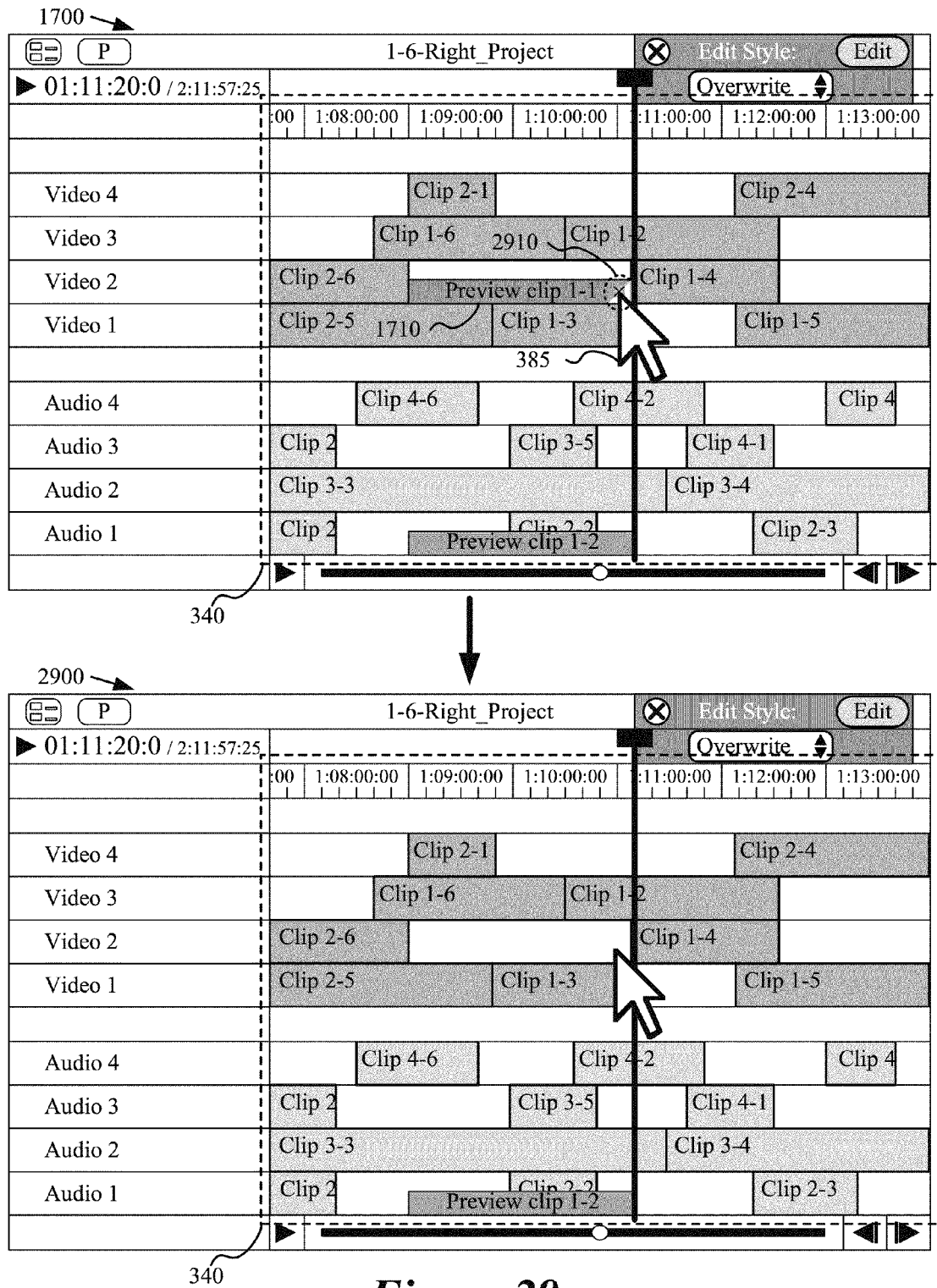
FIG. 29 illustrates the operation of turning off a candidate clip in some embodiments.

FIG. 29 illustrates using a deactivation control of some embodiments to turn off the display of a candidate clip in the composite display area. In this example, the display of the candidate clip is turned off by selecting a deactivation control 2910. To illustrate this example, FIG. 29 describes two different stages of a user's interaction with the partial GUI 1700.

This figure illustrates a first stage 1700 of user interaction that is after the preview tool 410 has been invoked and a user has moved the cursor 385 over the far-right section of candidate clip 2910, causing the deactivation control 2910 to be displayed.

In this stage 1700, the user selects the deactivation control 2910. The user performs this operation by positioning the cursor 385 over the deactivation control 2910 and performing a selection operation (e.g., a left-cursor click operation).

FIG. 29 further illustrates a second stage of user interaction 2900 that is after the user has selected the deactivation control 2910. As shown, the selected candidate clip 1710 has been removed from the composite display area 340. Although this example shows the representation of the clip as being completely removed, various implementations of the preview tool may indicate the track's status using other representations. For instance, a clip that has been turned off may be represented as a different color, have a different fill, be shown as more transparent than an enabled clip, etc.

In addition to changing the displayed representation, the candidate clip definition is modified such that when a user invokes a preview playback, the removed clip 1710 will not be displayed. In addition to the operation shown in FIG. 29, a user may turn off a candidate clip using other methods. For instance, the user may select a command in a pull-down or pop-up menu, perform a series of keystrokes, or some other appropriate method of indicating that the clip should be removed from any preview display of the project. Furthermore, although the representation of the clip 1710 has been completely removed from the composite display area 340, in some embodiments the underlying data is still available, and the clip may be restored. One such way of restoring a clip that has been turned off will be described in reference to FIG. 30 below.

Figure 30:
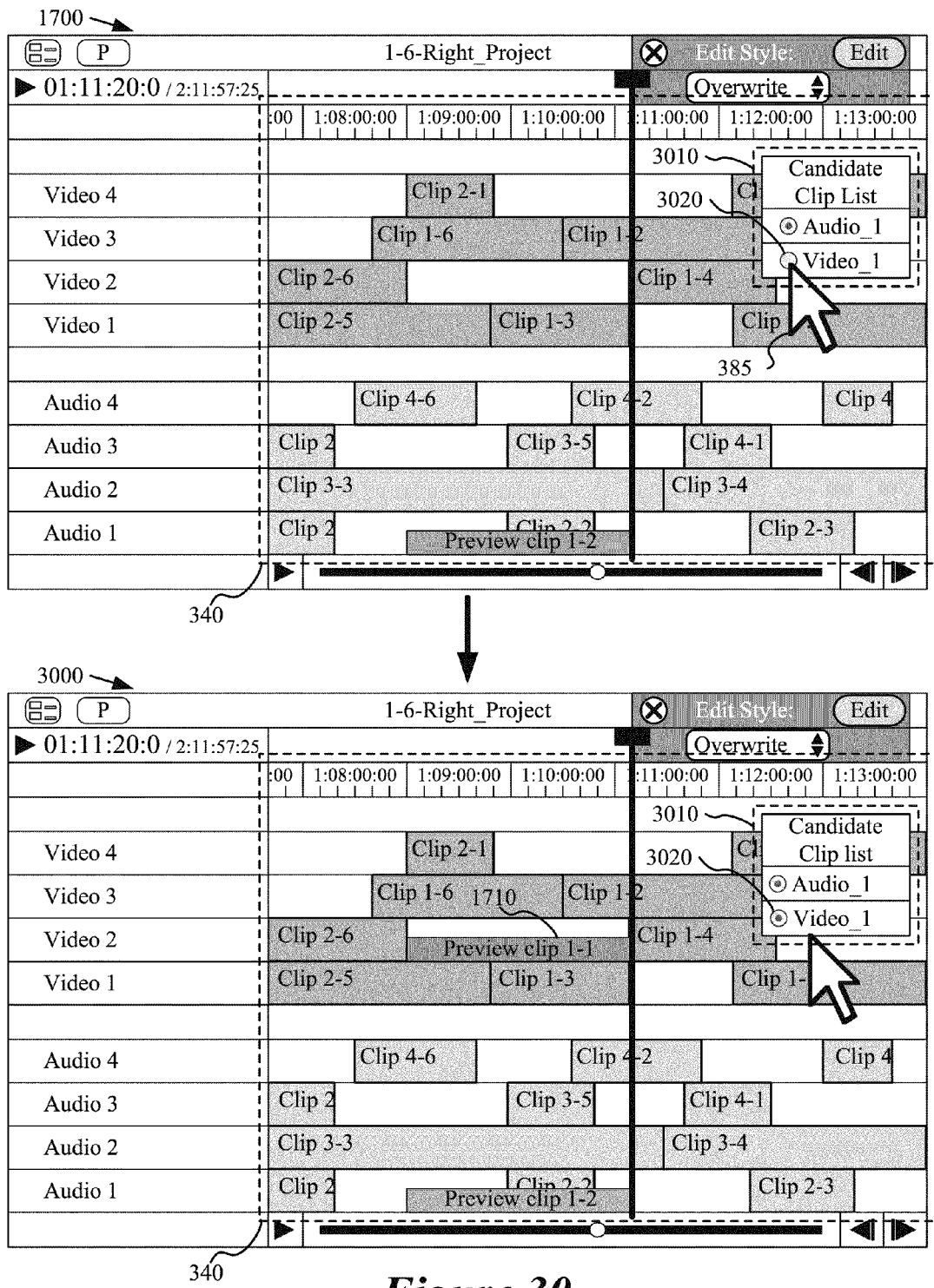
FIG. 30 illustrates the operation of some embodiments of restoring a candidate clip.

FIG. 30 illustrates using a candidate clip list of some embodiments to restore the display of a candidate clip in the composite display area. In this example, the display of the candidate clip is turned on by selecting the deactivated clip 1710 from a candidate clip list 3010. To illustrate this example, FIG. 30 describes two different stages of a user's interaction with the partial GUI 1700.

This figure illustrates a first stage 1700 of user interaction that is after the candidate clip list 3010 has been invoked. The user may invoke such a list 3010 in several different ways. For example, the user may right-click in an area of the timeline and select a "candidate clip list" option from a pop-up menu. Alternatively, a user may invoke the list 3010 using a pull-down menu selection, a combination of keystrokes, a hotkey, etc.

In this stage 1700, the user selects the activation control 3020. The user performs this operation by positioning the cursor 385 over the activation control 3020 and performing a selection operation (e.g., a left-cursor click operation). In this example, the list 3010 represents enabled candidate clips as having a partially filled circle, while any clip that has been turned off is represented using a completely empty circle. In some embodiments, the list includes only those clips that have been active during the current preview edit session.

FIG. 30 further illustrates a second stage of user interaction 3000 that is after the user has selected the activation control 3020. As shown, the selected candidate clip 1710 has been restored to the composite display area 340. In addition to using a candidate clip list 3010 and activation control 3020 to restore clips that have been turned off, some embodiments may allow different methods of restoring such clips. For instance, a user may select an option (or series of options) from a pull-down menu, perform some combination of keystrokes, etc., to restore the particular clip.

Figure 31:
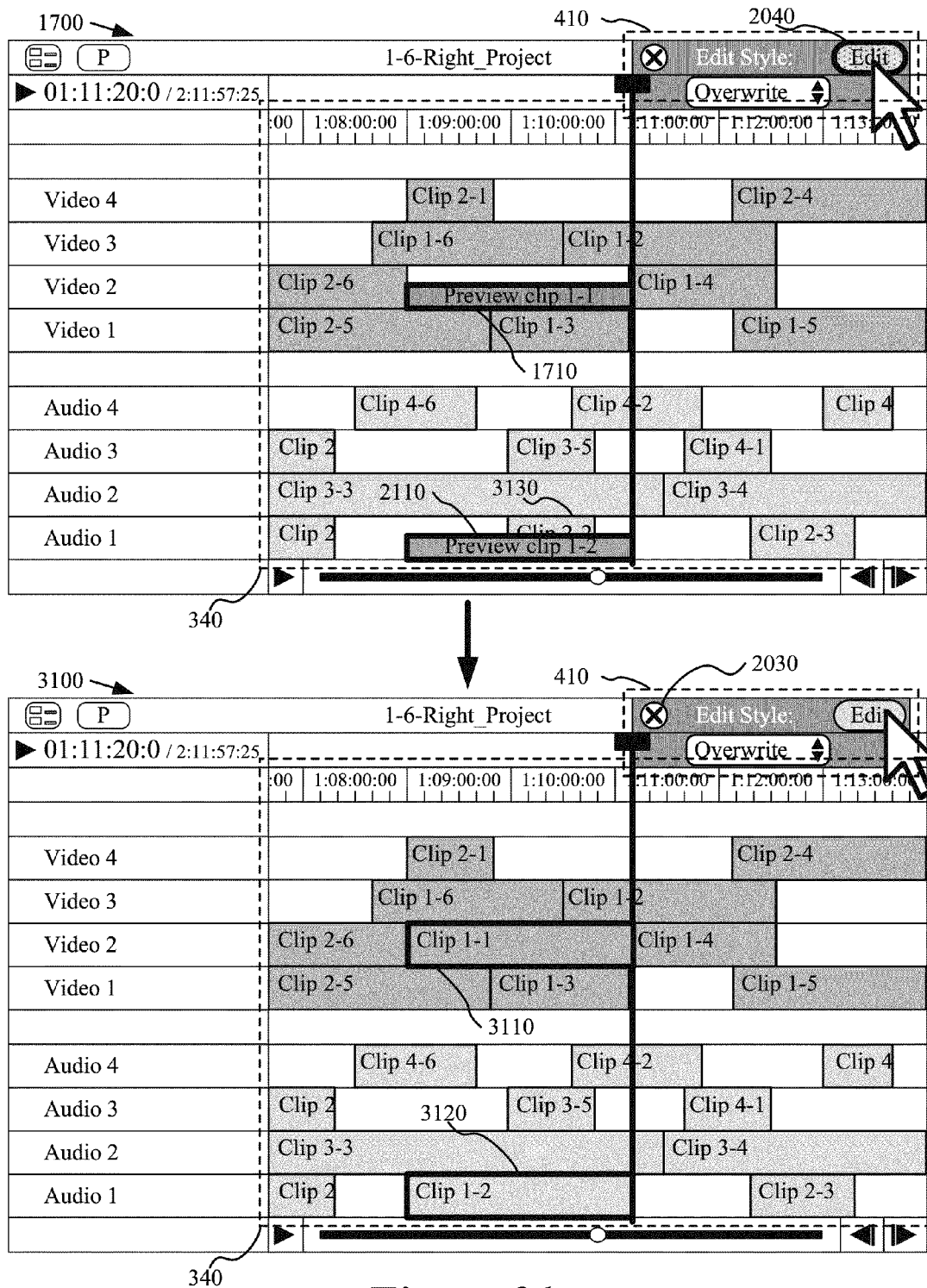
FIG. 31 illustrates an operation used to commit candidate clips to the project in some embodiments.

FIG. 31 illustrates using the preview tool 410 of some embodiments to commit one or more candidate clips to a composite presentation definition. In this example, the candidate clips are committed to the composite presentation definition by selecting the candidate clips and using the preview tool 410 to select the edit commit item 2040. To illustrate this example, FIG. 31 describes two different stages of a user's interaction with the partial GUI 1700.

This figure illustrates a first stage 1700 of user interaction that is after the preview tool 410 has been invoked and two clips 1710 and 2110 have been selected to commit to the composite presentation definition. The user may have selected the two clips 1710 and 2110 by positioning the cursor 385 over the first clip 1710 and performing a left-cursor click operation and then moving the cursor 385 over the second clip 2110 and performing a control-cursor-click operation.

In this stage 1700, the user selects the edit commit item 2040. The user performs this operation by positioning the cursor 385 over the edit commit item 2040 and performing a selection operation (e.g., a left-cursor click operation).

FIG. 31 further illustrates a second stage of user interaction 3100 that is after the user has selected the edit commit item 2040. As shown, the selected candidate clips 1700 and 2110 have been modified to indicate that the selected clips have been changed from candidate clips to committed clips 3110 and 3120. In the example of FIG. 31, the graphical representation of each of the selected clips 1710 and 2110 is changed from a half-height rectangle (indicating candidate clip status) to a full-height rectangle (indicating committed clip status). In addition to modifying the appearance of the clips, the composite presentation definition is also modified to reflect the change. Thus, any clip data that overlaps with the converted clips 3110 and 3120 is overwritten (e.g., committed clip 3130 is completely overwritten by committed clip 3120). The overlapping data may be overwritten in a similar manner as that described above in reference to FIG. 13, operations 1340-1360.

Although not shown in FIG. 31, after committing the preview clip(s) to the project a user may wish to discontinue using the preview tool 410. Thus, the user may select a particular item 2030 to remove the preview tool, make a selection from a pull-down menu, or otherwise indicate that the preview tool 410 is no longer needed. In some embodiments, when a user removes the preview tool 410 using the item 2030, any candidate clips are removed from the composite display area 340 and the underlying data is deleted from the candidate clip definition.

Although the preview tool has been shown as having a certain graphical representation with particular controls and edit style options, different embodiments may implement the preview tool using a different graphical representation having a different set of controls or edit style options. In addition, as described above, different embodiments may differentiate between candidate clips and committed clips in different ways.

Figure 32:
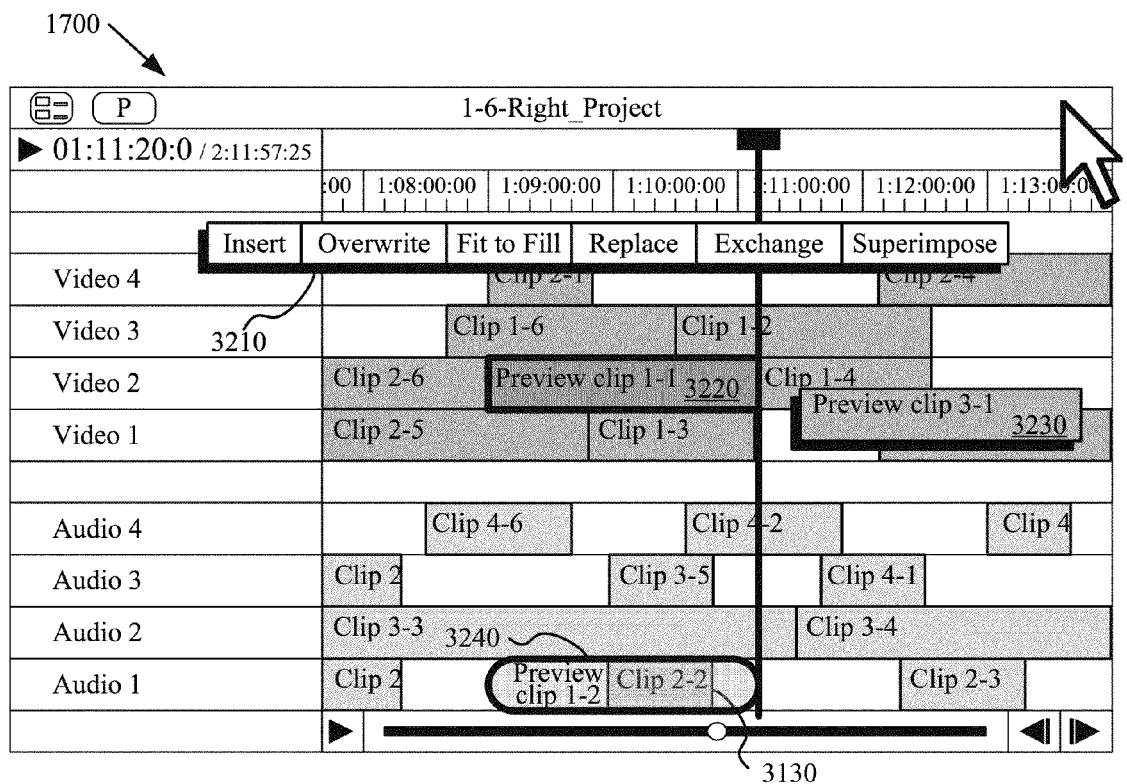
FIG. 32 illustrates different exemplary representations of the preview tool and preview clips.

FIG. 32 illustrates different exemplary representations of the preview tool and preview clips. Specifically, this figure shows an alternative representation of the preview tool 3210. In addition, the figure shows several different alternatives 3220-3240 to the half-height rectangles used in the examples described above. FIG. 32 illustrates the same GUI sub-section 1700 described above in reference to FIGS. 17-31.

As shown, in some embodiments the preview tool 3210 may be displayed as a set of functional tabs in a toolbar that hovers over the GUI of the media editing application. One of ordinary skill will also recognize that the preview tool may be implemented with various other interfaces than shown. For example, in some embodiments the preview tool may be accessed and controlled using pull-down or pop-up menu options and/or commands (not shown).

In addition, FIG. 32 illustrates several alternative display representations for candidate clips 3220-3240. As shown, one preview clip 3220 has been represented using the same shape as used for committed clips, but with a different color than the committed clips. This clip may alternatively be differentiated using a different fill pattern than the committed clips (not shown). As another example, preview clip 3230 has been represented using the same shape and color as used for committed clips, however the clip 3230 has a 3-D hovering effect. The next example clip 3240 uses the same color as the committed clips, but has a different shape than the committed clips. In addition, the preview clip 3240 is shown as semi-transparent, allowing a user to view a committed clip 3130 that would otherwise be obscured by the preview clip 3240.

C. Process Used to Modify Clips

The process 1300 described above in reference to FIG. 13 is not only illustrative of the operations used to add a clip to a media project, but may also be used when a clip that has previously been added to the media project is modified. The same conceptual operations apply, except that the process would begin when a clip is modified (instead of added), and instead of adding (at 1320 or 1360) clip data to the candidate clip definition or composite project definition, existing clip data in the candidate clip definition or composite project definition would be modified.

The clip modification that initiates the process of modifying the candidate clip definition or composite project definition may be made in various ways. For example, any of the operations described above in reference to FIGS. 17-31 may be used to modify a clip.

As described above in reference to FIG. 13, one of ordinary skill will recognize that the modified process 1300 as performed in response to a modification to an existing clip is a conceptual representation of the operations used when a clip is modified in a media project. The specific operations of the process may not be performed in the exact order described. In addition, different specific operations may be performed in different embodiments. Also, the process may not be performed as one continuous series of operations. Furthermore, the process could be implemented using several sub-processes, or as part of a larger macro-process.

In addition, although the process of modifying a clip has been described with references to certain features and actions, one of ordinary skill in the art will recognize that the process may be implemented using other specific embodiments without departing from the spirit of the invention. For instance, alternative embodiments may determine whether a particular clip is a preview clip before receiving any modification to that clip. In addition, some potential operations have been omitted for clarity. For instance, after modifying one or more clips, a user may choose to save the composite project data before continuing.

III. Playback Preview

The following section describes the process and data structures used in some embodiments to allow playback preview (i.e., playback of a project with candidate clips included), while leaving any committed project data unaffected. One of ordinary skill will recognize that these data structures and process are conceptual representations of the actual implementation. Different embodiments may use different structures or a different process to allow playback preview.

Figure 33:
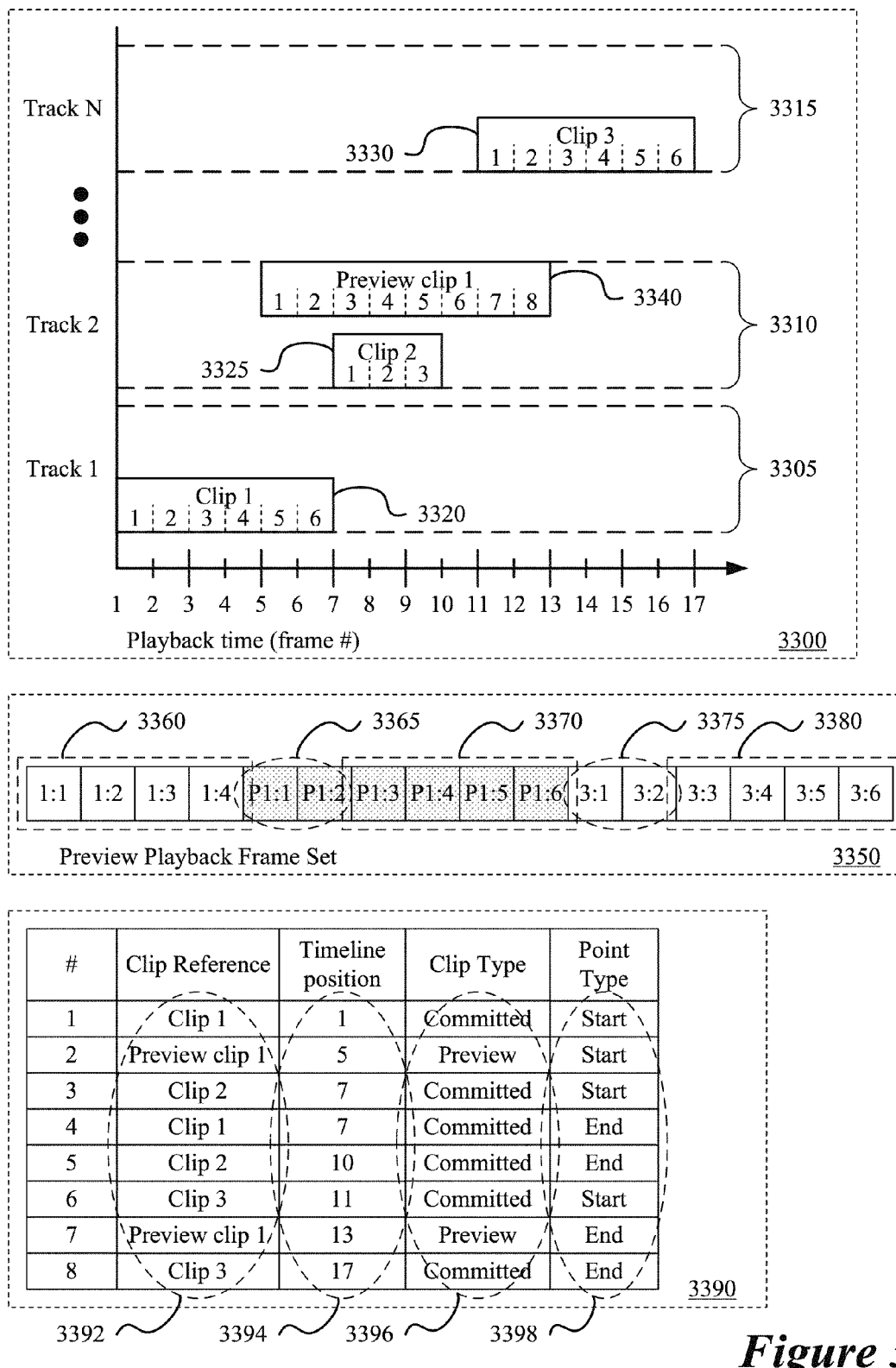
FIG. 33 illustrates some embodiments that include a timeline, and a corresponding preview playback frame set and/or segment table used to perform playback preview.

FIG. 33 illustrates some embodiments that include a timeline 3300, and a corresponding preview playback frame set 3350 and/or segment table 3390 used to perform playback preview. Specifically, this figure illustrates several data structures of an example timeline 3300, a segment table 3390 generated from the example timeline data and a preview playback frame set 3350 that may be generated from the example timeline 3300 and/or the segment table 3390. As shown in the figure, the timeline 3300 includes several tracks 3305-3315 for displaying and manipulating media clips that are part of the media project. This figure further illustrates the preview playback frameset 3350 that allows a user to view a display of the project with any candidate clips included in the displayed media presentation.

The tracks 3305-3315 include data corresponding to a set of clips 3320-3340 that have been placed in the tracks 3305-3315. As shown, in addition to committed clips, each track may also include candidate clips. Furthermore, each track may include multiple non-overlapping committed clips and multiple non-overlapping candidate clips (not shown). Although the timeline is represented as using increments of one frame, some embodiments may use other increments. For example, some timelines may use a time increment (i.e., 30 ms).

The preview playback frame set 3350 represents one particular conceptual data structure that may be used to display a preview for the user that shows how the composite presentation would appear if the candidate clips were committed to the project. The preview playback frameset 3350 generated from the timeline 3300 includes multiple frames, where some frames are committed frames 3360, 3375, and 3380 from individual committed clips, and some frames are preview frames 3365 and 3370 from the preview clip. Although each frame in the preview playback frame set 3350 have been represented as coming from a single clip, in some embodiments one or more frames may be composite frames that are generated by combining one or more clip frames.

The segment table 3390 represents another conceptual data structure that may be used to display a preview for the user or to generate the preview playback frame set 3350. The segment table 3390 of some embodiments may include information such as a reference to all clips 3392 in the timeline, a frame number or other location indicator 3394, a clip type attribute 3396, and/or a point type indicator 3398. In some embodiments the segment table 3390 may be used to optimize the playback operation by allowing the media application to perform preview playback more efficiently.

Figure 34:
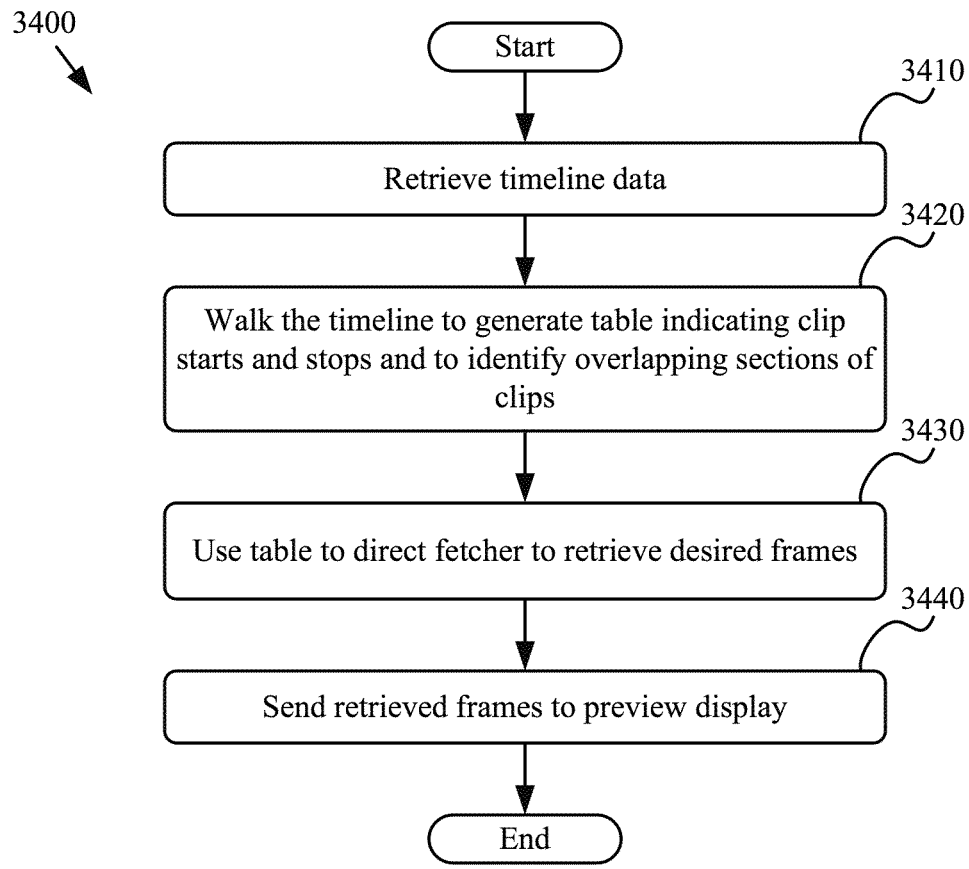
FIG. 34 illustrates a conceptual process used by some embodiments to generate a segment table from a set of timeline data.

The generation of the segment table 3390 and the preview playback frame set 3350 from the timeline data 3300 will now be described by reference to process 3400, as illustrated in FIG. 34. One of ordinary skill will recognize that process 3400 is a conceptual representation of the operations used to generate a segment table. The specific operations of the process may not be performed in the exact order described, or different specific operations may be used in different embodiments. Also, the process may not be performed as one continuous series of operations. Furthermore, the process could be implemented using several sub-processes, or as part of a larger macro-process.

As shown, the process 3400 begins at 3410 by retrieving timeline data. In this example, the timeline data 3300 will be used. Next, the process walks (at 3420) the timeline in order to generate a segment table indicating clip start and stop points and identify overlapping sections of clips. Thus, for the example timeline 3300, the timeline starts at frame 1. The process then progresses through the timeline and identifies any frames where any clips start or stop. For the example timeline 3300, there is only one clip 3320 identified as starting or ending at frame 1, so the first clip 3320 is added to the segment table 3390 as a clip start point. In addition, several clip properties may also be added to the table (e.g., track number, whether the clip includes audio data or video data, etc.). In addition to walking (at 3420) the timeline to generate the segment table, the process identifies overlapping sections of clips in order to define segments. This identification of overlapping sections may be achieved, for instance, by determining when consecutive entries in the segment table 3390 are "start" points. In some embodiments, the segment table includes information related to the overlapping sections of clips (not shown). In addition, some embodiments may remove entries from the table when the associated data will be superseded by other data. For example, as the preview clip 3340 completely overlaps the committed clip 3325 in track 2 3310, the entries in the segment table 3390 corresponding to clip 2 3325 may simply be removed from the table.

The process 3400 proceeds along the timeline 3300 until it determines that preview clip 1 3340 begins at frame 5. This begin point is added to the segment table 3390 as the next clip start or end point. The process proceeds in this manner, identifying clip start and end points and adding them to the segment table 3390 until it reaches the end of the timeline 3300 at the start of frame 17 in this example.

In some embodiments, the tracks are arranged hierarchically in the timeline, so that a clip on a track with a higher number supersedes the display of a track with a lower number. In some of these embodiments, frames on different tracks may also be composited (e.g., when performing a transition between clips on different tracks, the clips may overlap for at least a portion of the transition). The preview playback frame set 3350 shows the resulting frames under the hierarchical arrangement of one embodiment.

In some of these embodiments, the superseding clip is a smaller size than the superseded clip and thus, the superseding clip is only displayed over a portion of the superseded clip. In other embodiments, the superseding clip is at least as large as the superseded clip, and thus displaces the entire superseded clip or image in the display. The example playback frame set 3350 shows that the preview clip 3340 in this example supersedes the overlapping clip 3320 on a lower-numbered track 3305 in frames 5 and 6 3365. In contrast, the committed clip 3330 in a higher-numbered track 3315 supersedes the overlapping preview clip 3340 in frames 11 and 12 3375. In addition the preview clip 3340 supersedes the committed clip 3325 in the same track 3310.

As in the above example, the preview clips may follow the hierarchy of the committed clips, and thus be superseded by committed clips on higher-numbered tracks, but may supersede clips on lower or equal-numbered tracks. In other embodiments, preview clips may supersede committed clips regardless of whether the preview clip is placed in a higher-numbered track than the committed clip.

In some embodiments, when audio clips overlap, the clips may be "mixed" instead of a particular clip superseding another. In these embodiments, the mixing operation may be controlled by the user, or may be performed as a default mix (e.g., playing all audio tracks at equal relative volume). In other embodiments, the audio clips on higher-numbered tracks may supersede the audio clips on lower-numbered tracks. In some of these embodiments, a user may elect audio clips to supersede other audio clips, while in other embodiments, the election may be a default election. The preview audio clips of some embodiments will supersede any committed audio clips in the same track, but be mixed with or supersede clips in other tracks as described above.

After walking (at 3420) the timeline to generate the segment table and identify overlapping sections of clips in order to define segments, the process uses (at 3430) the table to direct a fetcher to identify and retrieve individual frames (e.g., from a content storage element). In some embodiments, the table may omit superseded clips, or make other appropriate modifications (e.g., by adding attributes to each clip entry in the table) such that the fetcher is able to efficiently identify and retrieve frames.

After using (at 3430) the fetcher to identify and retrieve frames, the process of some embodiments sends (at 3440) frames retrieved by the fetcher to the preview display. The fetcher in this example retrieves the frames shown in the preview playback frame set 3350. After sending (at 3440) the frames to the preview display, the process ends.

Although the preview playback function has been described above using numerous specific details, one of ordinary skill in the art will recognize that the function could be implemented in different ways without departing from the spirit of the invention. For instance, some embodiments scan the timeline and generate a list of frames for playback. As another example, different embodiments may assign a particular priority to the clips in a track, such that any overlapping sections of clips are resolved by removing (or omitting) the section from the clip with a lower priority.

In addition, many of the examples given above are by reference to a video compositing application that composites video clips and provides a preview display area for displaying the composite presentation. The preview tool may also be used for other media compositing applications such as audio mixers. In the case of an audio mixer, for example, the feedback would not be provided to the user through a preview display area, but rather through another mechanism (e.g., by playing an audio preview using a PC's sound card and speakers).

IV. Software Architecture and Implementation

Figure 35:
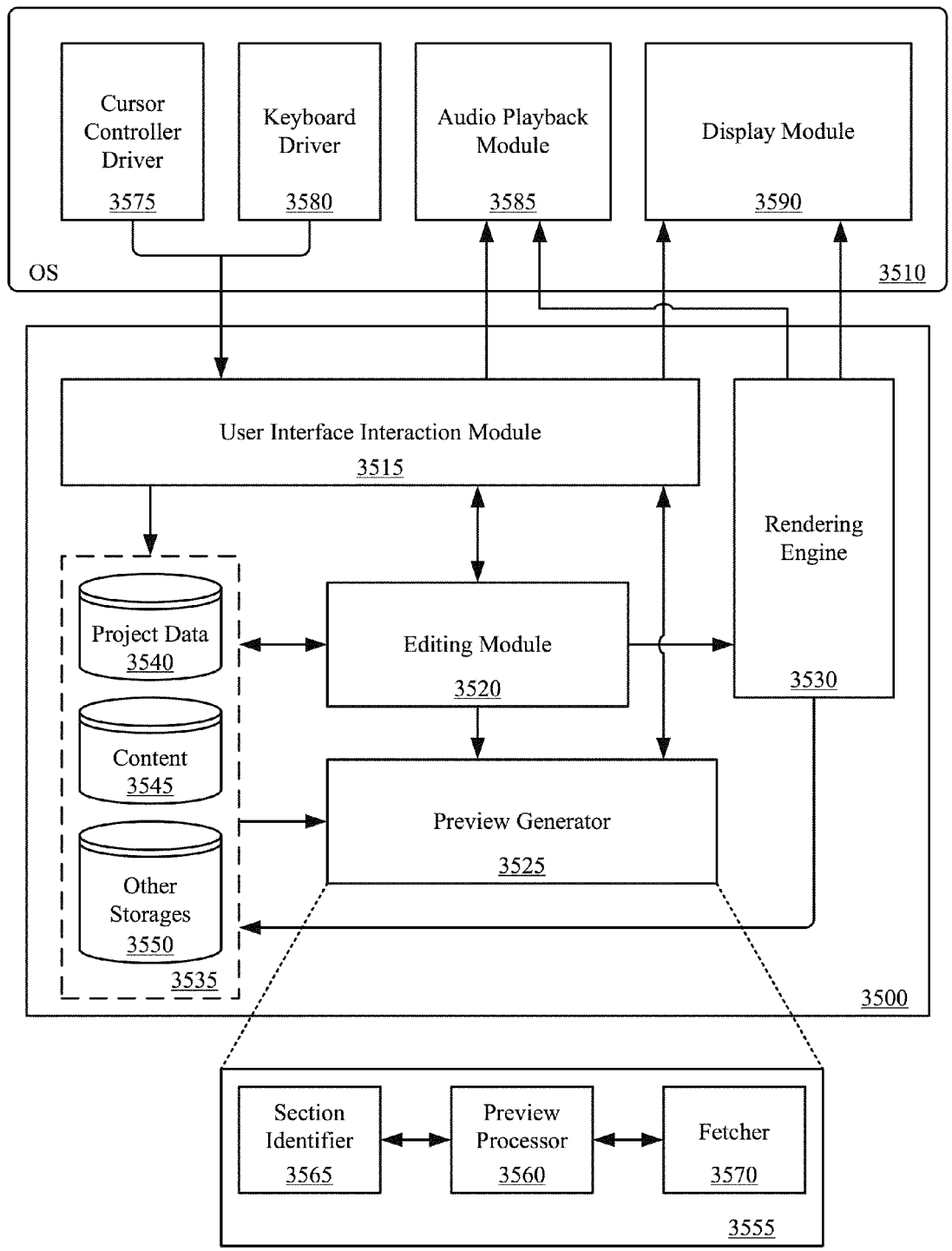
FIG. 35 conceptually illustrates the software architecture of the media editing application of some embodiments.

In some embodiments, the processes described above are implemented as software running on a particular machine, such as a computer or a handheld device, or stored in a computer readable medium. FIG. 35 conceptually illustrates the software architecture of an application 3500 of some embodiments for presenting menus such as those described in the preceding sections. In some embodiments, the application is a stand-alone application or is integrated into another application (for instance, application 3500 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

Media editing application 3500 includes a user interface interaction module 3515 for sending data to and receiving data from a user, an editing module 3520 for receiving and processing edits to a composite project, a preview generator 3525 for creating a composite presentation based on stored project data, a rendering engine 3530 used to generate image data for storage or display, and a set of storages 3535 for storing data used by the application 3500. The set of storages 3535 includes storages for project data 3540, content data 3545, as well as other data 3550 (e.g., data about media objects in a video scene). The sub-components of the preview generator 3525 of some embodiments are shown in breakout section 3555. As shown, the preview generator includes a preview processor 3560, a section identifier 3565, and a fetcher 3570.

The operating system 3510 of some embodiments includes a cursor controller driver 3575 that allows the application 3500 to receive data from a cursor control device, a keyboard driver 3580 for that allows the application 3500 to receive data from a keyboard, an audio playback module 3585 for processing audio data that will be supplied to an audio device (e.g., a soundcard and speakers), and a display module 3590 for processing video data that will be supplied to a display device (e.g., a monitor).

A user interacts with items in the user interface of the media editing application 3500 via input devices (not shown) such as a cursor controller (e.g., a mouse, touchpad, trackpad, etc.) and/or keyboard. The input from these devices is processed by the cursor controller driver 3575 and/or the keyboard driver 3580, and passed to the user interface interaction module 3515.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface interaction module 3515 translates the data from the drivers 3575 and 3580 into the user's desired effect on the media editing application 3500. For example, when the user edits content in a display area of the media editing application, the user interface interaction module 3515 may translate these edits into instructions that are processed by the editing module 3520 in some embodiments. In other embodiments, the edits may be applied directly to project data 3540, or other data stored by the application 3500 in the set of storages 3535. An example of the user editing content is if the user trims a media clip in a display area of the media editing application 3500. The user interface interaction module 3515 also receives input data that is translated as instructions to preview visual content in a preview display area (for example, if a user clicks a play control while editing a media project). This information is passed to preview generator 3525 through the editing module 3520 in some embodiments.

Editing module 3520 of some embodiments processes edit instructions received from the user interface interaction module 3515 and data retrieved from the set of data storages 3535. Editing module 3520 may also create and/or update data stored within the set of data storages 3535 based on received instructions that affect the project data 3540, content 3545, or other stored data 3550. In addition, the editing module 3520 may send instructions and/or data to the preview generator 3525 of some embodiments. Furthermore, the editing module 3520 may also send data and/or instructions to the rendering engine 3530 of some embodiments. Editing module 3520 may perform, for example, some or all of the operations of processes 1300 and/or 3400 in some embodiments.

Preview generator 3525 of some embodiments generates a preview based on instructions received from the editing module 3520 and/or the user interface interaction module 3515 and project data stored in storage 3540, content stored in storage 3545, and/or other data stored in storage 3550. In some embodiments, preview generator 3525 also generates a preview window (through the user interface interaction module 3515) after generating the preview, and manages the movement of the preview window. In some of these embodiments, the preview generator 3525 may also provide content to the user interface interaction module 3515 for display. The preview generator 3525 may perform some or all of operations of the processes 1300 and/or 3400 in some embodiments.

The operation of the preview generator 3525 will be further described in reference to breakout section 3555. As shown, the preview generator of some embodiments includes a preview processor 3560 that may be used to communicate with the editing module 3520, send and receive data to and from the user interface interaction module 3515 and/or the set of data storages 3535. In addition, the preview processor 3560 may be used to send and receive data to and from the section identifier 3565 and/or the fetcher 3570. In some embodiments, the preview processor 3560 sends timeline data to the section identifier 3565, which generates a table or other appropriate set of data. The generated table or set of data may be similar to the segment table 3390 or the preview playback frame set 3350 described above in reference to FIG. 33.

In some embodiments, the preview processor 3560 may supply the set of data (e.g., a segment table or frame set) generated by the section identifier 3565 to the fetcher 3570. In some embodiments, audio data may be passed directly to the user interface interaction module, while video data is processed through the fetcher 3570. In other embodiments, the preview processor 3560 may supply both audio and video data to the user interface interaction module 3515. If project data, content, and/or other data are edited, that modified data is passed to the preview generator 3525 so that a new preview can be generated.

Fetcher 3570 of some embodiments retrieves frames of video data from the set of data storages 3535 based on data provided by the preview processor 3560. In some embodiments, the fetcher 3570 may also receive data from the editing module 3520 (either directly, or through the preview processor 3560). The data received by the fetcher 3570 may take the form of a table or list of frames (e.g., segment table 3390 or preview playback frame set 3350 described above in reference to FIG. 33. In addition to processing video frames through the fetcher 3570, some embodiments may use the fetcher to retrieve and send audio data.

Rendering engine 3530 enables the storage or output of audio and video from the media editing application 3500. For example, rendering engine 3530 uses data about media objects in a video scene to render the video scene from the particular location, direction, etc. defined by a camera object. As such, the rendering engine receives, in some embodiments, data from the editing module 3520 so that a preview can be displayed. In other embodiments (not shown), the rendering engine 3530 may receive data from the preview generator 3525 in order to generate a preview display. Data from the rendering engine 3530 (e.g., audio and video data of a video scene, preview data, etc.) is passed to the display module 3590 and/or the audio playback module 3585. The audio playback module enables audio playback from the media editing application 3500 on an audio device (e.g., a set of speakers or headphones). Display module 3590 enables the display of the media editing application 3500 on a display device (e.g., a CRT monitor, LCD screen, etc.). Alternatively, data may be passed from the rendering engine 3530 to the set of storages 3535 for later playback.

Although the application 3500 and its features have been described using several specific embodiments, other embodiments might implement the application or its features using different resources or by placing the various modules in different specific locations. For instance, while many of the features have been described as being performed by one module (e.g., the UI interaction module 3515 or preview generator 3525), one of ordinary skill would recognize that a particular operation might be split up into multiple modules, and the performance of one feature might even require multiple modules in some embodiments. In addition, the application 3500 may include a separate audio module that performs functions analogous to the fetcher 3570.

Figure 36:
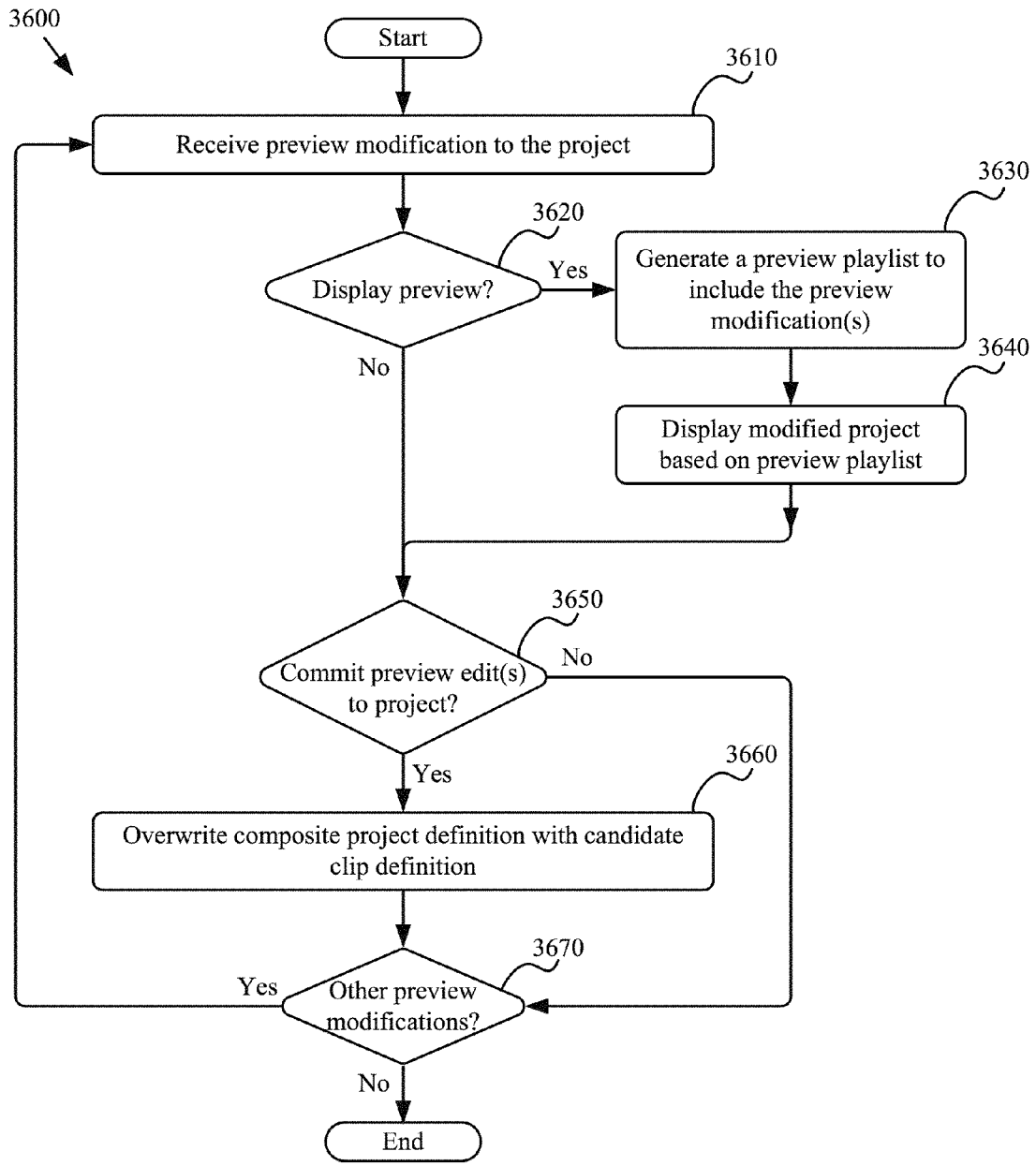
FIG. 36 conceptually illustrates the process of some embodiments used to display preview modifications to a project and commit the preview modifications to the composite media presentation.

FIG. 36 conceptually illustrates a process 3600 used to receive and display a preview modification to a project and commit the preview modification to the composite media presentation. In some embodiments, the process 3600 could be implemented using the software modules and storages described above in reference to FIG. 35. As shown, the process 3600 begins at 3610 by receiving a preview modification to a project. The preview modification may include adding a candidate clip, modifying an existing candidate clip (e.g., by applying a particular edit style, moving a candidate clip along the timeline, etc.), or other such preview modification to the project. In some embodiments, the preview modifications are not permanently stored with the project data and may be stored in RAM, or other appropriate short-term storage while the preview edit session is still active. After receiving (at 3610) a preview modification, the process continues by determining (at 3620) whether to display a preview that includes the preview modification. In some cases, the determination may be based on user input, a default determination, or some other appropriate method.

In any case, when the process determines (at 3620) that the preview playlist is to be displayed, the process continues by generating (at 3630) a preview playlist to include the preview modifications. The generation of one example of such a preview playlist was described in reference to FIGS. 33-34 above. The process next displays (at 3640) the modified project using the preview playlist. After displaying (at 3640)

the modified project, or after determining (at 3620) not to display a preview, the process continues by determining (at 3650) whether to commit the preview edits to the project. When the process determines (at 3650) that the preview modifications will be committed to the project, the process overwrites (at 3660) the committed project clip data with preview clip data. When the process determines (at 3650) that the preview modifications will not be committed to the project, or after overwriting (at 3660) the committed clip data, the process determines (at 3670) whether there are other preview modifications. When the process determines (at 3670) that there are further preview modifications, the process repeats the operations 3610-3670 until the process determines (at 3670) that there are no other preview modifications. When determining (at 3670) that there are no other preview modifications, the process ends.

In addition to those operations shown in process 3600, the media editing process of some embodiments further includes operations such as compositing a media project's video data, rendering the media presentation to a file, and encoding the file into various media formats (e.g., MPEG-2, DivX, etc.). One of ordinary skill in the art will recognize that various different operations may be used to prepare media presentations for playback on various different devices.

One of ordinary skill in the art will recognize that the conceptual descriptions provided above in reference to FIGS. 35-36 may be implemented using different embodiments without departing from the spirit of the invention. For instance, the various storage modules 3540-3550 described above in reference to FIG. 35 may be implemented as a single storage element, where the various storage modules all exist at the same physical location, and are differentiated using some appropriate method. As another example, the various storage modules 3540-3550 may be located externally to the application 3500 and accessed through a communication pathway (e.g., a bus). Section V below describes a process of some embodiments for defining and storing the software modules described above. Section VI then describes a computer system used by some embodiments to implement the various software modules and structures described above.

V. Process for Defining a Media Editing Application

Figure 37:
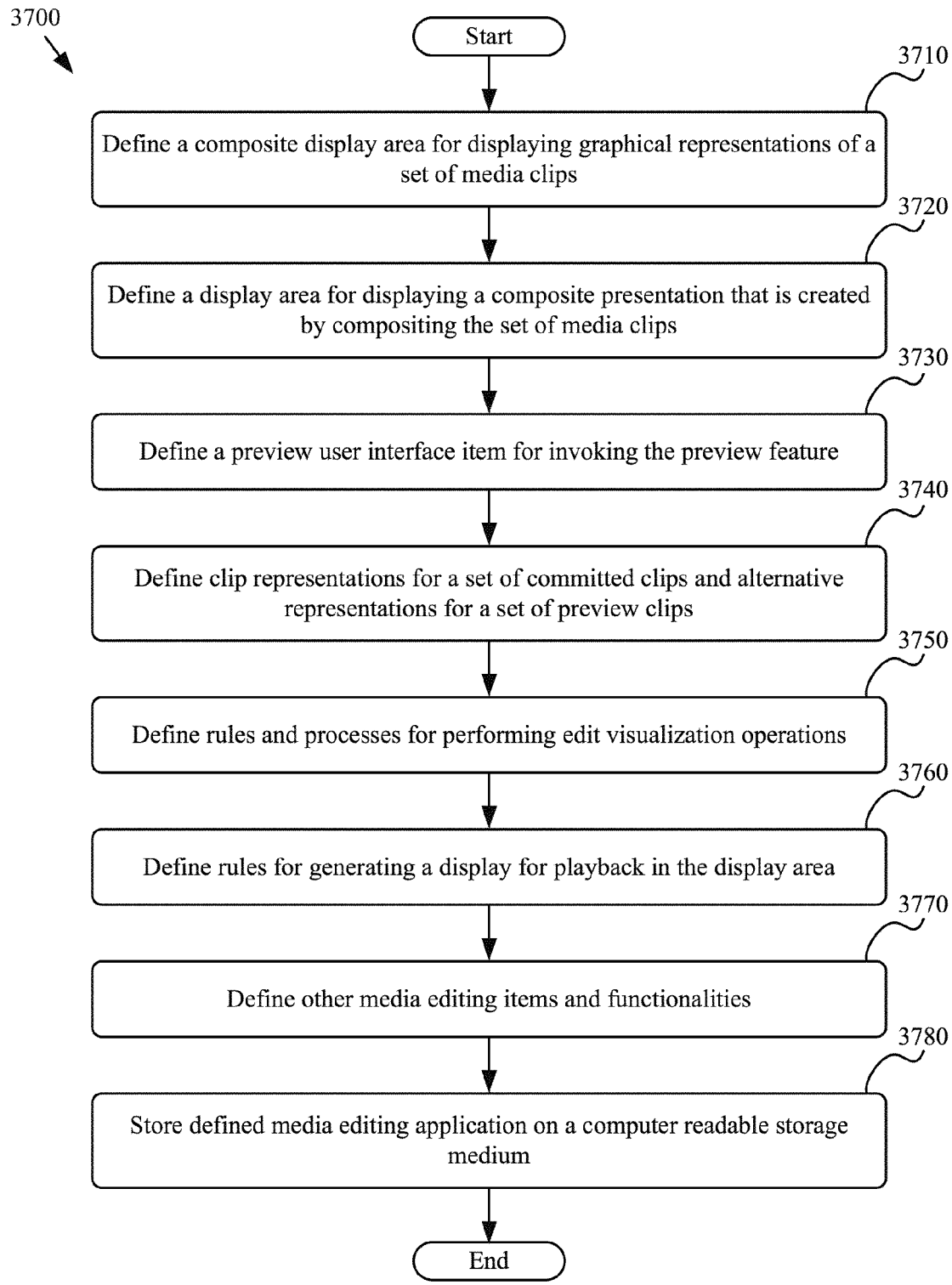
FIG. 37 conceptually illustrates a process used by some embodiments to define a media-editing application.

FIG. 37 conceptually illustrates a process 3700 of some embodiments for defining and storing a media-editing application of some embodiments, such as application 3500. Specifically, process 3700 illustrates the operations used to define several of the elements shown in GUI 300. As shown, process 3700 begins by defining (at 3710) a composite display area for displaying graphical representations of a set of media clips. Composite display area 340 is one example of such a display area.

The process then defines (at 3720) a display area for displaying a composite presentation that is created by compositing the set of media clips. For instance, preview display area 330 is such a display area. Next, the process defines (at 3730) a preview user interface item for invoking the preview feature. The preview selection item 310 is an example of such a user interface item.

After defining (at 3730) the preview user interface tool for invoking the preview feature, the process defines (at 3740) clip representations for a set of committed clips and alternative representations for a set of preview clips. GUI 300 of FIG. 6 shows one example of such representations.

The process then defines (at 3750) rules and processes for performing edit visualization operations. FIGS. 20-31 illustrate several examples of such edit visualization operations and the accompanying discussion describes the rules and processes used to implement those operations.

After defining (at 3750) rules and processes for performing edit visualization operations, process 3700 defines (at 3760) rules for generating a display for playback in the display area. Several examples of these rules and processes were described above in reference to FIGS. 33-34.

The process then defines (at 3770) other media editing items and functionalities. Examples of such editing tools may include zoom, color enhancement, blemish removal, audio mixing, etc. In addition, various other media editing functionalities may be defined. Such functionalities may include library functions, format conversion functions, etc. The process defines these additional tools in order to create a media editing application that has many additional features to the features described above.

Figure 38:
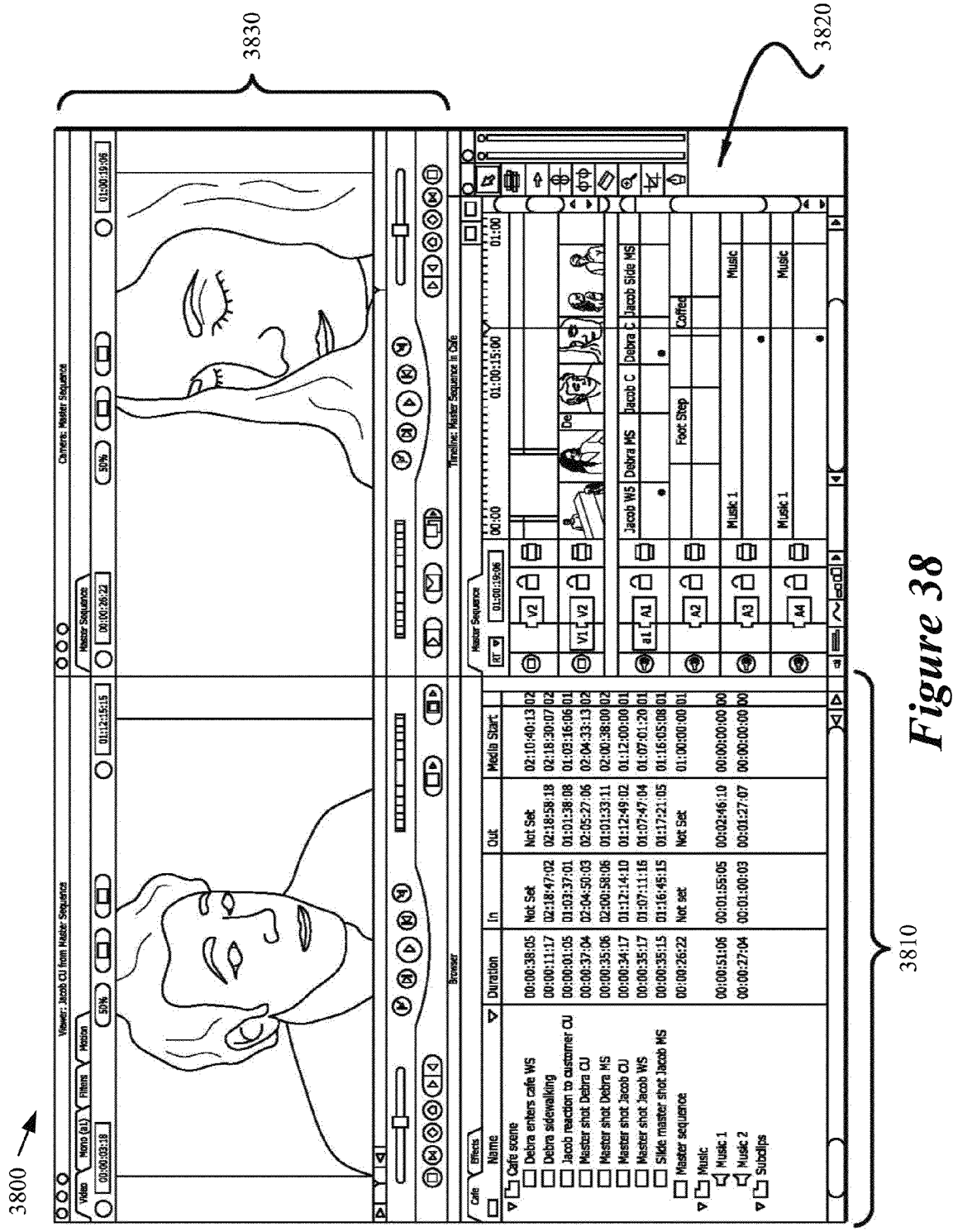
FIG. 38 illustrates an alternative GUI of the media editing application of some embodiments.

A more detailed view of a media editing application with these additional features is illustrated in FIG. 38. Specifically, this figure shows a media editing application with these additional tools. FIG. 38 illustrates a list of video clips 3810, video editing tools 3820, and video displays 3830. The list of video clips 3810 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 3820 include tools that allow a user to graphically set in and out points for video clips (in other words, where in the final product a specific clip or part of a clip will be shown). For instance, the video editing tools 3820 include a number of timelines that can be used to modify the temporal sequence of the video frame and to synchronize audio tracks with video tracks (e.g., in order to add music over a video clip). In some embodiments, video editing tools 3820 also give users the ability to edit in effects or perform other video editing functions.

Video displays 3830 allow a user to watch multiple video clips at once, thereby enabling easier selection of in and out points for the video clips. The screen shot 3800 illustrates a few of many different editing tools that a video editing application of some embodiments may have to edit digital video.

In some cases, some or all of the video clips that are displayed in the list of video clips 3810, played in displays 3830, and edited by a user with video editing tools 3820, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Process 3700 then stores (at 3780) the defined media editing application (i.e., the defined modules, UI items, etc.) on a computer readable storage medium. The computer readable storage medium may be a disk (e.g., CD, DVD, hard disk, etc.) or a solid-state storage device (e.g., flash memory) in some embodiments. One of ordinary skill in the art will recognize that the various elements defined by process 3700 are not exhaustive of the modules, rules, processes, and UI items that could be defined and stored on a computer readable storage medium for a media editing application incorporating some embodiments of the invention. In addition, the process 3700 is a conceptual process, and the actual implementations may vary. For example, different embodiments may define the various elements in a different order, may define several elements in one operation, may decompose the definition of a single element into multiple operations, etc. In addition, the process 3700 may be implemented as several sub-processes or combined with other operations within a macro-process.

VI. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" is meant in its broadest sense. It can include firmware residing in read-only memory or applications stored in magnetic storage which can be read into memory for processing by one or more processors. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 39:
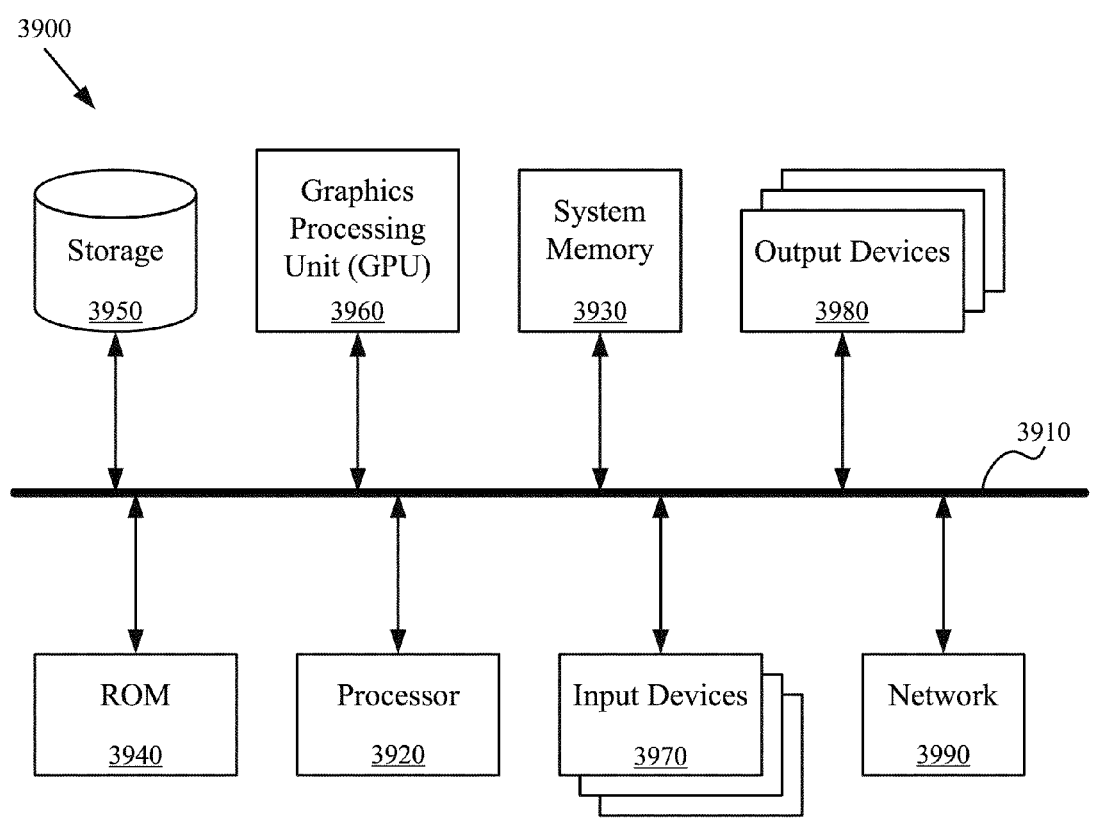
FIG. 39 illustrates a computer system with which some embodiments of the invention are implemented.

FIG. 39 conceptually illustrates a computer system 3900 with which some embodiments of the invention are implemented. For example, the system described above in reference to FIG. 35 may be at least partially implemented using sets of instructions that are run on the computer system 3900. As another example, the processes described in reference to FIGS. 13, 34, and 36 may be at least partially implemented using sets of instructions that are run on the computer system 3900.

Such a computer system includes various types of computer readable mediums and interfaces for various other types of computer readable mediums. Computer system 3900 includes a bus 3910, a processor 3920, a system memory 3930, a read-only memory (ROM) 3940, a permanent storage device 3950, a graphics processing unit ("GPU") 3960, input devices 3970, output devices 3980, and a network connection 3990. The components of the computer system 3900 are electronic devices that automatically perform operations based on digital and/or analog input signals. The various examples of user interfaces shown in FIGS. 3-12, 15-32, and 38 may be at least partially implemented using sets of instructions that are run on the computer system 3900 and displayed using the output devices 3980.

One of ordinary skill in the art will recognize that the computer system 3900 may be embodied in other specific forms without deviating from the spirit of the invention. For instance, the computer system may be implemented using various specific devices either alone or in combination. For example, a local PC may include the input devices 3970 and output devices 3980, while a remote PC may include the other devices 3910-3960, with the local PC connected to the remote PC through a network that the local PC accesses through its network connection 3990 (where the remote PC is also connected to the network through a network connection).

The bus 3910 collectively represents all system, peripheral, and chipset buses that communicatively connect the numerous internal devices of the computer system 3900. In some cases, the bus 3910 may include wireless and/or optical communication pathways in addition to or in place of wired connections. For example, the input devices 3970 and/or output devices 3980 may be coupled to the system 3900 using a wireless local area network (W-LAN) connection, Bluetooth®, or some other wireless connection protocol or system.

The bus 3910 communicatively connects, for example, the processor 3920 with the system memory 3930, the ROM 3940, and the permanent storage device 3950. From these various memory units, the processor 3920 retrieves instructions to execute and data to process in order to execute the processes of some embodiments. In some embodiments the processor includes an FPGA, an ASIC, or various other electronic components for execution instructions.

The ROM 3940 stores static data and instructions that are needed by the processor 3920 and other modules of the computer system. The permanent storage device 3950, on the other hand, is a read-and-write memory device. This device is a non-volatile memory unit that stores instructions and data even when the computer system 3900 is off. Some embodiments of the invention use a mass-storage device (such as a magnetic or optical disk and its corresponding disk drive) as the permanent storage device 3950.

Other embodiments use a removable storage device (such as a floppy disk, flash drive, or CD-ROM) as the permanent storage device. Like the permanent storage device 3950, the system memory 3930 is a read-and-write memory device. However, unlike storage device 3950, the system memory 3930 is a volatile read-and-write memory, such as a random access memory (RAM). The system memory stores some of the instructions and data that the processor needs at runtime. In some embodiments, the sets of instructions and/or data used to implement the invention's processes are stored in the system memory 3930, the permanent storage device 3950, and/or the read-only memory 3940. For example, the various memory units include instructions for processing multimedia items in accordance with some embodiments.

In addition, the bus 3910 connects to the GPU 3960. The GPU of some embodiments performs various graphics processing functions. These functions may include display functions, rendering, compositing, and/or other functions related to the processing or display of graphical data.

The bus 3910 also connects to the input devices 3970 and output devices 3980. The input devices 3970 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 3980 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 39, bus 3910 also couples computer 3900 to a network 3990 through a network adapter (not shown). In this manner, the computer can be a part of a network of computers (such as a local area network ("LAN"), a wide area network ("WAN"), an Intranet, or a network of networks, such as the Internet. For example, the computer 3900 may be coupled to a web server (network 3990) so that a web browser executing on the computer 3900 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computer system 3900 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., particular composite display areas). However, one of ordinary skill will realize that other embodiments might be implemented with other types of media editing applications with other types of features and components (e.g., other types of composite display areas).

Moreover, while the examples shown illustrate many individual modules as separate blocks (e.g., the preview generator 3525, the rendering engine 3530, etc.), one of ordinary skill in the art would recognize that some embodiments may combine these modules into a single functional block or element. One of ordinary skill in the art would also recognize that some embodiments may divide a particular module into multiple modules.

One of ordinary skill in the art will realize that, while the invention has been described with reference to numerous specific details, the invention can be embodied in other specific forms without departing from the spirit of the invention. For instance, alternate embodiments may be implemented by using a generic processor to implement the video processing functions instead of using a GPU. One of ordinary skill in the art would understand that the invention is not to be limited by the foregoing illustrative details, but rather is to be defined by the appended claims.

The invention claimed is:

1. A non-transitory machine readable medium storing a media editing application for creating media presentations, said application comprising a graphical user interface (GUI), said GUI comprising:
- a composite display area for displaying graphical representations of a set of committed media clips that are part of a composite presentation and a set of candidate media clips that are candidates for adding to the composite presentation;
- a preview tool for:
  - adding a candidate media clip to the composite display area at a particular location that at least partially overlaps a graphical representation of a committed media clip, and
  - differentiating in the composite display area the graphical representation of the added candidate media clip, which is a candidate for adding to the composite presentation but is not part of the composite presentation, from the graphical representation of the committed media clip that is part of the composite presentation, wherein the differentiating comprises displaying the candidate clip's graphical representation with a different shape than the committed clip's graphical representation; and
- a preview display area for displaying a preview of the composite presentation, wherein a preview of the committed media clip in the composite presentation is superseded by a preview of the candidate media clip in accord with the overlap of the graphical representation of the candidate media clip over the graphical representation of the committed media clip.

2. The non-transitory machine readable medium of claim 1, said GUI further comprising a preview selection item for selecting a particular media clip to designate as the candidate clip before adding the candidate clip to the composite display area.

3. The non-transitory machine readable medium of claim 1, wherein the GUI further comprises a media library for displaying media clips to add to the composite display area, wherein the candidate clip is added to the composite display area based on a selection of the candidate clip from the media library.

4. The non-transitory machine readable medium of claim 3, wherein the candidate clip is added to the composite display area by dragging the candidate clip from the media library to the composite display area.

5. The non-transitory machine readable medium of claim 1, said GUI further comprising a pull-down menu comprising a menu option for adding media clips to the composite display area, wherein the candidate clip is added to the composite display area based on a selection of the menu option from the pull-down menu.

6. The non-transitory machine readable medium of claim 1, said GUI further comprising a preview selection item for (i) removing a particular media clip from the set of committed media clips that are part of the composite presentation and (ii) adding the particular media clip to the set of candidate media clips that are not part of the composite presentation.

7. The non-transitory machine readable medium of claim 1, said GUI further comprising a preview commit item for (i) removing the candidate clip from the set of candidate media clips that are not part of the composite presentation and (ii) adding the candidate clip to the set of committed media clips that are part of the composite presentation.

8. The non-transitory machine readable medium of claim 1, wherein the graphical representation of each committed media clip that is part of the composite presentation has a first visible appearance, wherein the graphical representation of each candidate media clip that is not part of the composite presentation has a second visible appearance that is different from the first visible appearance.

9. The non-transitory machine readable medium of claim 1, the preview display area for playing a preview of the composite presentation including any candidate clips that are graphically displayed in the composite display area.

10. The non-transitory machine readable medium of claim 1, wherein the media clips comprise at least one audio clip and at least one video clip.

11. A method of creating media presentations using a media editing application, said method comprising:
    providing a display area for displaying a composite presentation that the application creates by compositing a plurality of media clips;
    providing a composite display area for displaying geometric shapes representing media clips at a plurality of locations in the composite display area, the media clips comprising a set of committed media clips that are part of the composite presentation and a set of candidate media clips that are candidates for adding to the composite presentation; and
    providing a preview tool for (i) adding a candidate media clip to the composite display area and (ii) differentiating in the composite display area the geometric shape of any particular committed media clip that is part of the composite presentation and is displayed at a particular location in the composite display area, from the geometric shape of any particular candidate media clip that is a candidate for adding to the composite presentation at the particular location in the composite display area, said preview tool differentiating the geometric shapes in order to simultaneously display the particular committed and candidate media clips at the particular location in the composite display area.

12. The method of claim 11, wherein the geometric shape of each committed media clip in the composite display area that is part of the composite presentation has a first visible appearance and the geometric shape of each candidate media clip in the composite display area that is a candidate for adding to the composite presentation has a second visible appearance, said first visible appearance different from said second visible appearance.

13. The method of claim 12, wherein the first and second visible appearances are first and second colors.

14. The method of claim 12, wherein the first and second visible appearances are first and second shapes.

15. The method of claim 12, wherein the first and second visible appearances are first and second sizes.

16. The method of claim 15,
    wherein the first visible appearance comprises a rectangle with a particular width and a particular height,
    wherein the second visible appearance comprises a rectangle with the particular width and a height that is half the particular height.

17. A non-transitory machine readable medium storing a media editing application, the media editing application comprising:
    a set of instructions for providing a preview display area for previewing a composite presentation that the application creates by compositing a plurality of audio clips;
    a set of instructions for providing a composite display area for displaying geometric shapes of a set of committed audio clips that are part of the composite presentation and a set of candidate audio clips that are candidates for adding to the composite presentation; and
    a set of instructions for providing a preview tool for (i) converting a particular committed audio clip, that is displayed in the composite display area and is part of the composite presentation, to a candidate audio clip that is a candidate for adding to the composite presentation but is not part of the composite presentation and (ii) differentiating in the composite display area the geometric shape of any committed audio clip that is part of the composite presentation from the geometric shape of the converted candidate audio clip, wherein differentiation of the committed and candidate audio clips allows any candidate audio clip in the composite display area to be distinguished from any committed audio clips in the composite display area.

18. The non-transitory machine readable medium of claim 17, wherein the preview tool is further for applying at least one edit style from a set of edit styles to one or more candidate audio clips that are not part of the composite presentation.

19. The non-transitory machine readable medium of claim 17, wherein the preview tool is further for removing, from the composite display area, the geometric shapes of the set of candidate audio clips that are candidates for adding to the composite presentation.

20. The non-transitory machine readable medium of claim 18, wherein an appearance of one or more geometric shapes in the composite display area is modified upon application of the edit style, wherein the preview tool is further for locking a particular geometric shape in the composite display area, wherein an appearance of the locked particular geometric shape is not modified upon application of the edit style.

21. The non-transitory machine readable medium of claim 17, wherein the composite display area comprises a timeline relating to a duration of the composite presentation, wherein the geometric shapes of the candidate and committed audio clips are placed on one or more tracks that span the timeline of the composite display area.

22. The non-transitory machine readable medium of claim 1, said GUI further comprising a deactivation control for deactivating the candidate media clip by removing the candidate clip's graphical representation from the composite display area or modifying an appearance of the candidate clip's graphical representation in the composite display area.

23. The non-transitory machine readable medium of claim 22, wherein the deactivation control is further for storing information relating to a location of the candidate clip's graphical representation in the composite display area.

24. The non-transitory machine readable medium of claim 23, said GUI further comprising an activation control for reactivating the candidate clip by placing the candidate clip's graphical representation in the composite display using the information relating to the location.

25. The non-transitory machine readable of claim 1, wherein the GUI further comprises a preview selection item for selecting a particular video clip to designate as the candidate clip before adding the candidate video clip to the composite display area.

\* \* \* \* \*